United States Patent
Kondo et al.

(10) Patent No.: US 10,044,280 B2
(45) Date of Patent: Aug. 7, 2018

(54) DC/DC CONVERTER

(71) Applicant: Mitsubishi Electric Corporation, Chiyoda-ku (JP)

(72) Inventors: Ryota Kondo, Chiyoda-ku (JP); Mai Uenaka, Chiyoda-ku (JP); Matahiko Ikeda, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/521,766

(22) PCT Filed: Jan. 28, 2016

(86) PCT No.: PCT/JP2016/052518
§ 371 (c)(1),
(2) Date: Apr. 25, 2017

(87) PCT Pub. No.: WO2016/125682
PCT Pub. Date: Aug. 11, 2016

(65) Prior Publication Data
US 2017/0250617 A1    Aug. 31, 2017

(30) Foreign Application Priority Data

Feb. 3, 2015   (JP) ................. 2015-019099

(51) Int. Cl.
*H02M 3/158* (2006.01)
*H02M 3/335* (2006.01)
*H02M 3/06* (2006.01)

(52) U.S. Cl.
CPC ......... *H02M 3/33569* (2013.01); *H02M 3/06* (2013.01); *H02M 3/1588* (2013.01); *H02M 2003/1586* (2013.01)

(58) Field of Classification Search
CPC .. H02M 3/3372; H02M 3/3378; H02M 3/337; H02M 3/3376; H02M 3/33592;
(Continued)

(56) References Cited

U.S. PATENT DOCUMENTS

| | | | |
|---|---|---|---|
| 2010/0244798 A1* | 9/2010 | Nakatomi | H02M 3/156 323/282 |
| 2013/0119961 A1* | 5/2013 | Okuda | H02M 3/158 323/299 |

(Continued)

FOREIGN PATENT DOCUMENTS

| | | |
|---|---|---|
| JP | 2010-239770 A | 10/2010 |
| JP | 2014-241665 A | 12/2014 |
| WO | 2012/014912 A1 | 2/2012 |

OTHER PUBLICATIONS

International Search Report dated Apr. 19, 2016 in PCT/JP2016/052518 filed on Jan. 28, 2016.

*Primary Examiner* — Gary L Laxton
*Assistant Examiner* — Kevin H Sprenger
(74) *Attorney, Agent, or Firm* — Oblon, McClelland, Maier & Neustadt, L.L.P.

(57) ABSTRACT

A DC/DC converter includes: duty command calculation units for calculating duty command values for first, second, third, and fourth switching elements on the basis of difference voltage between a high-voltage-side voltage command value and a high-voltage-side voltage detection value; and a phase shift duty command calculation unit for calculating a phase shift duty command value corresponding to a phase difference between gate signals for the first and fourth switching elements and gate signals for the second and third switching elements, on the basis of difference voltage between a voltage target value and a charge voltage detection value of a charge/discharge capacitor, wherein gate signals for driving the first, second, third, fourth switching (Continued)

elements are generated on the basis of the duty command values and the phase shift duty command value.

11 Claims, 35 Drawing Sheets

(58) Field of Classification Search
CPC ............... H02M 3/28; H02M 3/33569; H02M 3/33523; H02M 3/3384; H02M 3/156; H02M 3/1588; H02M 3/1584; H02M 3/158; H02M 3/335; H02M 3/07; H02M 3/157; H02M 7/53806; H02M 7/53871; H02M 7/48; H02M 7/5395; H02M 7/53873; H02M 7/53875; H02M 7/527; H02M 7/49; H02M 7/483; H02M 7/487; H02M 7/497; H02M 7/537; H02M 7/003; H02M 7/538; H02M 7/53835; H02M 7/5381; H02M 7/53846; Y02B 70/1433; Y02B 70/1441; Y02B 70/1466
See application file for complete search history.

(56) References Cited

U.S. PATENT DOCUMENTS

| | | |
|---|---|---|
| 2016/0129796 A1 | 5/2016 | Tomura et al. |
| 2016/0248317 A1* | 8/2016 | Taguchi ................. H02M 1/32 |

* cited by examiner

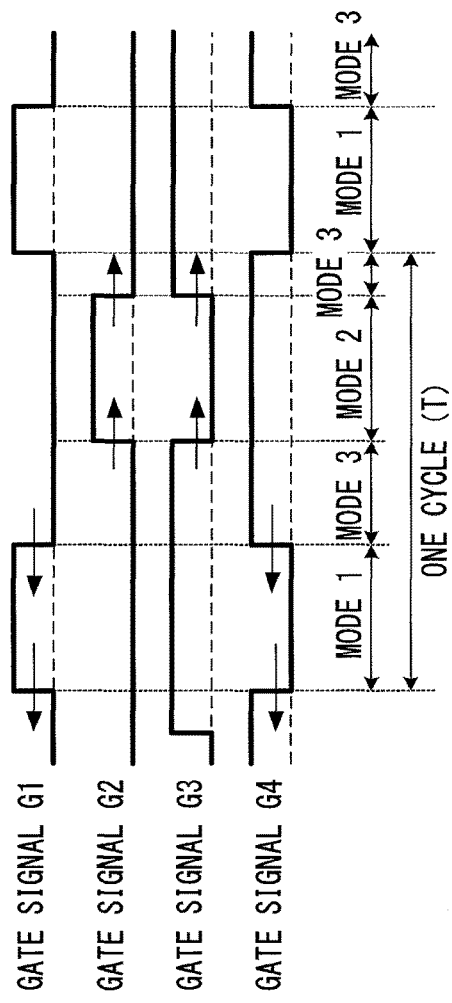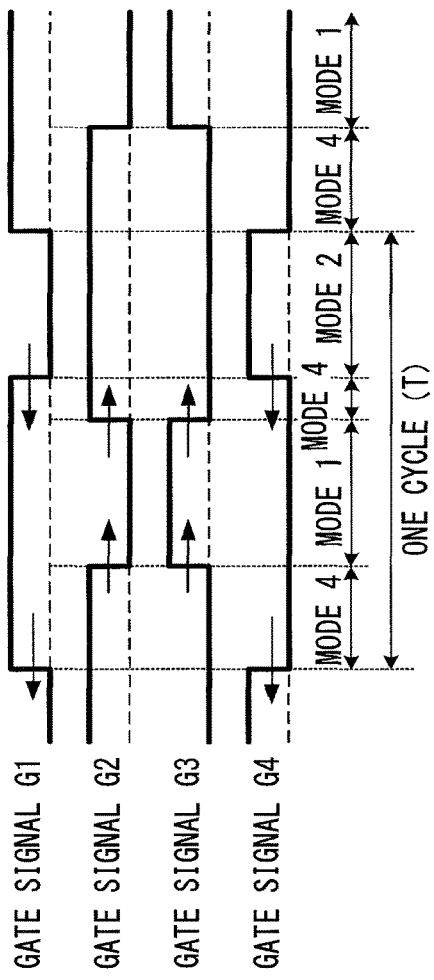
FIG. 33 (a) N < 2    (b) N ≧ 2

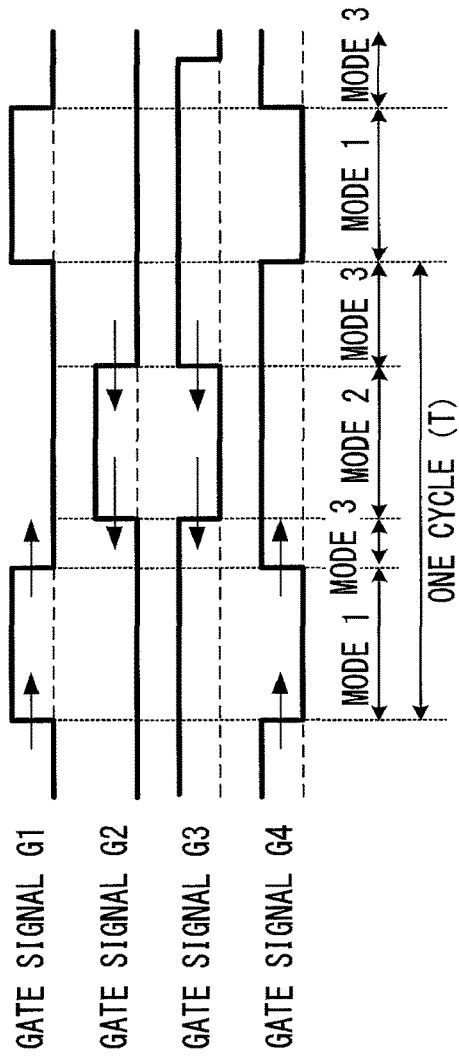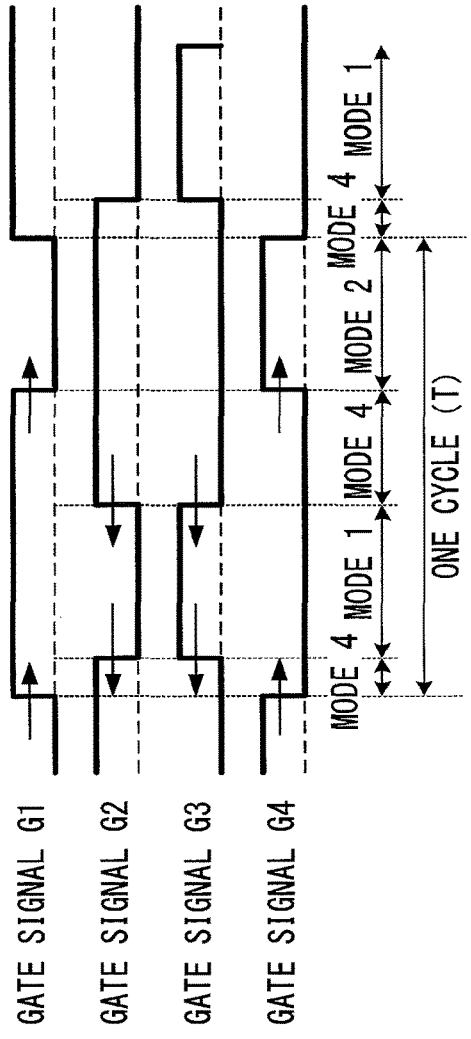
FIG. 34

DC/DC CONVERTER

TECHNICAL FIELD

The present invention relates to a DC/DC converter.

BACKGROUND ART

One of conventional DC/DC converters controls the amount of energy accumulated into a reactor and the amount of energy released from the reactor, using ON/OFF operation of a semiconductor switch, and performs voltage conversion from DC to DC. Since there is a problem that the reactor is large and heavy, there is known a technique of reducing voltage applied to the reactor by using charging and discharging of a capacitor, and reducing the inductance value required for the reactor, thereby reducing the size and the weight of the reactor.

One of such DC/DC converters includes a terminal group, a reactor, a switching element series circuit, a charge/discharge capacitor, a smoothing capacitor, and a control device, wherein the terminal group includes first to fourth terminals, the switching element series circuit has first to fourth switching elements connected in series, the connection point of the second and third switching elements is connected to the first terminal via the reactor, a side of the first switching element opposite to its connection point with the second switching element is connected to the second terminal, the charge/discharge capacitor is connected between the connection point of the first and second switching elements and the connection point of the third and fourth switching elements, the smoothing capacitor is connected in parallel to the switching element series circuit, the switching element series circuit is connected to the third and fourth terminals, the first and second terminals are set to be on a low-voltage side, the third and fourth terminals are set to be on a high-voltage side, and DC voltage conversion is performed between the low-voltage side and the high-voltage side.

The control device includes first calculation means, second calculation means, and open/close control means. The first calculation means calculates a first calculation value on the basis of difference voltage between a high-voltage-side voltage command value which is a voltage command value for the high-voltage side and a high-voltage-side voltage detection value which is a detected value of voltage on the high-voltage side, or difference voltage between a low-voltage-side voltage command value which is a voltage command value for the low-voltage side and a low-voltage-side voltage detection value which is a detected value of voltage on the low-voltage side. The second calculation means calculates a second calculation value on the basis of difference voltage between a voltage command value for the charge/discharge capacitor and a voltage detection value of the charge/discharge capacitor. The open/close control means calculates a current conduction rate on the basis of the first calculation value and the second calculation value, and controls open/close operations of the first to fourth switching elements on the basis of the current conduction rate (see, for example, Patent Document 1).

CITATION LIST

Patent Document

Patent Document 1: International Publication No. WO2012/014912

SUMMARY OF THE INVENTION

Problems to be Solved by the Invention

In the conventional DC/DC converter configured as described above, by the second calculation means for keeping voltage of the charge/discharge capacitor constant, for example, in the case where power is transmitted from the low-voltage side to the high-voltage side, in order to increase voltage of the charge/discharge capacitor, the ON time of the first and third switching elements is made longer than the ON time of the second and fourth switching elements, to make the charge time of the charge/discharge capacitor longer than the discharge time thereof, and conversely, in order to decrease voltage of the charge/discharge capacitor, the ON time of the first and third switching elements is made shorter than the ON time of the second and fourth switching elements, to make the discharge time of the charge/discharge capacitor longer than the charge time thereof.

On the other hand, in the case where power is transmitted from the high-voltage side to the low-voltage side, in order to increase voltage of the charge/discharge capacitor, the ON time of the first and third switching elements is made shorter than the ON time of the second and fourth switching elements, and conversely, in order to decrease voltage of the charge/discharge capacitor, the ON time of the first and third switching elements is made longer than the ON time of the second and fourth switching elements.

Therefore, it is necessary to switch, in principle, the increase/decrease polarity of the ON time of the first and third switching elements and the increase/decrease polarity of the ON time of the second and fourth switching elements in accordance with the direction of power transmission between the low-voltage side and the high-voltage side.

The direction of power transmission between the low-voltage side and the high-voltage side is determined using a detector of current flowing through the reactor. However, current flowing through the reactor contains a ripple component, and under a low load, the polarity of the reactor current switches across the zero point. Therefore, it is impossible to instantaneously determine the power transmission direction correctly. In addition, if the reactor current is averagely detected, certain detection delay occurs, and therefore, in the case where, for example, the power transmission direction switches within a short period, it is impossible to instantaneously determine the power transmission direction correctly.

If the power transmission direction is erroneously determined as described above, the polarity of voltage control of the charge/discharge capacitor is inverted and therefore the increase/decrease polarity of voltage of the charge/discharge capacitor is also inverted, so that voltage of the charge/discharge capacitor might deviate from the command value. As a result, overvoltage might be applied to the first to fourth switching elements. In addition, the DC/DC converter is stopped by voltage abnormality protection operation and thus reliability of the DC/DC converter is deteriorated.

The present invention has been made to solve the above problem, and an object of the present invention is to provide a DC/DC converter capable of performing, irrespective of the direction of power transmission between the low-voltage side and the high-voltage side, voltage control of the charge/discharge capacitor without changing the polarity of voltage control of the charge/discharge capacitor when increasing voltage of the charge/discharge capacitor, and without changing the polarity of voltage control of the charge/ discharge capacitor also when decreasing voltage of the charge/discharge capacitor, thereby enabling more stable control of voltage of the charge/discharge capacitor irrespective of whether the power-running operation or the regeneration operation is performed.

Solution to the Problems

A DC/DC converter according to the present invention includes:

a terminal group including a first terminal and a second terminal on a low-voltage side, and a third terminal and a fourth terminal on a high-voltage side;

a first smoothing capacitor connected between the first terminal and the second terminal;

a second smoothing capacitor connected between the third terminal and the fourth terminal;

a switching element series circuit which includes a first switching element, a second switching element, a third switching element, and a fourth switching element connected in series in this order, and in which a connection point of the second and third switching elements is connected to the first terminal via a reactor, a terminal of the fourth switching element on a side opposite to a connection point of the third switching element and the fourth switching element is connected to the third terminal, and a terminal of the first switching element on a side opposite to a connection point of the first switching element and the second switching element is connected to the second terminal and the fourth terminal;

a charge/discharge capacitor connected between the connection point of the first and second switching elements and the connection point of the third and fourth switching elements; and a control device for generating gate signals for driving the first, second, third, and fourth switching elements such that the gate signals for the first switching element and the fourth switching element have a complementary relationship, and the gate signals for the second switching element and the third switching element have a complementary relationship, the DC/DC converter performing conversion of DC voltage between: the first terminal and the second terminal on the low-voltage side; and the third terminal and the fourth terminal on the high-voltage side, wherein the control device includes: a duty command calculation unit for calculating duty command values for the first, second, third, and fourth switching elements on the basis of difference voltage between a high-voltage-side voltage command value which is a voltage command value for the high-voltage side, and a high-voltage-side voltage detection value which is a voltage detection value on the high-voltage side; and a phase shift duty command calculation unit for calculating a phase shift duty command value corresponding to a phase difference between the gate signals for the first and fourth switching elements and the gate signals for the second and third switching elements, on the basis of difference voltage between a voltage target value for the charge/discharge capacitor and a voltage detection value of the charge/discharge capacitor, and the control device generates the gate signals for driving the first, second, third, and fourth switching elements, on the basis of the duty command values and the phase shift duty command value.

Effect of the Invention

In the DC/DC converter of the present invention, by shifting the phases of the gate signals for the second and third switching elements so as to lead relative to the phases of the gate signals for the first and fourth switching elements, irrespective of the power transmission direction, the amount of current flowing into the charge/discharge capacitor during the charge period is increased as compared to the amount of current flowing out therefrom during the discharge period, whereby voltage of the charge/discharge capacitor can be increased, and by shifting the phases of the gate signals for the second and third switching elements so as to lag relative to the phases of the gate signals for the first and fourth switching elements, irrespective of the power transmission direction, the amount of current flowing into the charge/discharge capacitor during the charge period is decreased as compared to the amount of current flowing out therefrom during the discharge period, whereby voltage of the charge/discharge capacitor can be decreased.

Thus, irrespective of the direction of power transmission between the low-voltage side and the high-voltage side, the polarity of voltage control of the charge/discharge capacitor and the increase/decrease polarity of voltage of the charge/discharge capacitor can be kept in a predetermined relationship. Therefore, it is possible to more stably control voltage of the charge/discharge capacitor without determining whether power-running operation or regeneration operation is performed, thereby further enhancing reliability of voltage control of the charge/discharge capacitor.

BRIEF DESCRIPTION OF THE DRAWINGS

FIG. 33 is a diagram illustrating an operation principle of a DC/DC converter according to embodiment 2 of the present invention.

FIG. 34 is a diagram illustrating an operation principle of the DC/DC converter according to embodiment 2 of the present invention.

DESCRIPTION OF EMBODIMENTS

Embodiment 1

Figure 1:
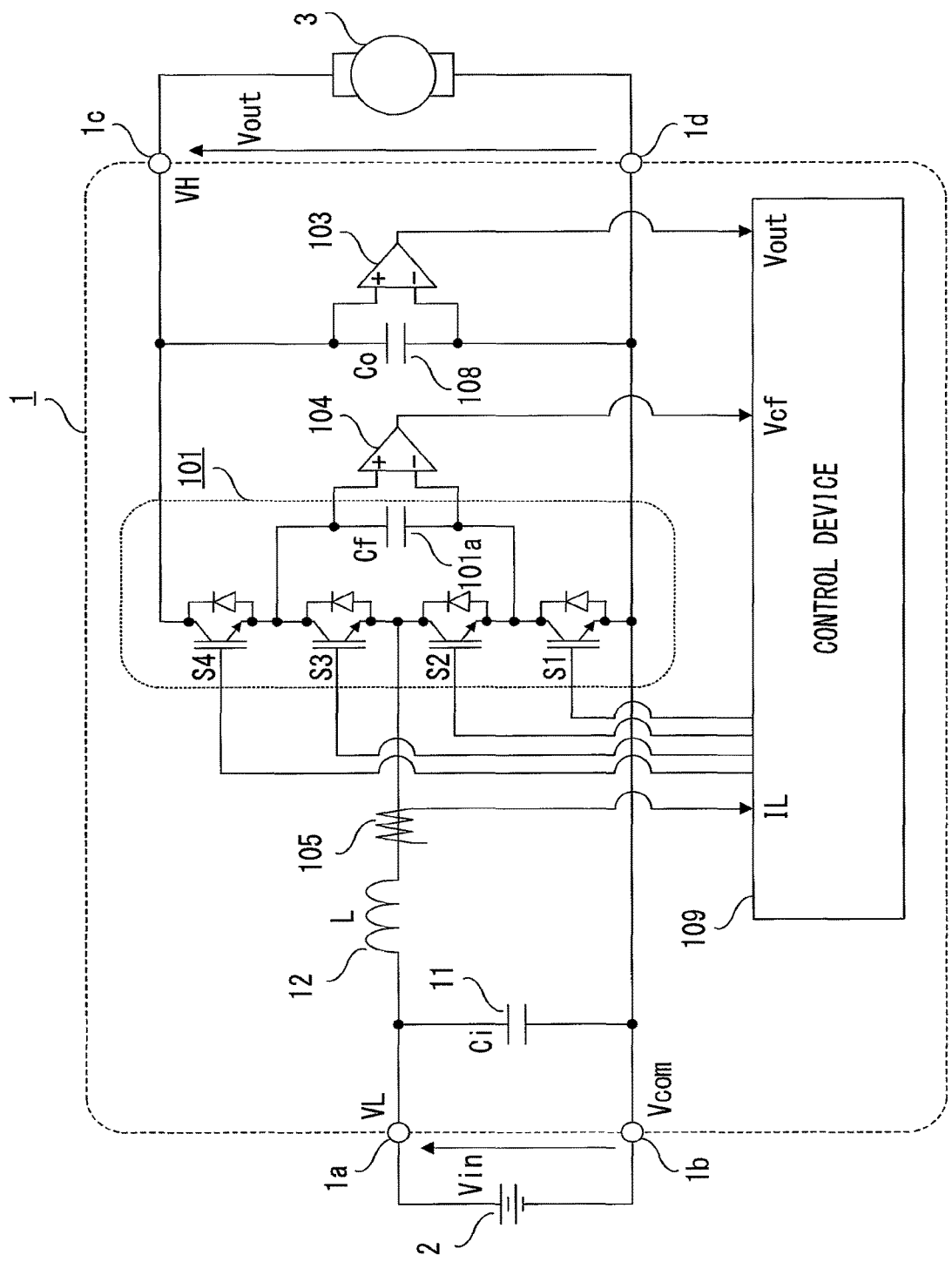
FIG. 1 is a circuit diagram showing the configuration of a DC/DC converter according to embodiment 1 of the present invention.
Figure 2:
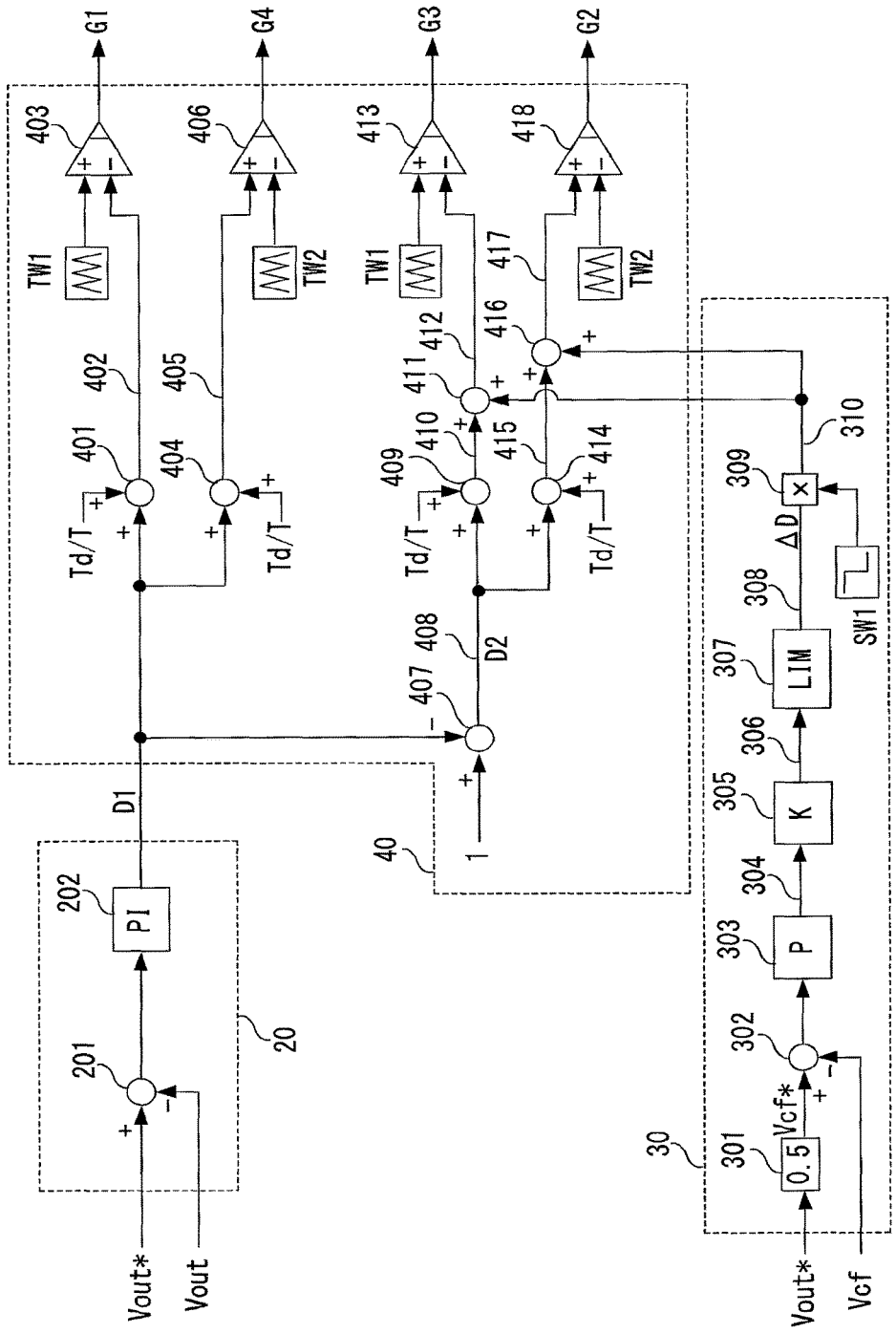
FIG. 2 is a block diagram showing the configuration of a control device in FIG. 1.
Figure 3:
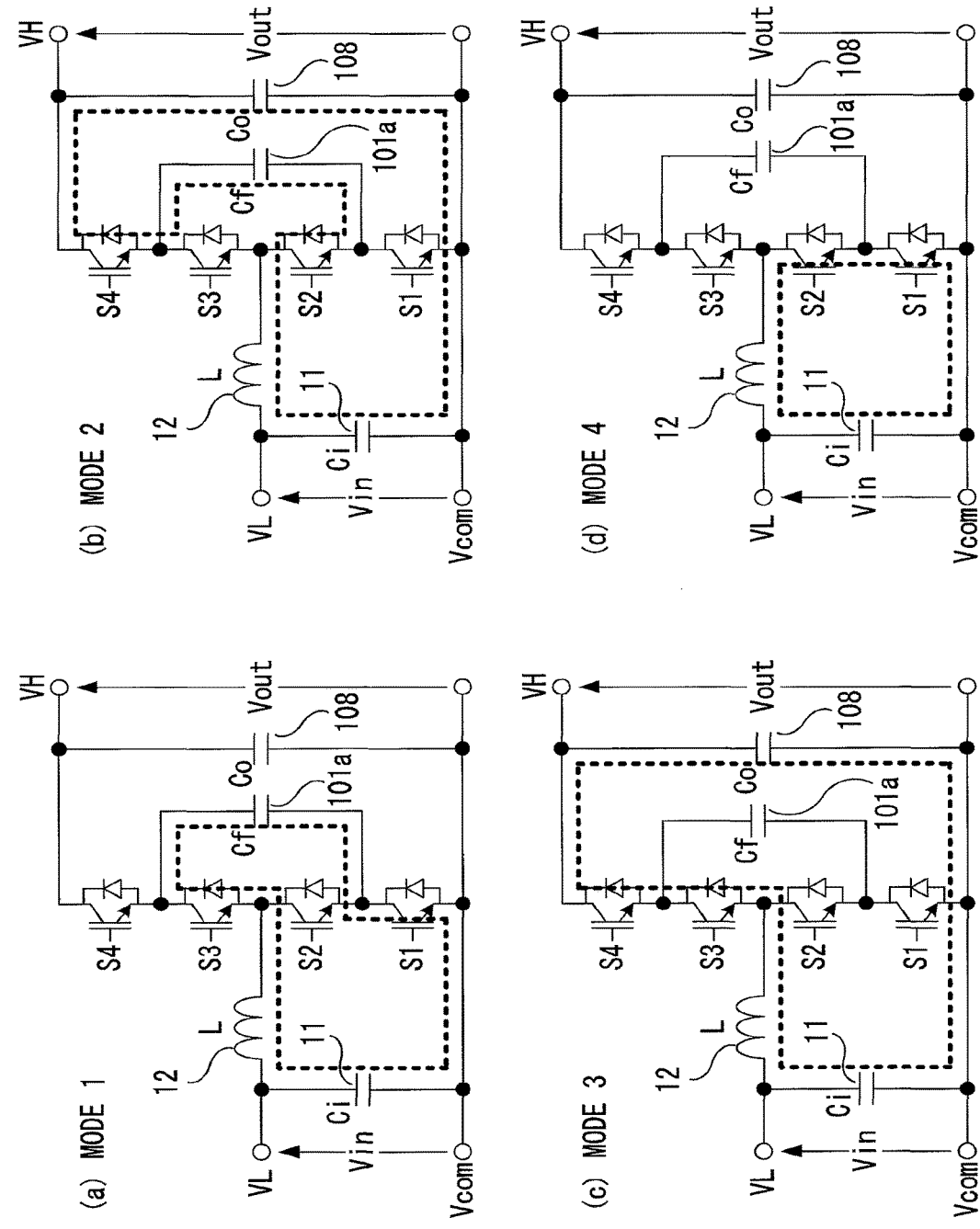
FIG. 3 is a diagram illustrating operation modes of the DC/DC converter in FIG. 1.
Figure 28:
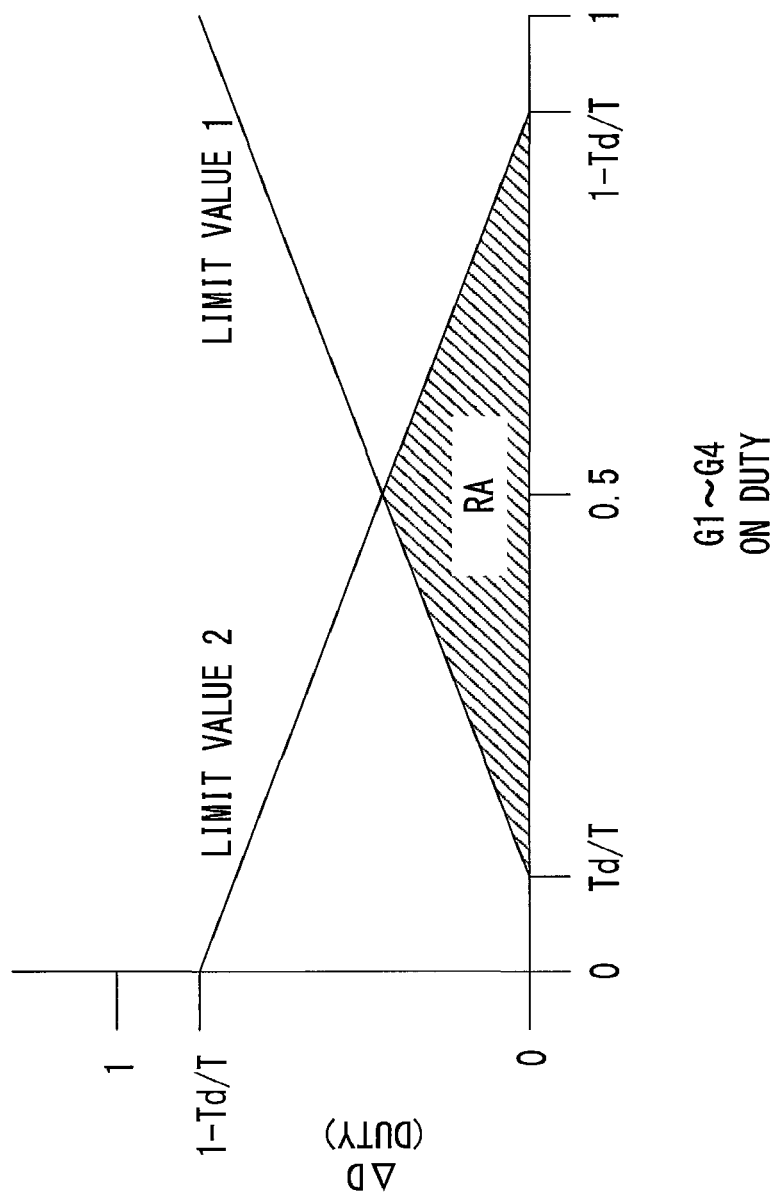
FIG. 28 is a diagram showing an operable range of the DC/DC converter in FIG. 1.
Figure 29:
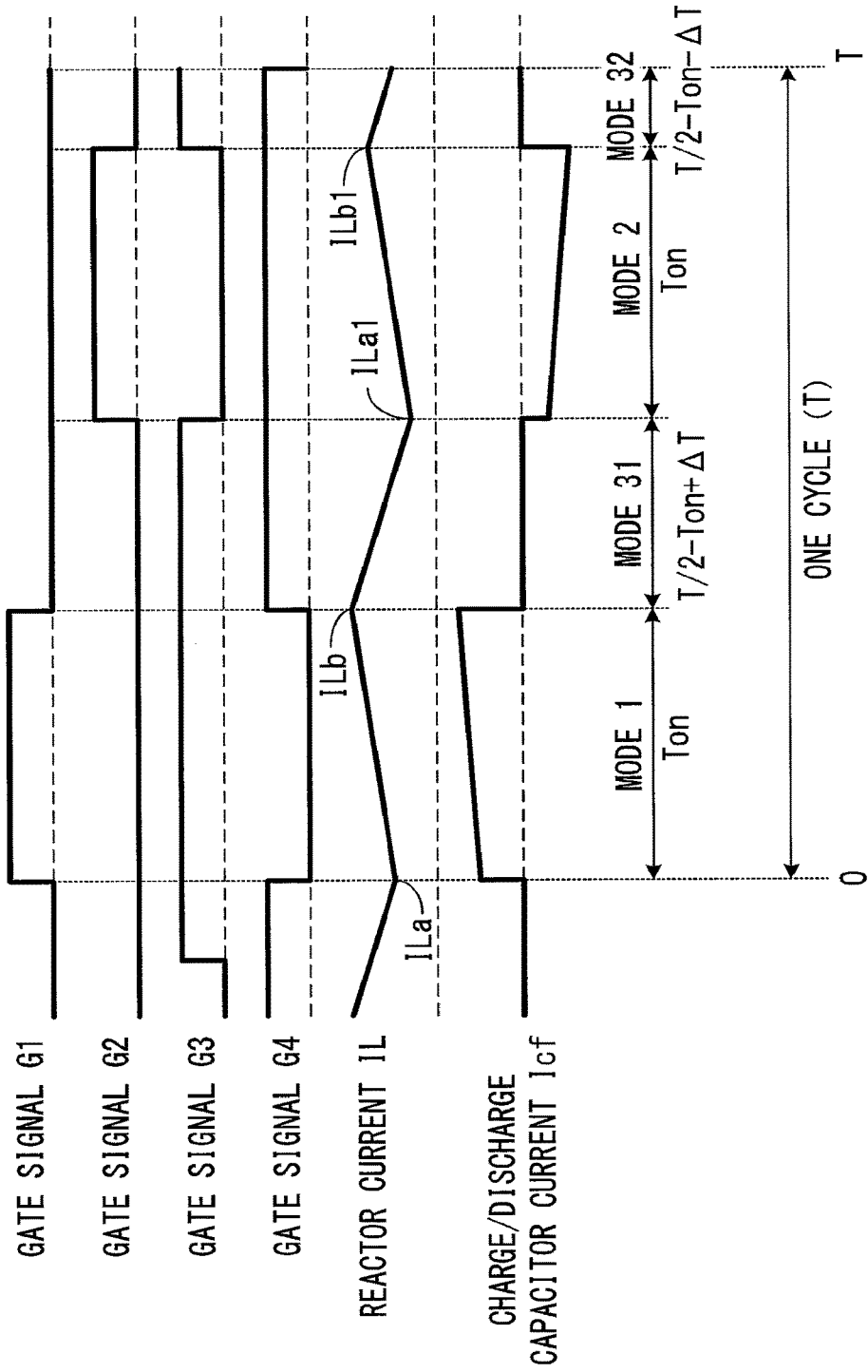
FIG. 29 is a diagram showing operation periods of the DC/DC converter in FIG. 1.
Figure 30:
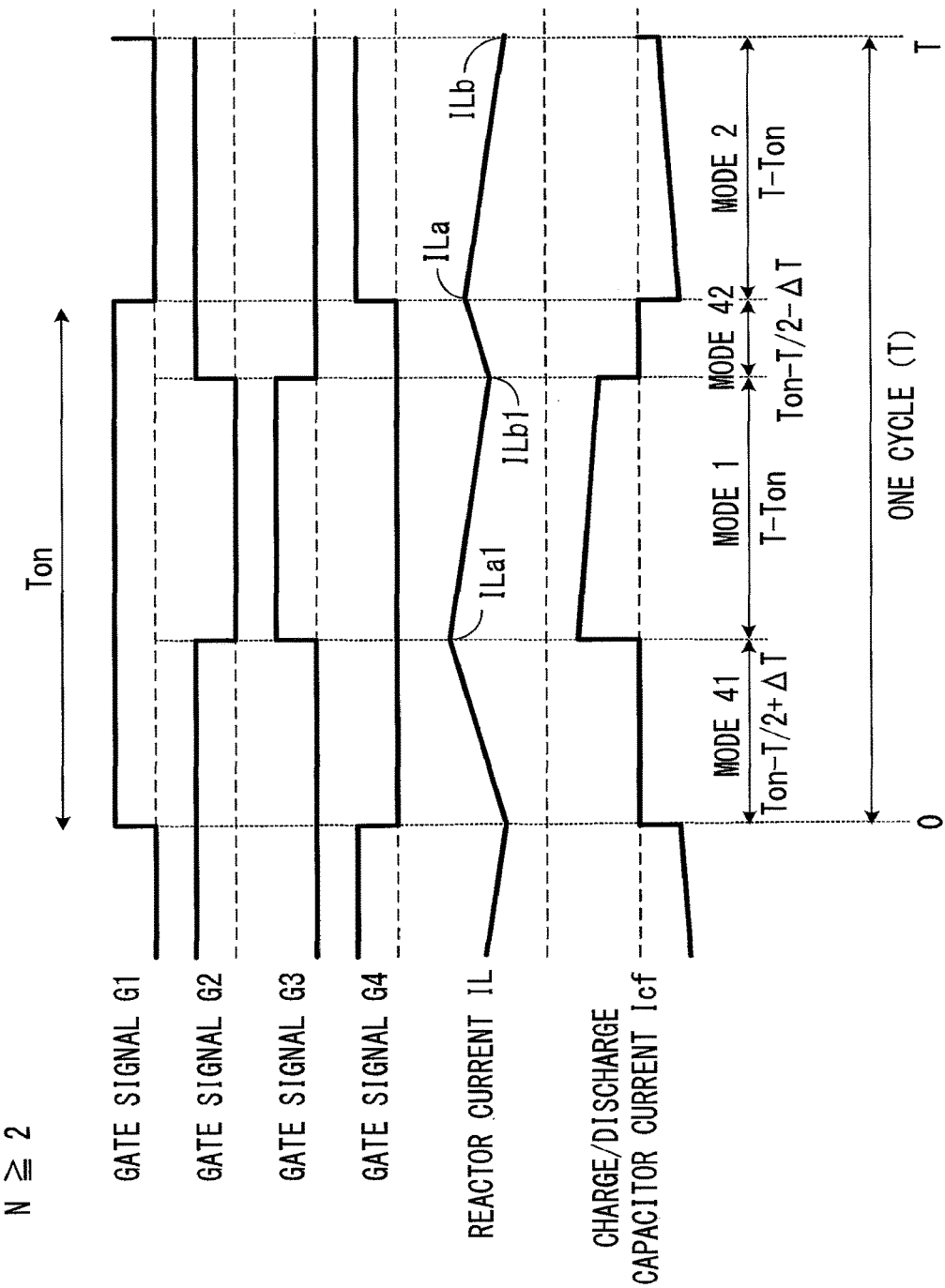
FIG. 30 is a diagram showing operation periods of the DC/DC converter in FIG. 1.
Figure 31:
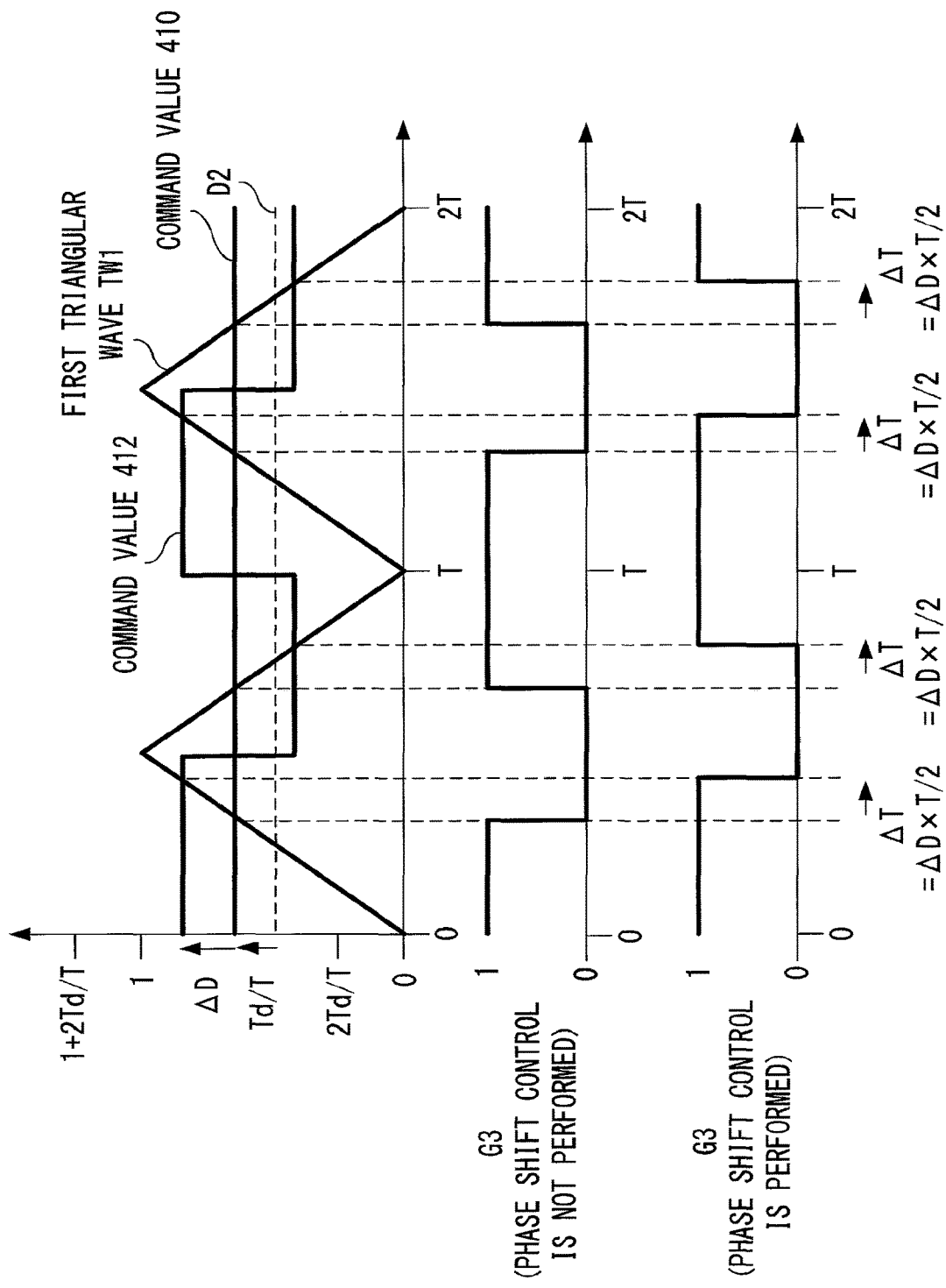
FIG. 31 is a diagram illustrating generation of gate signals of the DC/DC converter in FIG. 1.

Hereinafter, a DC/DC converter according to embodiment 1 of the present invention will be described with reference to the drawings. FIG. 1 is a circuit diagram showing the configuration of the DC/DC converter in embodiment 1. FIG. 2 is a block diagram showing the configuration of a control device in FIG. 1. FIG. 3 is a diagram illustrating operation modes of the DC/DC converter in FIG. 1. FIG. 4 to FIG. 23 are diagrams illustrating operation of the DC/DC converter in FIG. 1. FIG. 24 to FIG. 27 are diagrams illustrating generation of gate signals of the DC/DC converter in FIG. 1. FIG. 28 is a diagram showing an operable range of the DC/DC converter in FIG. 1. FIG. 29 and FIG. 30 are diagrams showing operation periods of the DC/DC converter in FIG. 1. FIG. 31 is a diagram illustrating generation of gate signals of the DC/DC converter in FIG. 1.

[1]. Configuration of DC/DC Converter

In FIG. 1, the DC/DC converter 1 includes first, second, third, fourth terminals 1a, 1b, 1c, 1d as a terminal group. The DC/DC converter 1 steps up DC input voltage Vin inputted between the first terminal 1a (VL) and the second terminal 1b (Vcom), to voltage equal to or greater than the input voltage Vin, and outputs the stepped-up output voltage Vout between the third terminal 1c (VH) and the fourth terminal 1d. In FIG. 1, a battery 2 is connected between the first terminal 1a and the second terminal 1b, and an electric motor 3 is connected between the third terminal 1c and the fourth terminal 1d. The DC/DC converter 1 includes a first smoothing capacitor 11 (Ci) on the input side, a reactor 12 (L), a DC voltage conversion unit 101 as a switching element series circuit, a voltage sensor 103, a voltage sensor 104, a current sensor 105, a second smoothing capacitor 108 (Co) on the output side, and a control device 109.

The first smoothing capacitor 11 on the input side as a low-voltage-side capacitor smooths input voltage Vin. The reactor 12 (L) is used for accumulating energy. The DC voltage conversion unit 101 includes four switching elements S1, S2, S3, S4 as first, second, third, fourth switching elements, and a charge/discharge capacitor 101a (Cf), and steps up input voltage Vin to output voltage Vout. As the switching elements S1 to S4 of the DC voltage conversion unit 101, for example, IGBTs (Insulated Gate Bipolar Transistors) are used, and in the present embodiment, each switching element turns on when the gate signal therefor is high. The voltage sensor 103 detects, as high-voltage-side output voltage, inter-terminal voltage of the second smoothing capacitor 108 on the output side as a high-voltage-side capacitor. The voltage sensor 104 detects voltage (charge/discharge capacitor voltage Vcf) of the charge/discharge capacitor 101a included in the DC voltage conversion unit 101. The current sensor 105 detects reactor current IL flowing through the reactor 12. The second smoothing capacitor 108 on the output side smooths the output voltage Vout stepped up by the DC voltage conversion unit 101.

The control device 109 receives detection values of the voltage sensor 103, the voltage sensor 104, and the current sensor 105, and generates gate signals for the four switching elements S1, S2, S3, S4, to cause the four switching elements S1, S2, S3, S4 of the DC voltage conversion unit 101 to perform ON/OFF operations.

The first smoothing capacitor 11 on the input side has one terminal connected to the first terminal 1a, and another terminal connected to the second terminal 1b. The second smoothing capacitor 108 on the output side has one terminal connected to the third terminal 1c, and another terminal connected to the fourth terminal 1d. The second terminal 1b and the fourth terminal 1d are connected in common. The four switching elements S1, S2, S3, S4 of the DC voltage conversion unit 101 are connected in series. That is, the emitter terminal of the first switching element S1 is connected to the second terminal 1b, the collector terminal of the first switching element S1 is connected to the emitter terminal of the second switching element S2, the collector terminal of the fourth switching element S4 is connected to the third terminal 1c, the emitter terminal of the fourth switching element S4 is connected to the collector terminal of the third switching element S3, and the connection point of the collector terminal of the second switching element S2 and the emitter terminal of the third switching element S3 is connected to the first terminal 1a via the reactor 12. The charge/discharge capacitor 101a has a first terminal connected to the connection point of the collector terminal of the first switching element S1 and the emitter terminal of the second switching element S2, and a second terminal connected to the connection point of the collector terminal of the third switching element S3 and the emitter terminal of the fourth switching element S4.

The DC/DC converter 1 of the present embodiment is used as, for example, a power supply for automobile. That is, in the present embodiment, the first terminal 1a and the second terminal 1b on the low-voltage side of the DC/DC converter 1 are connected to the battery 2 or a storage battery, and the third terminal 1c and the fourth terminal 1d on the high-voltage side of the DC/DC converter 1 are connected to the motor 3 via a motor drive inverter (not shown). The present embodiment assumes such usage that bidirectional power transmission is performed between the motor 3 and the battery 2.

In this case, power transmission from the low-voltage side to the high-voltage side is defined as power-running operation for transmitting power of the battery 2 to the motor drive inverter to drive the motor 3, and power transmission from the high-voltage side to the low-voltage side is defined as regeneration operation for charging the battery 2 via the motor drive inverter with power generated by the motor 3.

[2]. Configuration of Control Device of DC/DC Converter

FIG. 2 is a control block diagram showing the detailed configuration of the control device 109. In FIG. 2, the control device 109 includes a first control block 20, a second control block 30, and a third control block 40.

The first control block 20 is a control block for causing the output voltage detection value Vout as the high-voltage-side voltage detection value to follow an output voltage target value Vout* as a high-voltage-side voltage command value, and includes a subtractor 201 and a controller 202.

The second control block 30 is a control block for causing the voltage detection value Vcf of the charge/discharge capacitor 101a to follow a voltage target value Vcf* for the charge/discharge capacitor 101a, and includes a multiplier 301, a subtractor 302, a controller 303, a converter 305, a limiter 307, and a multiplier 309.

The third control block 40 is a block for calculating a gate signal G1 for the first switching element S1, a gate signal G2 for the second switching element S2, a gate signal G3 for the third switching element S3, and a gate signal G4 for the fourth switching element S4 in accordance with duty command values calculated by the first control block 20 and the second control block 30, and includes an adder 401, a comparator 403, an adder 404, a comparator 406, a subtractor 407, an adder 409, an adder 411, a comparator 413, an adder 414, an adder 416, and a comparator 418.

Here, the first control block 20, and the adder 401, the adder 404, the subtractor 407, the adder 409, and the adder 414 of the third control block 40, correspond to a duty command calculation unit in claims. The second control block 30 corresponds to a phase shift duty command calculation unit in claims.

In the first control block 20, the output voltage target value Vout* and the output voltage detection value Vout detected by the voltage sensor 103 are inputted to the subtractor 201, and difference voltage ΔVout therebetween is inputted to the controller 202.

In the second control block 30, the high-voltage-side voltage command value Vout* is multiplied by 0.5 by the multiplier 301 with a constant set at 0.5, and the resultant value is outputted as a charge/discharge capacitor voltage target value Vcf* to the subtractor 302. The subtractor 302 receives charge/discharge capacitor voltage Vcf which is a voltage detection value of the charge/discharge capacitor 101a detected by the voltage sensor 104, and calculates difference voltage ΔVcf between the charge/discharge capacitor voltage Vcf and the charge/discharge capacitor voltage target value Vcf*, and the difference voltage ΔVcf is inputted to the controller 303. In the present embodiment, in order to minimize ripple current of the reactor 12, the charge/discharge capacitor voltage target value Vcf* is set to ½ (0.5 times) of the output voltage Vout as described above.

In the first control block 20, the controller 202 multiplies the difference voltage ΔVout between the output voltage target value Vout* and the output voltage detection value Vout by a gain, to calculate a duty command value (ON duty command value) D1.

In the second control block 30, the controller 303 multiplies the difference voltage ΔVcf between the voltage detection value Vcf of the charge/discharge capacitor and the voltage target value Vcf* for the charge/discharge capacitor by a gain, to calculate a current command value 304. Next, the converter 305 receives the current command value 304 and multiplies the same by a conversion coefficient K, thereby converting the current command value 304 to a phase shift duty command value 306. Next, the limiter 307 receives the phase shift duty command value 306 and calculates a phase shift duty command value 308 (ΔD). Further, the multiplier 309 multiplies the phase shift duty command value 308 by a first square wave SW1, to calculate a phase shift duty command value 310. As described later, the first square wave SW1 has the same frequency as the switching frequency and has amplitude values of +1 and −1.

In the third control block 40, the adder 401 adds a duty amount Td/T corresponding to a dead time, to the duty command value D1, to calculate a duty command value 402. Then, the comparator 403 receives the duty command value 402 and a first triangular wave TW1, and generates the gate signal G1 for the first switching element S1.

In addition, the adder 404 adds the duty amount Td/T corresponding to the dead time, to the duty command value D1, to calculate a duty command value 405. Then, the comparator 406 receives the duty command value 405 and a second triangular wave TW2, and generates the gate signal G4 for the fourth switching element S4.

Further, the subtractor 407 subtracts the duty command value D1 from 1, to calculate a duty command value 408 (D2: ON duty command value). Owing to this calculation, the phase of the gate signals generated from the duty command value D1 and the phase of the gate signals generated from the duty command value D2 can be shifted from each other by 180 degrees.

In order to calculate the gate signal G3 for the third switching element S3, first, the adder 409 adds the duty amount Td/T corresponding to the dead time, to the duty command value D2, to calculate a duty command value 410. Next, the adder 411 adds the phase shift duty command value 310 to the duty command value 410, to calculate the duty command value 412. Then, the comparator 413 receives the duty command value 412 and a first triangular wave TW1, and generates the gate signal G3.

In order to calculate the gate signal G2 for the second switching element S2, first, the adder 414 adds the duty amount Td/T corresponding to the dead time, to the duty command value D2, to calculate a duty command value 415. Next, the adder 416 adds the phase shift duty command value 310 to the duty command value 415, to calculate a duty command value 417. Then, the comparator 418 receives the duty command value 417 and a second triangular wave TW2, and generates the gate signal G2.

The first triangular wave TW1 in the third control block 40 has the same frequency as the switching frequency and has an amplitude value of 0 to 1. The second triangular wave TW2 has the same frequency as the switching frequency and has an amplitude value of 0+(2 Td/T) to 1+(2 Td/T). The phases of the first triangular wave TW1 and the second triangular wave TW2 are synchronized with each other.

[3]. Operation of DC/DC Converter in Steady State

Next, operation of the DC/DC converter 1 in a steady state will be described. The steady state refers to a state in which output voltage is stably obtained through ON/OFF control of the four switching elements S1, S2, S3, S4. Operation states of the DC/DC converter 1 include two states of a state in which power is supplied from the battery 2 to the electric motor 3 and thereby the electric motor 3 is driven (power-running operation), and a state in which power generated by the electric motor 3 in an electric generation state is supplied to the battery 2 (regeneration operation).

As shown in FIG. 3, operation modes of the DC/DC converter in a steady state include four modes 1, 2, 3, 4.

As shown in FIG. 3(a), in the mode 1, the first switching element S1 and the third switching element S3 are turned on, and the second switching element S2 and the fourth switching element S4 are turned off. In power-running operation, energy is accumulated in the charge/discharge capacitor 101a, and in regeneration operation, energy of the charge/discharge capacitor 101a is released.

As shown in FIG. 3(b), in the mode 2, the first switching element S1 and the third switching element S3 are turned off, and the second switching element S2 and the fourth switching element S4 are turned on. In power-running operation, energy of the charge/discharge capacitor 101a is released, and in regeneration operation, energy is accumulated in the charge/discharge capacitor 101a.

As shown in FIG. 3(c), in the mode 3, the first switching element S1 and the second switching element S2 are turned off, and the third switching element S3 and the fourth switching element S4 are turned on. In power-running operation, energy of the reactor 12 is released, and in regeneration operation, energy is accumulated in the reactor 12.

As shown in FIG. 3(d), in the mode 4, the first switching element S1 and the second switching element S2 are turned on, and the third switching element S3 and the fourth switching element S4 are turned off. In power-running operation, energy is accumulated in the reactor 12, and in regeneration operation, energy of the reactor 12 is released.

By adjusting the time ratio of these operation modes as appropriate, input voltage Vin which is the low-voltage-side voltage inputted between the first terminal 1a and the second terminal 1b can be stepped up to arbitrary voltage, and the stepped-up voltage can be outputted as output voltage Vout between the third terminal 1c and the fourth terminal 1d.

Operation in a steady state of the DC/DC converter 1 of embodiment 1 is different between the case where a step-up ratio N of output voltage Vout to input voltage Vin is smaller than two, and the case where the step-up ratio N is equal to or greater than two.

(a) Step-up Ratio N is Smaller than Two, in Power-running State

First, operation in a power-running state in the case where the step-up ratio N is smaller than two will be described.

Figure 4:
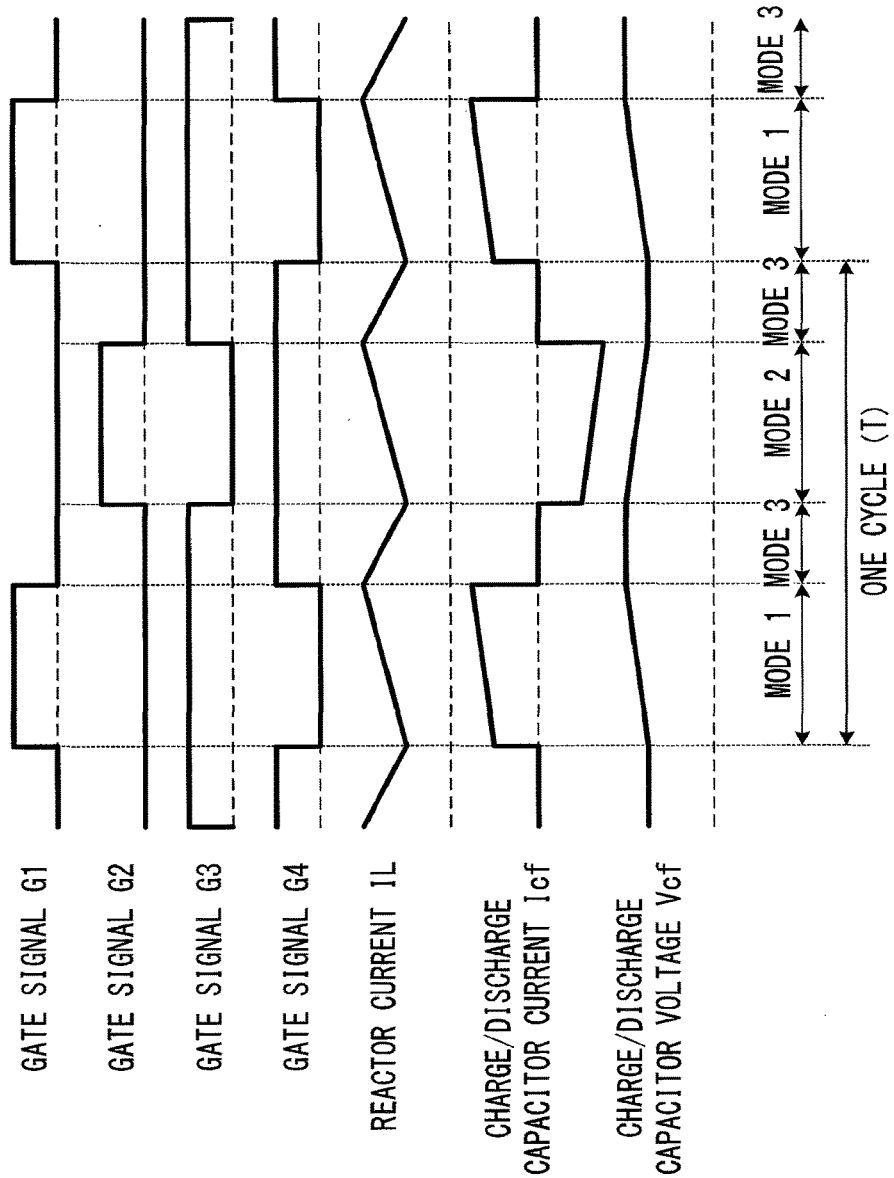
FIG. 4 is a diagram illustrating operation of the DC/DC converter in FIG. 1.

FIG. 4 shows gate signal voltage waveforms of the switching elements S1, S2, S3, S4, a reactor current waveform IL, a current waveform Icf of the charge/discharge capacitor 101a, and inter-terminal voltage Vcf of the charge/discharge capacitor 101a, in the case where the step-up ratio N is smaller than two. In FIG. 4, the gate signals for the switching elements S1, S2, S3, S4 are described with their dead times all omitted. In a steady state, inter-terminal voltage Vcf of the charge/discharge capacitor 101a is controlled to be about ½ of output voltage Vout, and the magnitude relationship among input voltage Vin, output voltage Vout, and inter-terminal voltage Vcf of the charge/discharge capacitor 101a is as follows.

Vout>Vin>Vcf

In a state in which the gate signals for the first switching element S1 and the third switching element S3 are high and the gate signals for the second switching element S2 and the fourth switching element S4 are low (mode 1 (FIG. 3(a))), the first switching element S1 and the third switching element S3 are turned on, and the second switching element S2 and the fourth switching element S4 are turned off. Therefore, energy is transferred from the first smoothing capacitor 11 to the reactor 12 and the charge/discharge capacitor 101a through the following route.

First smoothing capacitor 11 (Ci)→reactor 12 (L)→third switching element S3→charge/discharge capacitor 101a (Cf)→first switching element S1

Next, in a state in which the gate signals for the first switching element S1 and the second switching element S2 are low and the gate signals for the third switching element S3 and the fourth switching element S4 are high (mode 3 (FIG. 3(c))), the first switching element S1 and the second switching element S2 are turned off, and the third switching element S3 and the fourth switching element S4 are turned on. Therefore, energy accumulated in the reactor 12 is transferred to the first smoothing capacitor 11 and the second smoothing capacitor 108 through the following route.

First smoothing capacitor 11 (Ci)→reactor 12 (L)→third switching element S3→fourth switching element S4→second smoothing capacitor 108 (Co)

Next, in a state in which the gate signals for the first switching element S1 and the third switching element S3 are low and the gate signals for the second switching element S2 and the fourth switching element S4 are high (mode 2 (FIG. 3(b))), the first switching element S1 and the third switching element S3 are turned off, and the second switching element S2 and the fourth switching element S4 are turned on. Therefore, energy accumulated in the charge/discharge capacitor 101a is transferred to the first smoothing capacitor 11 and the second smoothing capacitor 108, and energy is accumulated in the reactor 12, through the following route.

First smoothing capacitor 11 (Ci)→reactor 12 (L)→second switching element S2→charge/discharge capacitor 101a (Cf)→fourth switching element S4→second smoothing capacitor 108 (Co)

Next, in a state in which the gate signals for the first switching element S1 and the second switching element S2 are low and the gate signals for the third switching element S3 and the fourth switching element S4 are high (mode 3 (FIG. 3(c))), the first switching element S1 and the second switching element S2 are turned off, and the third switching element S3 and the fourth switching element S4 are turned on. Therefore, energy accumulated in the reactor 12 is transferred to the first smoothing capacitor 11 and the second smoothing capacitor 108 through the following route.

First smoothing capacitor 11 (Ci)→reactor 12 (L)→third switching element S3→fourth switching element S4→second smoothing capacitor 108 (Co)

Through repetition of this series of operations "mode 1-mode 3-mode 2-mode 3", input voltage Vin inputted between the terminal 1a and the terminal 1b is stepped up to arbitrary voltage from once to less than twice the original voltage, and the stepped-up voltage is outputted as output voltage Vout between the terminal 1c and the terminal 1b, while energy of the battery 2 is supplied to the electric motor 3.

(b) Step-up Ratio N is Equal to or Greater than Two, in Power-running State

Next, operation in a power-running state in the case where the step-up ratio N is equal to or greater than two will be described.

Figure 5:
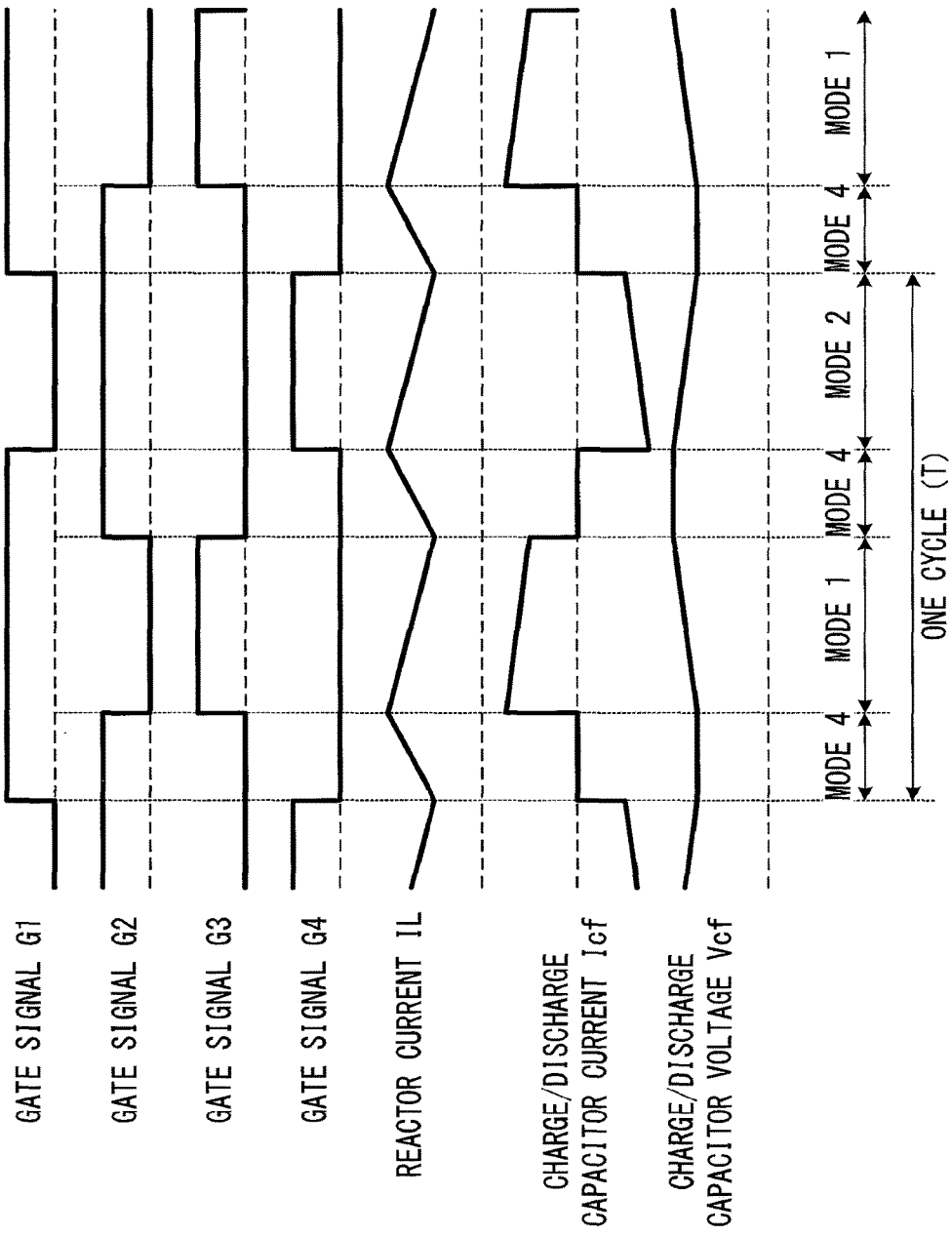
FIG. 5 is a diagram illustrating operation of the DC/DC converter in FIG. 1.

FIG. 5 shows gate signal voltage waveforms of the switching elements S1, S2, S3, S4, a reactor current waveform IL, a current waveform Icf of the charge/discharge capacitor 101a, and inter-terminal voltage Vcf of the charge/discharge capacitor 101a, in the case where the step-up ratio N is equal to or greater than two. In FIG. 5, the gate signals for the switching elements S1, S2, S3, S4 are described with their dead times all omitted. In a steady state, inter-terminal voltage Vcf of the charge/discharge capacitor 101a is controlled to be about ½ of output voltage Vout, and the magnitude relationship among input voltage Vin, output voltage Vout, and inter-terminal voltage Vcf of the charge/discharge capacitor 101a is as follows.

Vout>Vcf>Vin

In a state in which the gate signals for the first switching element S1 and the second switching element S2 are high and the gate signals for the third switching element S3 and the fourth switching element S4 are low (mode 4 (FIG. 3(d))), the first switching element S1 and the second switching element S2 are turned on, and the third switching element S3 and the fourth switching element S4 are turned off. Therefore, energy is transferred from the first smoothing capacitor 11 to the reactor 12 through the following route.

First smoothing capacitor 11 (Ci)→reactor 12 (L)→second switching element S2→first switching element S1

Next, in a state in which the gate signals for the first switching element S1 and the third switching element S3 are high and the gate signals for the second switching element S2 and the fourth switching element S4 are low (mode 1 (FIG. 3(a))), the first switching element S1 and the third switching element S3 are turned on, and the second switching element S2 and the fourth switching element S4 are turned off. Therefore, energy accumulated in the reactor 12 is transferred to the first smoothing capacitor 11 and the charge/discharge capacitor 101a through the following route.

First smoothing capacitor 11 (Ci)→reactor 12 (L)→third switching element S3→charge/discharge capacitor 101a (Cf)→first switching element S1

Next, in a state in which the gate signals for the first switching element S1 and the second switching element S2 are high and the gate signals for the third switching element S3 and the fourth switching element S4 are low (mode 4 (FIG. 3(d))), the first switching element S1 and the second switching element S2 are turned on, and the third switching element S3 and the fourth switching element S4 are turned off. Therefore, energy is transferred from the first smoothing capacitor 11 to the reactor 12 through the following route.

First smoothing capacitor 11 (Ci)→reactor 12 (L)→second switching element S2→first switching element S1

Next, in a state in which the gate signals for the first switching element S1 and the third switching element S3 are low and the gate signals for the second switching element S2 and the fourth switching element S4 are high (mode 2 (FIG. 3(b))), the first switching element S1 and the third switching element S3 are turned off, and the second switching element S2 and the fourth switching element S4 are turned on. Therefore, energy accumulated in the reactor 12 and the charge/discharge capacitor 101a is transferred to the first smoothing capacitor 11 and the second smoothing capacitor 108 through the following route.

First smoothing capacitor 11 (Ci)→reactor 12 (L)→second switching element S2→charge/discharge capacitor 101a (Cf)→fourth switching element S4→second smoothing capacitor 108 (Co)

Through repetition of this series of operations "mode 4-mode 1-mode 4-mode 2", input voltage Vin inputted between the terminal 1a and the terminal 1b is stepped up to arbitrary voltage equal to or greater than twice the original voltage, and the stepped-up voltage is outputted as output voltage Vout between the terminal 1c and the terminal 1b, while energy of the battery 2 is supplied to the electric motor 3.

(c) Step-up Ratio N is Smaller than Two, in Regeneration State

Next, operation in a regeneration state in the case where the step-up ratio N is smaller than two will be described.

Figure 6:
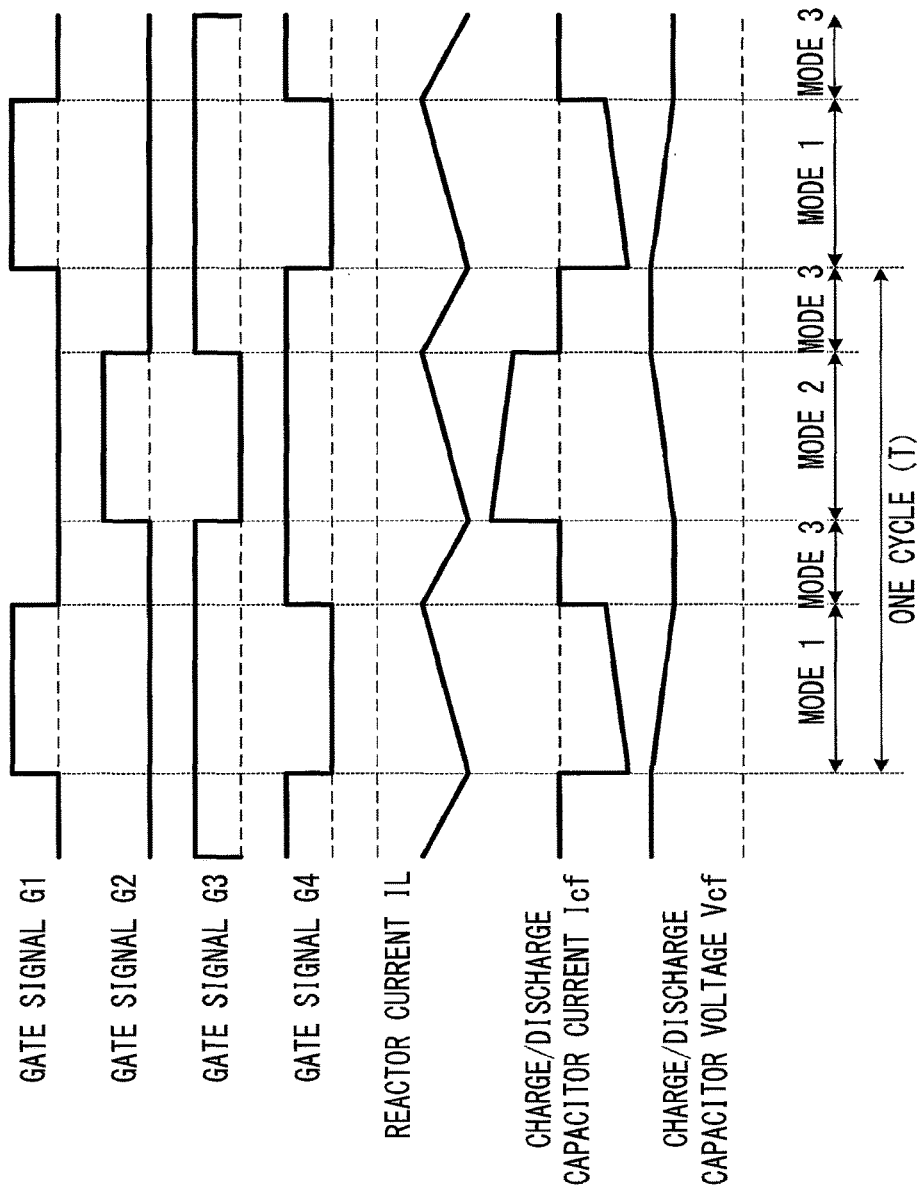
FIG. 6 is a diagram illustrating operation of the DC/DC converter in FIG. 1.

FIG. 6 shows gate signal voltage waveforms of the switching elements S1, S2, S3, S4, a reactor current waveform IL, a current waveform Icf of the charge/discharge capacitor 101a, and inter-terminal voltage Vcf of the charge/discharge capacitor 101a, in the case where the step-up ratio N is smaller than two. In FIG. 6, the gate signals for the switching elements S1, S2, S3, S4 are described with their dead times all omitted. In a steady state, inter-terminal voltage Vcf of the charge/discharge capacitor 101a is controlled to be about ½ of output voltage Vout, and the magnitude relationship among input voltage Vin, output voltage Vout, and inter-terminal voltage Vcf of the charge/discharge capacitor 101a is as follows.

Vout>Vin>Vcf

In a state in which the gate signals for the first switching element S1 and the third switching element S3 are high and the gate signals for the second switching element S2 and the fourth switching element S4 are low (mode 1 (FIG. 3(a))), the first switching element S1 and the third switching element S3 are turned on, and the second switching element S2 and the fourth switching element S4 are turned off. Therefore, energy is transferred from the charge/discharge capacitor 101a and the reactor 12 to the first smoothing capacitor 11 through the following route.

First smoothing capacitor 11 (Ci)←reactor 12 (L)←third switching element S3←charge/discharge capacitor 101a (Cf)←first switching element S1

Next, in a state in which the gate signals for the first switching element S1 and the second switching element S2 are low and the gate signals for the third switching element S3 and the fourth switching element S4 are high (mode 3 (FIG. 3(c))), the first switching element S1 and the second switching element S2 are turned off, and the third switching element S3 and the fourth switching element S4 are turned on. Therefore, energy is transferred from the second smoothing capacitor 108 to the reactor 12 and the first smoothing capacitor 11 through the following route.

First smoothing capacitor 11 (Ci)←reactor 12 (L)←third switching element S3←fourth switching element S4←second smoothing capacitor 108 (Co)

Next, in a state in which the gate signals for the first switching element S1 and the third switching element S3 are low and the gate signals for the second switching element S2 and the fourth switching element S4 are high (mode 2 (FIG. 3(b))), the first switching element S1 and the third switching element S3 are turned off, and the second switching element S2 and the fourth switching element S4 are turned on. Therefore, energy is transferred from the second smoothing capacitor 108 and the reactor 12 to the charge/discharge capacitor 101a and the first smoothing capacitor 11 through the following route.

First smoothing capacitor 11 (Ci)←reactor 12 (L)←second switching element S2←charge/discharge capacitor 101a (Cf)←fourth switching element S4←second smoothing capacitor 108 (Co)

Next, in a state in which the gate signals for the first switching element S1 and the second switching element S2 are low and the gate signals for the third switching element S3 and the fourth switching element S4 are high (mode 3 (FIG. 3(c))), the first switching element S1 and the second switching element S2 are turned off, and the third switching element S3 and the fourth switching element S4 are turned on. Therefore, energy is transferred from the second smoothing capacitor 108 to the reactor 12 and the first smoothing capacitor 11 through the following route.

First smoothing capacitor 11 (Ci)←reactor 12 (L)←third switching element S3←fourth switching element S4←second smoothing capacitor 108 (Co)

Through repetition of this series of operations "mode 1-mode 3-mode 2-mode 3", input voltage Vin inputted between the terminal 1a and the terminal 1b is stepped up to arbitrary voltage from once to less than twice the original voltage, and the stepped-up voltage is outputted as output voltage Vout between the terminal 1c and the terminal 1b, while electric generation energy of the electric motor 3 is accumulated in the battery 2.

(d) Step-up Ratio N is Equal to or Greater than Two, in Regeneration Operation

Next, operation in a regeneration state in the case where the step-up ratio N is equal to or greater than two will be described.

Figure 7:
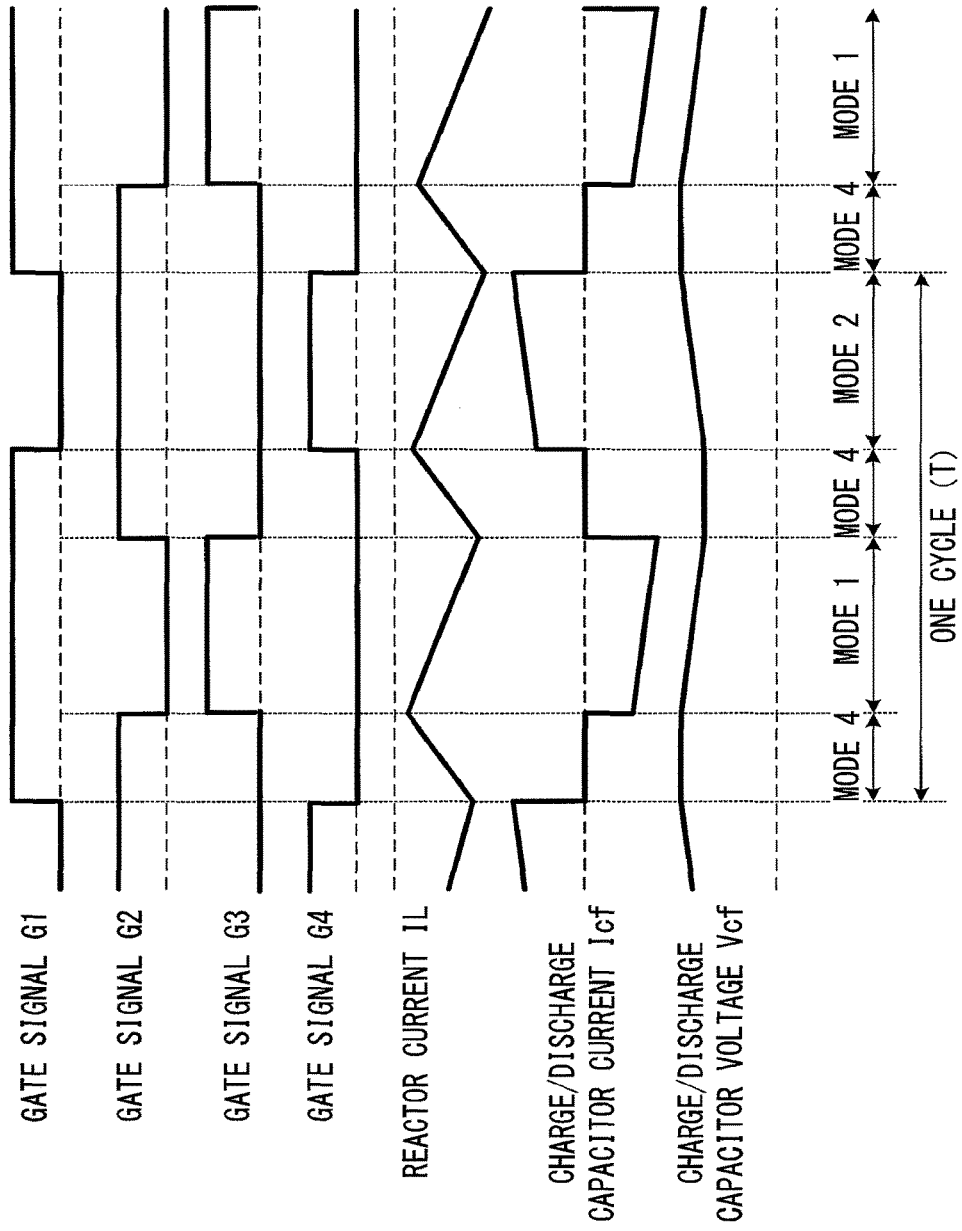
FIG. 7 is a diagram illustrating operation of the DC/DC converter in FIG. 1.

FIG. 7 shows gate signal voltage waveforms of the switching elements S1, S2, S3, S4, a reactor current waveform IL, a current waveform Icf of the charge/discharge capacitor 101a, and inter-terminal voltage Vcf of the charge/discharge capacitor 101a, in regeneration operation in the case where the step-up ratio N is equal to or greater than two. In FIG. 7, the gate signals for the switching elements S1, S2, S3, S4 are described with their dead times all omitted. In a steady state, inter-terminal voltage Vcf of the charge/discharge capacitor 101a is controlled to be about ½ of output voltage Vout, and the magnitude relationship among input voltage Vin, output voltage Vout, and inter-terminal voltage Vcf of the charge/discharge capacitor 101a is as follows.

Vout>Vcf>Vin

In a state in which the gate signals for the first switching element S1 and the second switching element S2 are high and the gate signals for the third switching element S3 and the fourth switching element S4 are low (mode 4 (FIG. 3(d))), the first switching element S1 and the second switching element S2 are turned on, and the third switching element S3 and the fourth switching element S4 are turned off. Therefore, energy is transferred from the reactor 12 to the first smoothing capacitor 11 through the following route.

First smoothing capacitor 11 (Ci)←reactor 12 (L)←second switching element S2←first switching element S1

Next, in a state in which the gate signals for the first switching element S1 and the third switching element S3 are high and the gate signals for the second switching element S2 and the fourth switching element S4 are low (mode 1 (FIG. 3(a))), the first switching element S1 and the third switching element S3 are turned on, and the second switching element S2 and the fourth switching element S4 are turned off. Therefore, energy is transferred from the charge/discharge capacitor 101a to the reactor 12 and the first smoothing capacitor 11 through the following route.

First smoothing capacitor 11 (Ci)←reactor 12 (L)←third switching element S3←charge/discharge capacitor 101a (Cf)←first switching element S1

Next, in a state in which the gate signals for the first switching element S1 and the second switching element S2 are high and the gate signals for the third switching element S3 and the fourth switching element S4 are low (mode 4 (FIG. 3(d))), the first switching element S1 and the second switching element S2 are turned on, and the third switching element S3 and the fourth switching element S4 are turned off. Therefore, energy is transferred from the reactor 12 to the first smoothing capacitor 11 through the following route.

First smoothing capacitor 11 (Ci)←reactor 12 (L)←second switching element S2←first switching element S1

Next, in a state in which the gate signals for the first switching element S1 and the third switching element S3 are low and the gate signals for the second switching element S2 and the fourth switching element S4 are high (mode 2 (FIG. 3(b))), the first switching element S1 and the third switching element S3 are turned off, and the second switching element S2 and the fourth switching element S4 are turned on. Therefore, energy is transferred from the second smoothing capacitor 108 to the reactor 12, the charge/discharge capacitor 101a, and the first smoothing capacitor 11 through the following route.

First smoothing capacitor 11 (Ci)←reactor 12 (L)←second switching element S2←charge/discharge capacitor 101a (Cf)←fourth switching element S4←second smoothing capacitor 108 (Co)

Through repetition of this series of operations "mode 4-mode 1-mode 4-mode 2", input voltage Vin inputted between the terminal 1a and the terminal 1b is stepped up to arbitrary voltage equal to or greater than twice the original voltage, and the stepped-up voltage is outputted as output voltage Vout between the terminal 1c and the terminal 1b, while electric generation energy of the electric motor 3 is accumulated in the battery 2.

[4]. Charge/Discharge Control by Phase Shift in Present Embodiment

Next, a principle of charge/discharge control of the charge/discharge capacitor 101a in the present embodiment will be described. With reference to FIG. 8 to FIG. 22, an operation principle of increase and decrease in charge/discharge capacitor voltage Vcf by phase shift in the following four operation conditions will be described.

Figure 8:
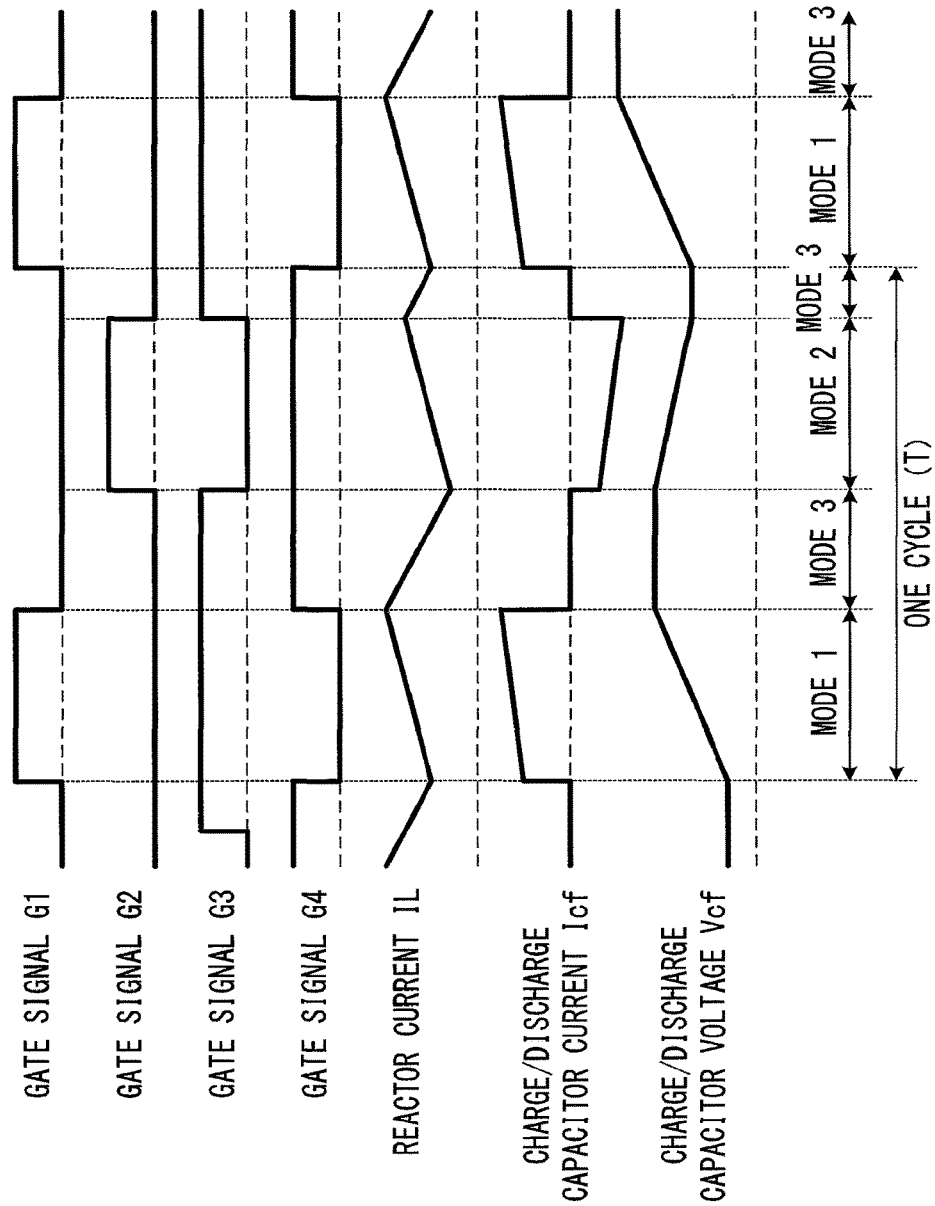
FIG. 8 is a diagram illustrating operation of the DC/DC converter in FIG. 1.
Figure 9:
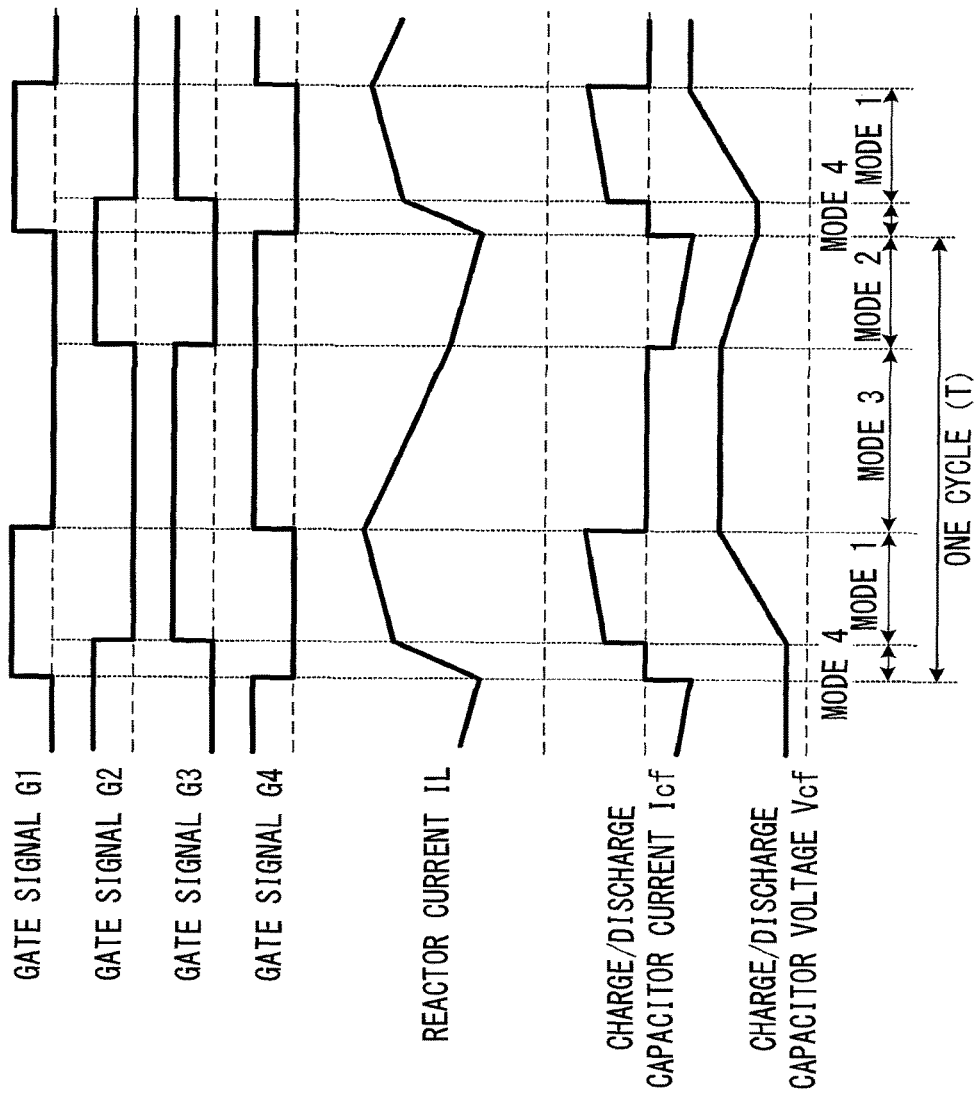
FIG. 9 is a diagram illustrating operation of the DC/DC converter in FIG. 1.
Figure 10:
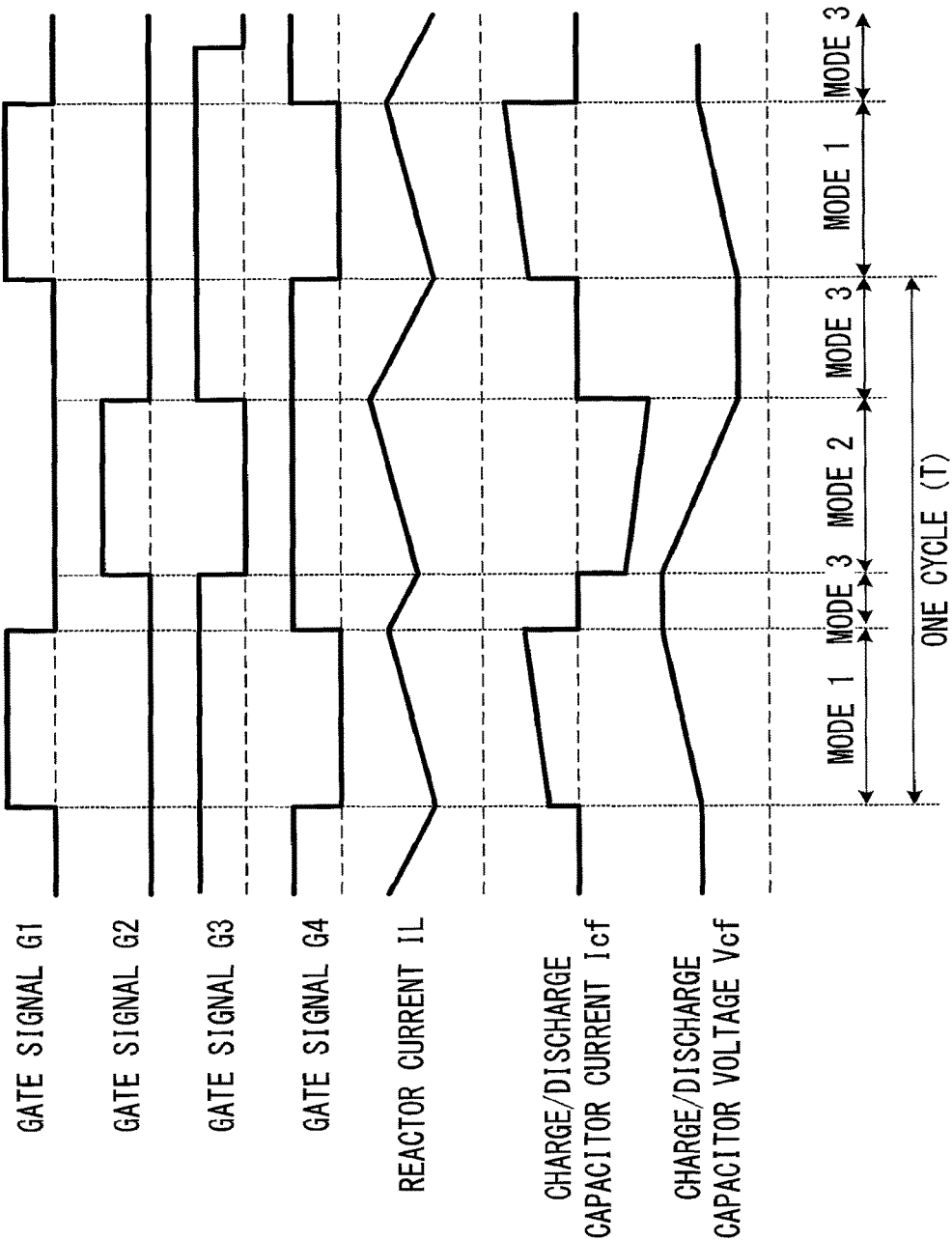
FIG. 10 is a diagram illustrating operation of the DC/DC converter in FIG. 1.
Figure 11:
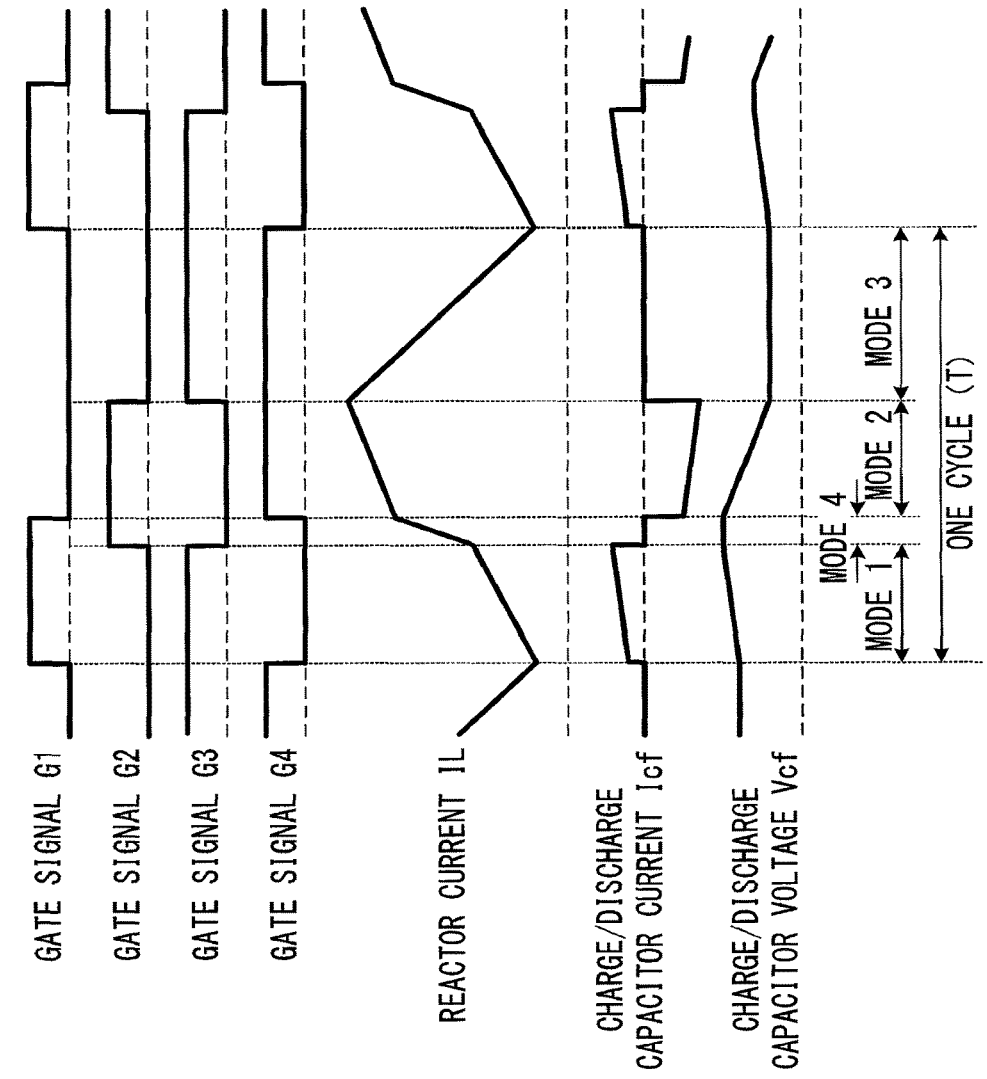
FIG. 11 is a diagram illustrating operation of the DC/DC converter in FIG. 1.

(a) Step-up Ratio is Smaller than Two, Power-running Operation (Leading phase: FIG. 8 and FIG. 9, lagging phase: FIG. 10 and FIG. 11)

Figure 12:
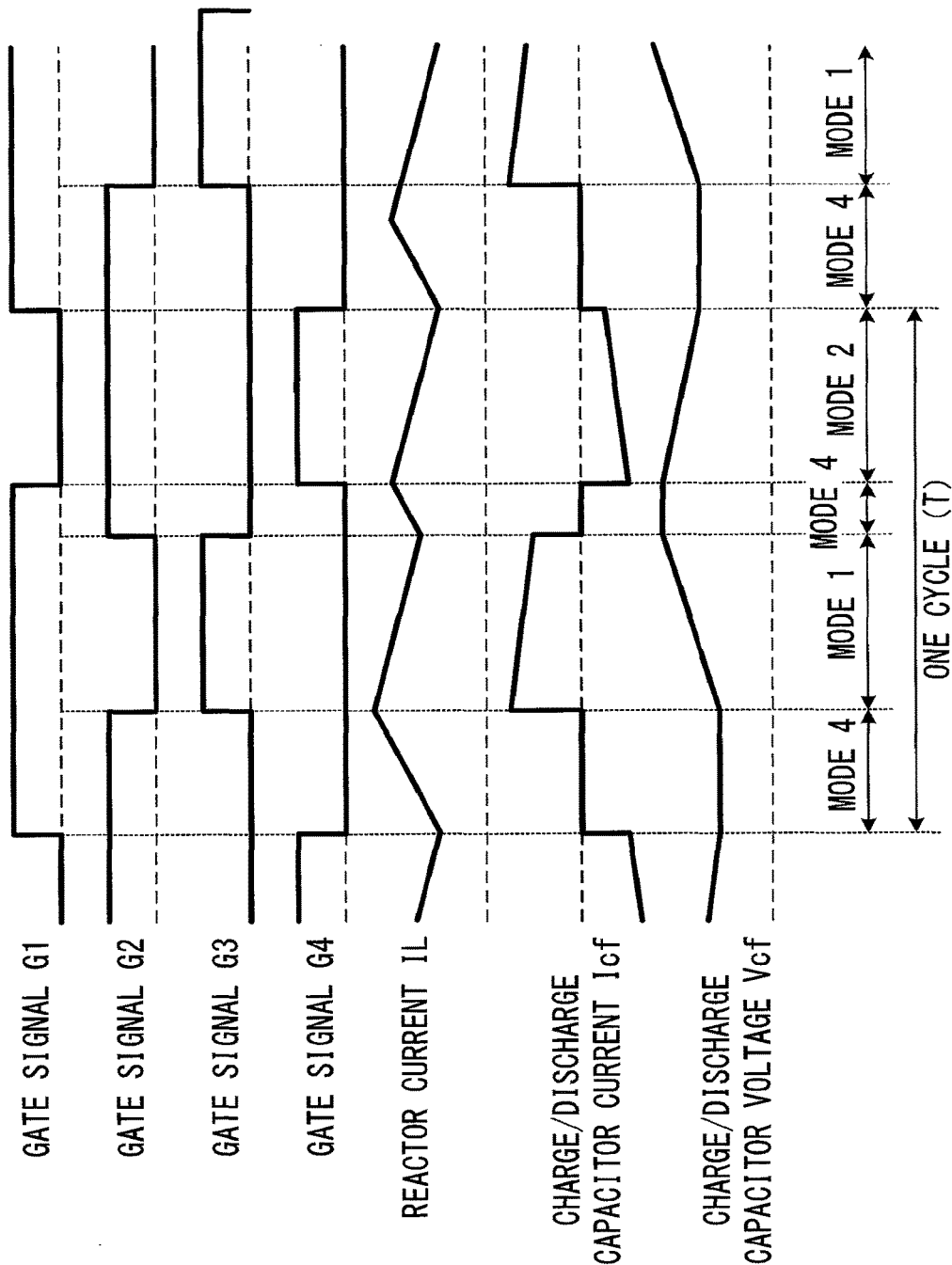
FIG. 12 is a diagram illustrating operation of the DC/DC converter in FIG. 1.
Figure 13:
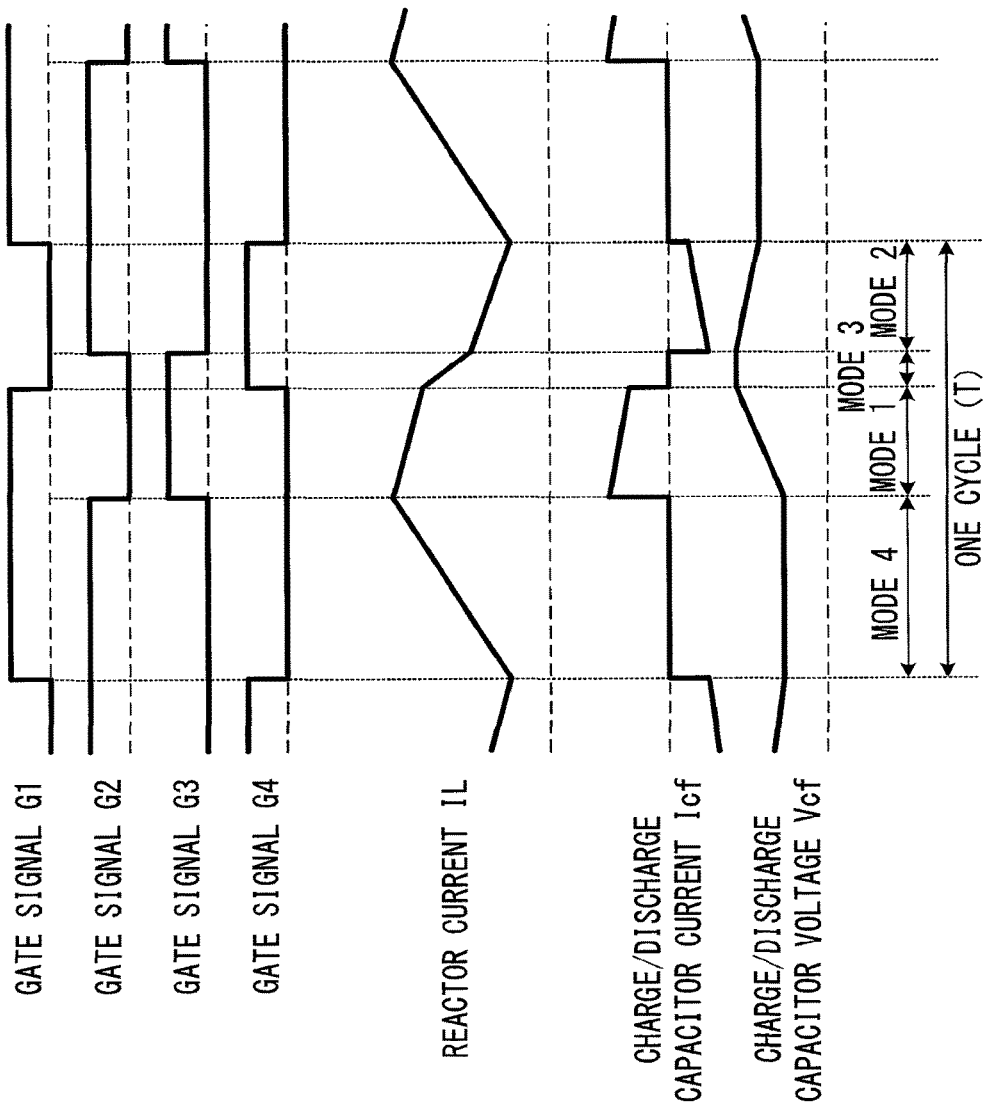
FIG. 13 is a diagram illustrating operation of the DC/DC converter in FIG. 1.
Figure 14:
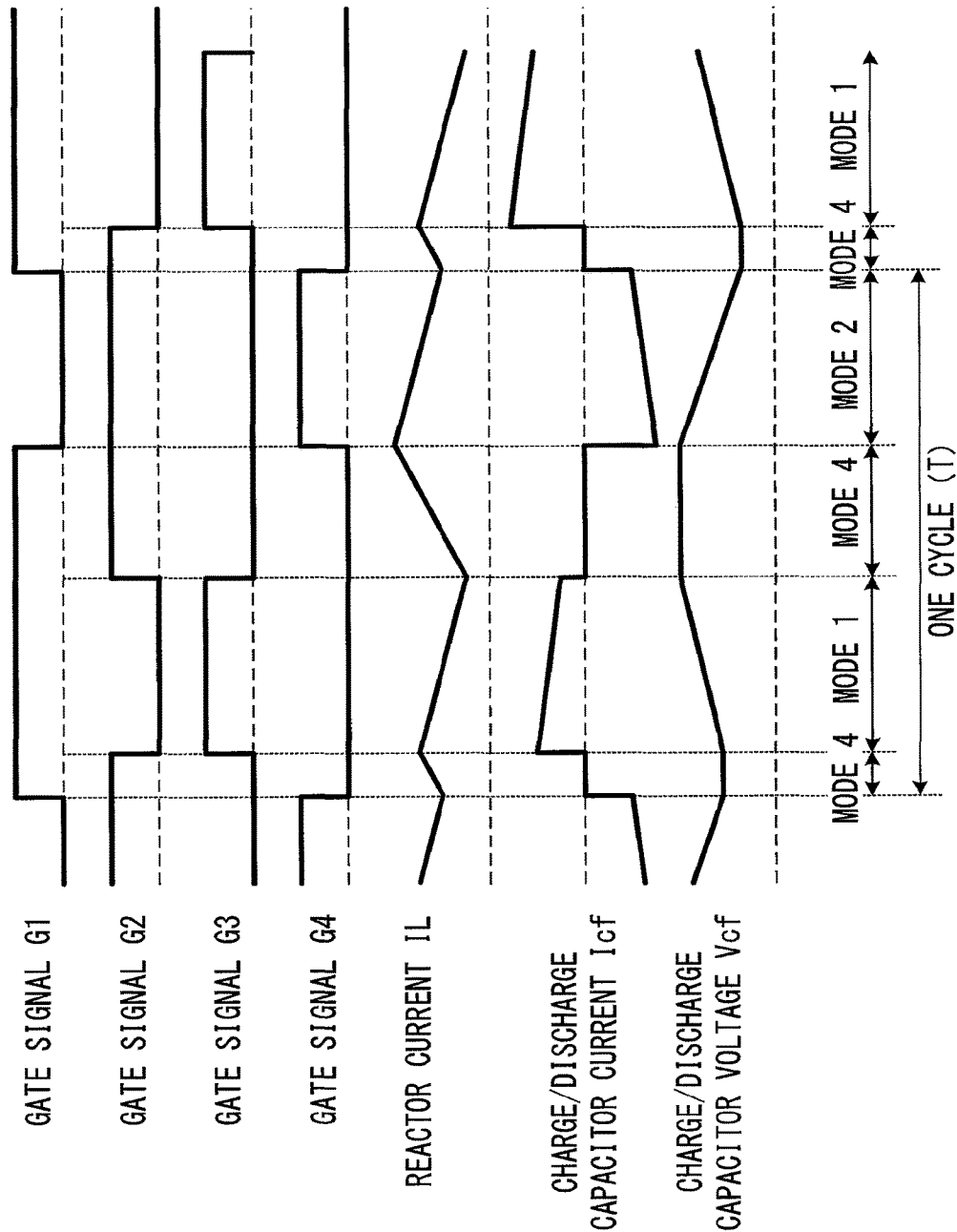
FIG. 14 is a diagram illustrating operation of the DC/DC converter in FIG. 1.
Figure 15:
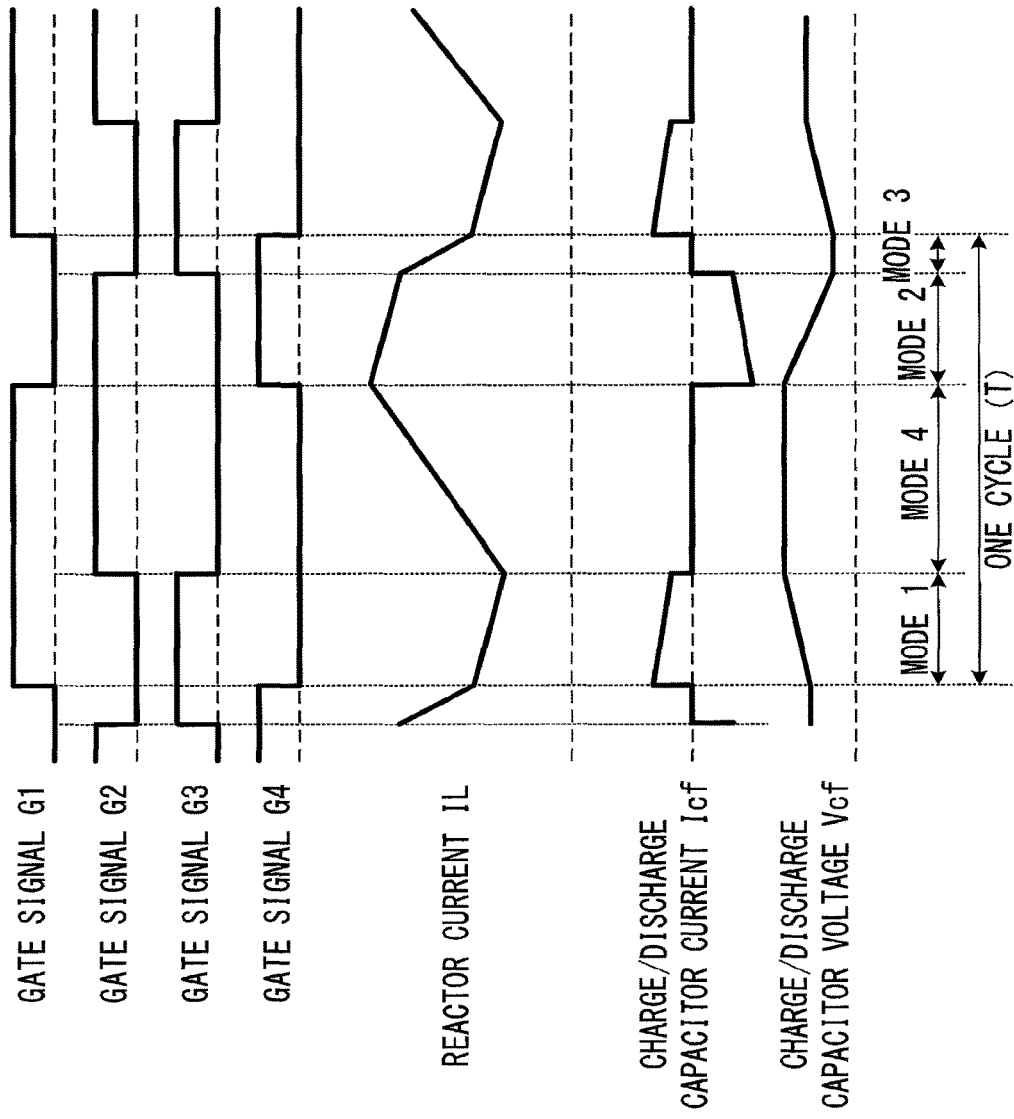
FIG. 15 is a diagram illustrating operation of the DC/DC converter in FIG. 1.

(b) Step-up Ratio is Equal to or Greater than Two, Power-running Operation (Leading phase: FIG. 12 and FIG. 13, lagging phase: FIG. 14 and FIG. 15)

Figure 16:
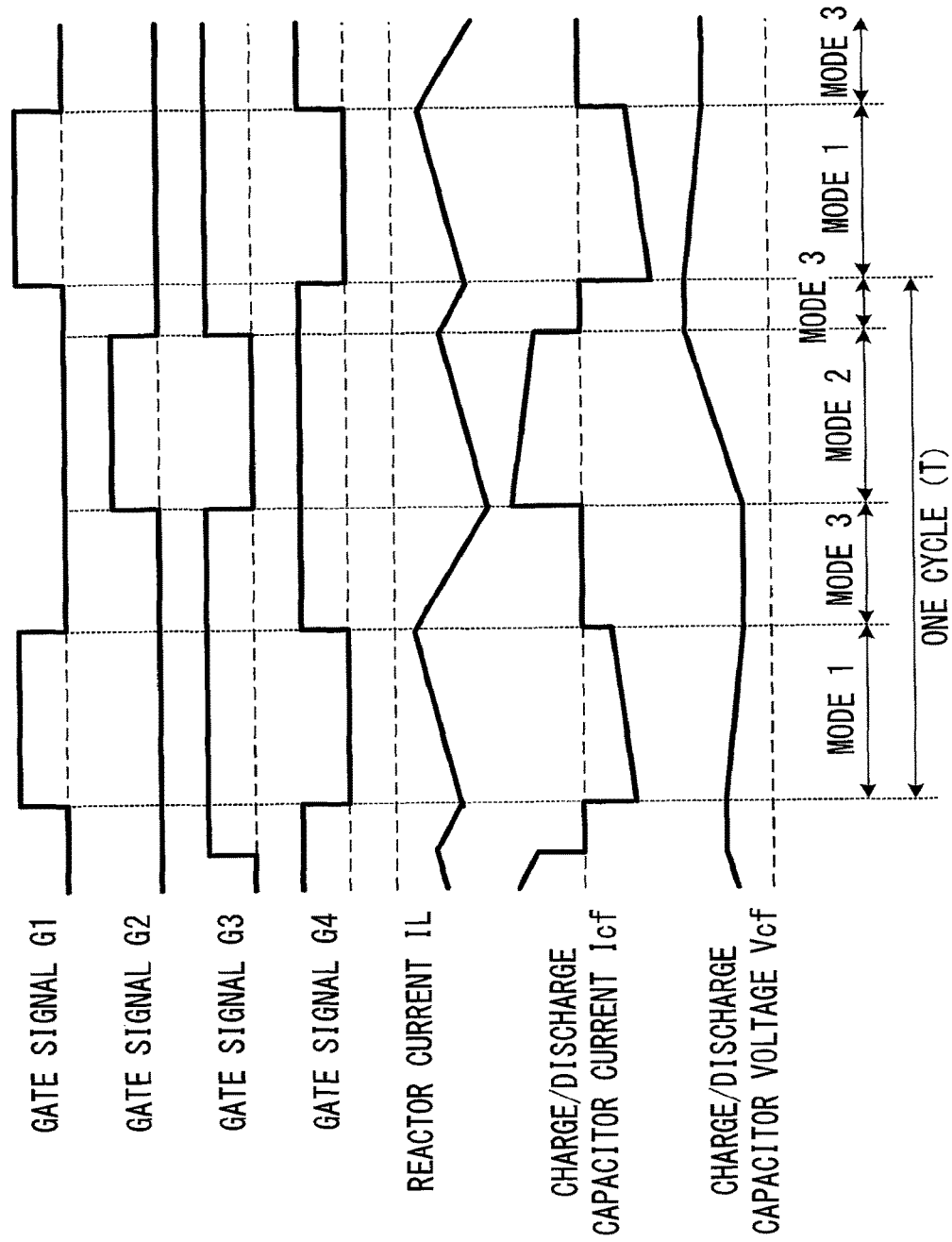
FIG. 16 is a diagram illustrating operation of the DC/DC converter in FIG. 1.
Figure 17:
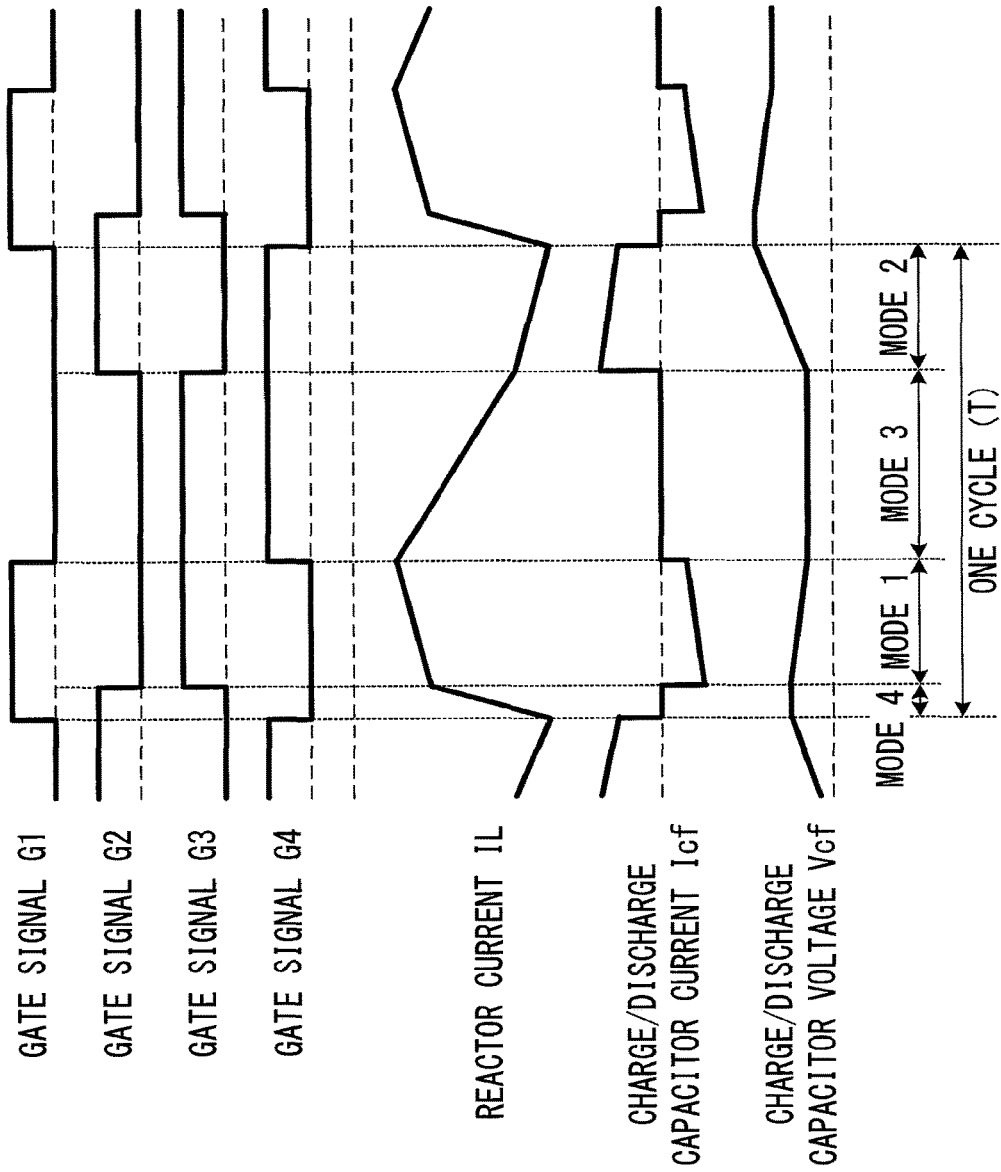
FIG. 17 is a diagram illustrating operation of the DC/DC converter in FIG. 1.
Figure 18:
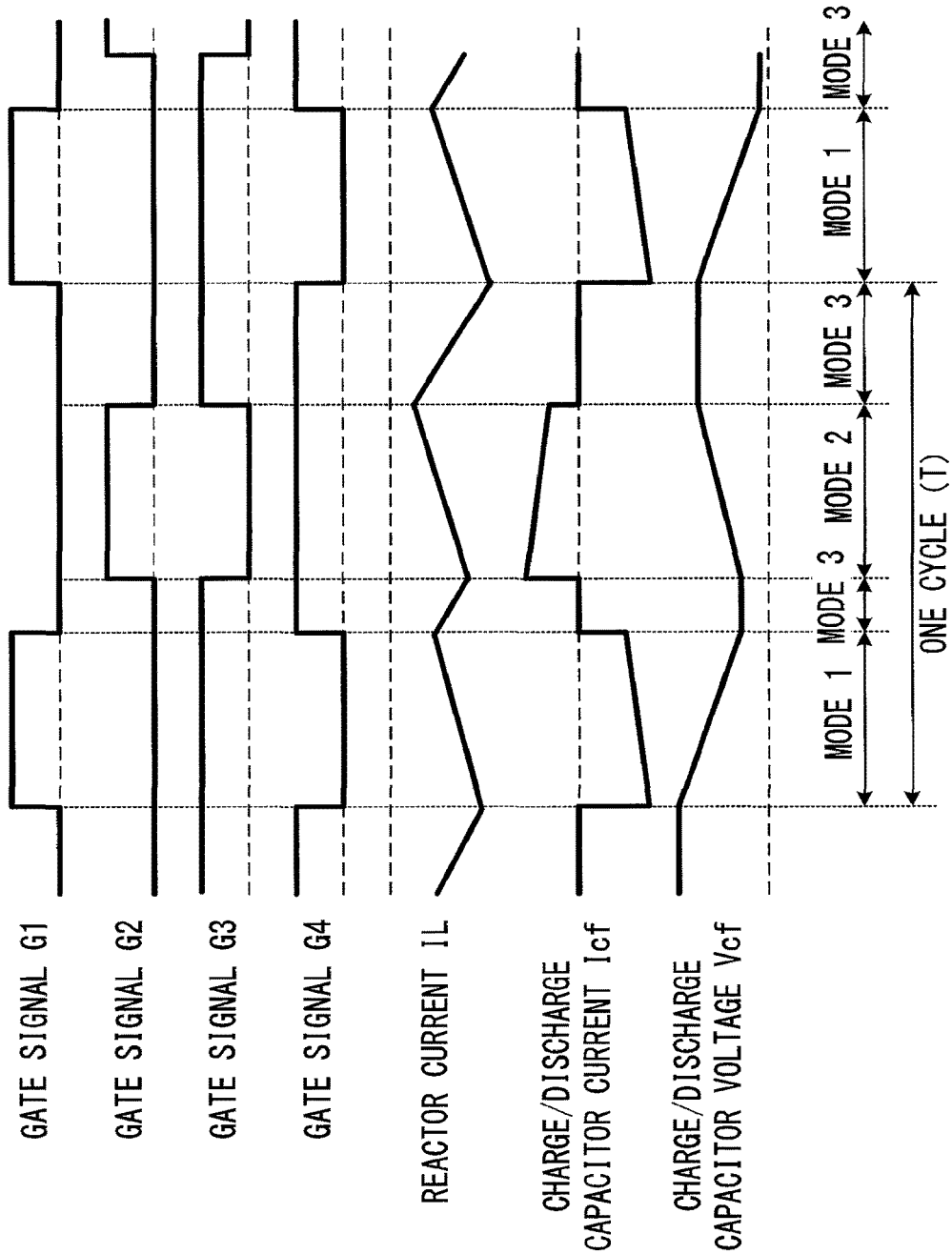
FIG. 18 is a diagram illustrating operation of the DC/DC converter in FIG. 1.
Figure 19:
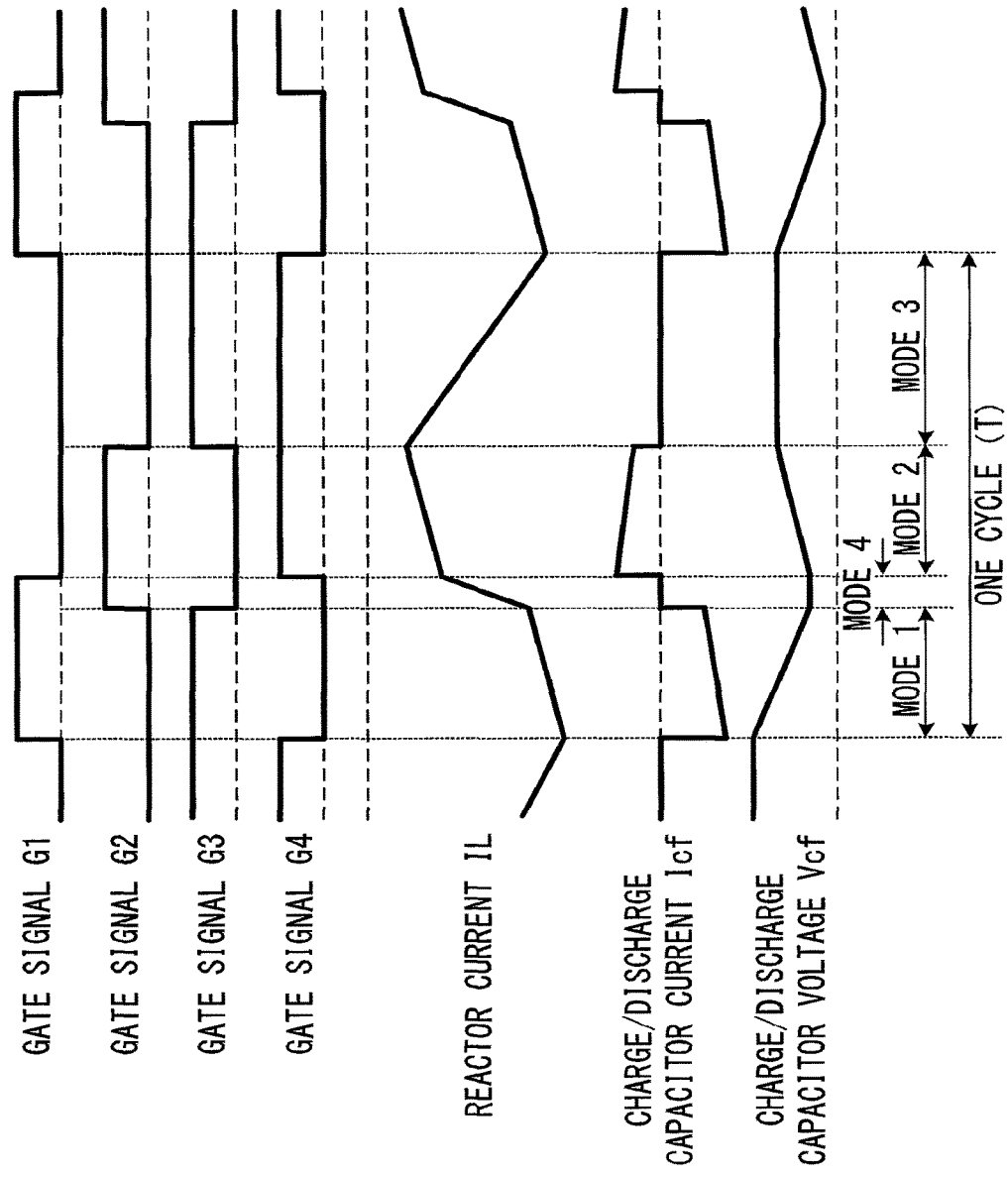
FIG. 19 is a diagram illustrating operation of the DC/DC converter in FIG. 1.

(c) Step-up Ratio is Smaller than Two, Regeneration Operation (Leading phase: FIG. 16 and FIG. 17, lagging phase: FIG. 18 and FIG. 19)

Figure 20:
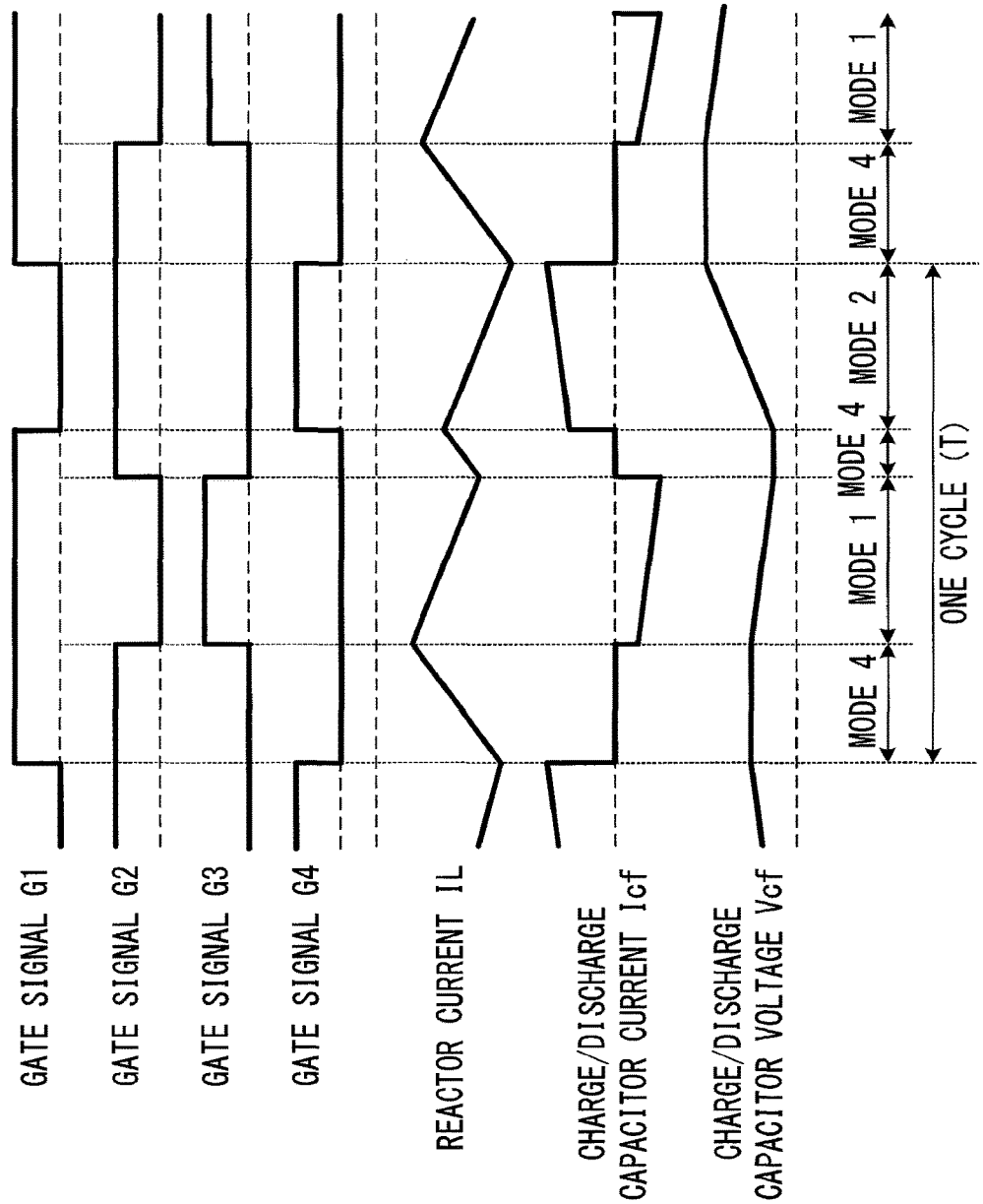
FIG. 20 is a diagram illustrating operation of the DC/DC converter in FIG. 1.
Figure 21:
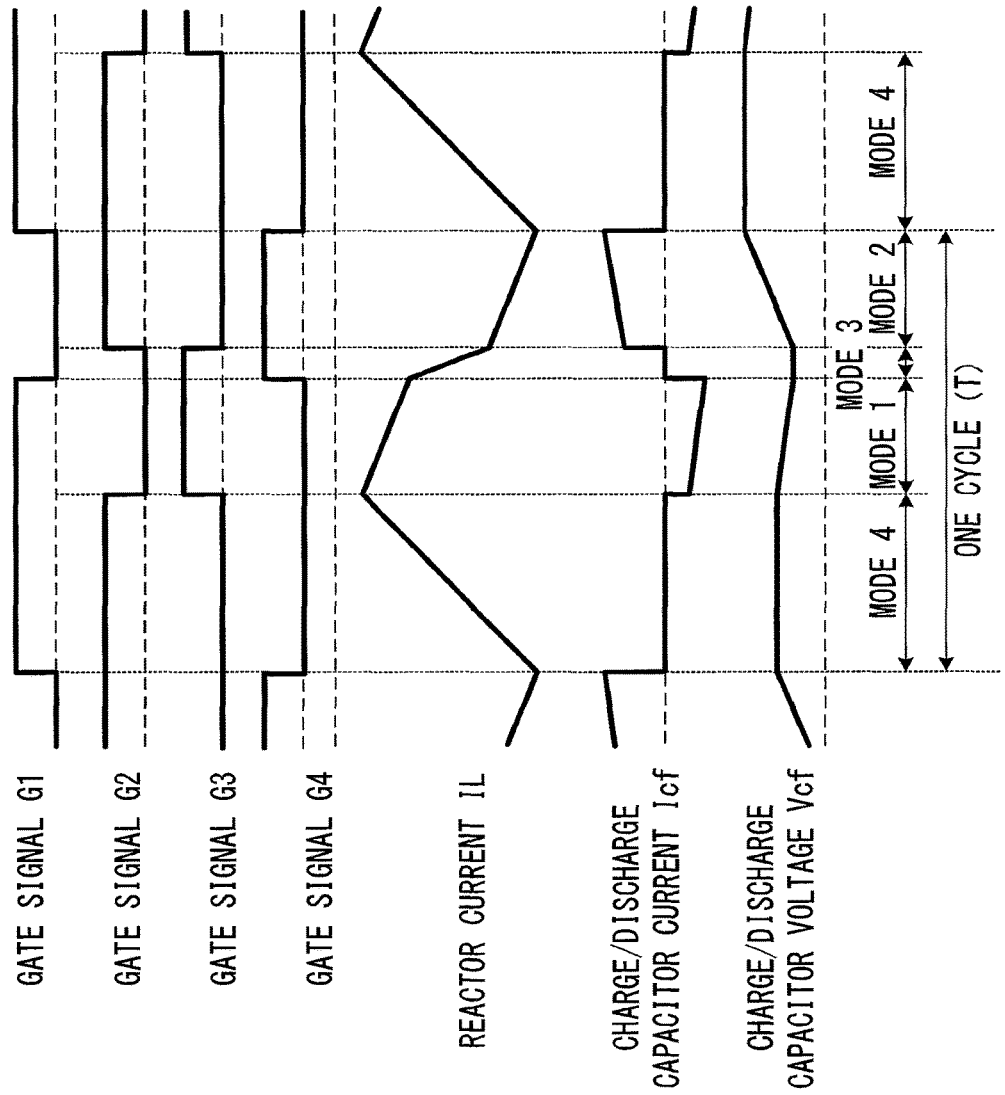
FIG. 21 is a diagram illustrating operation of the DC/DC converter in FIG. 1.
Figure 22:
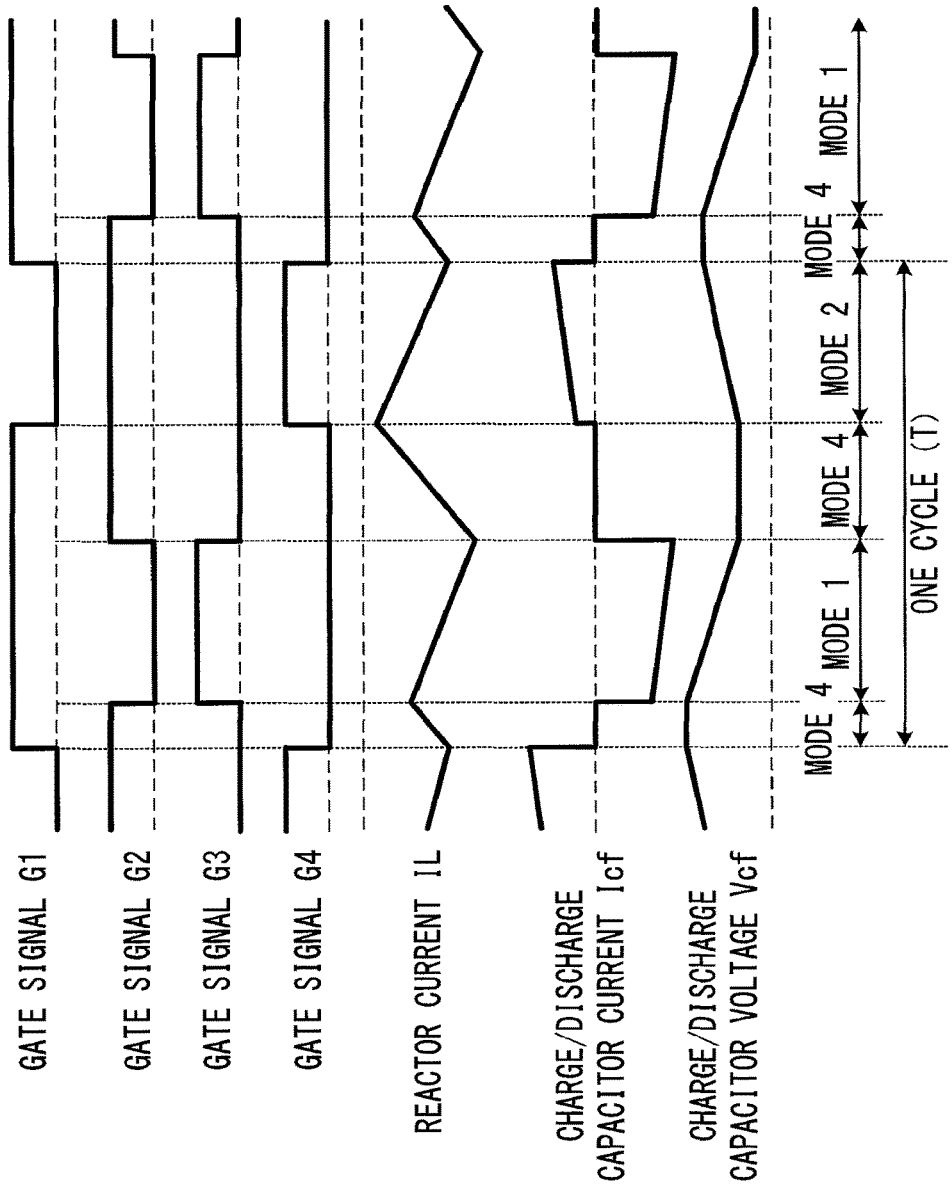
FIG. 22 is a diagram illustrating operation of the DC/DC converter in FIG. 1.
Figure 23:
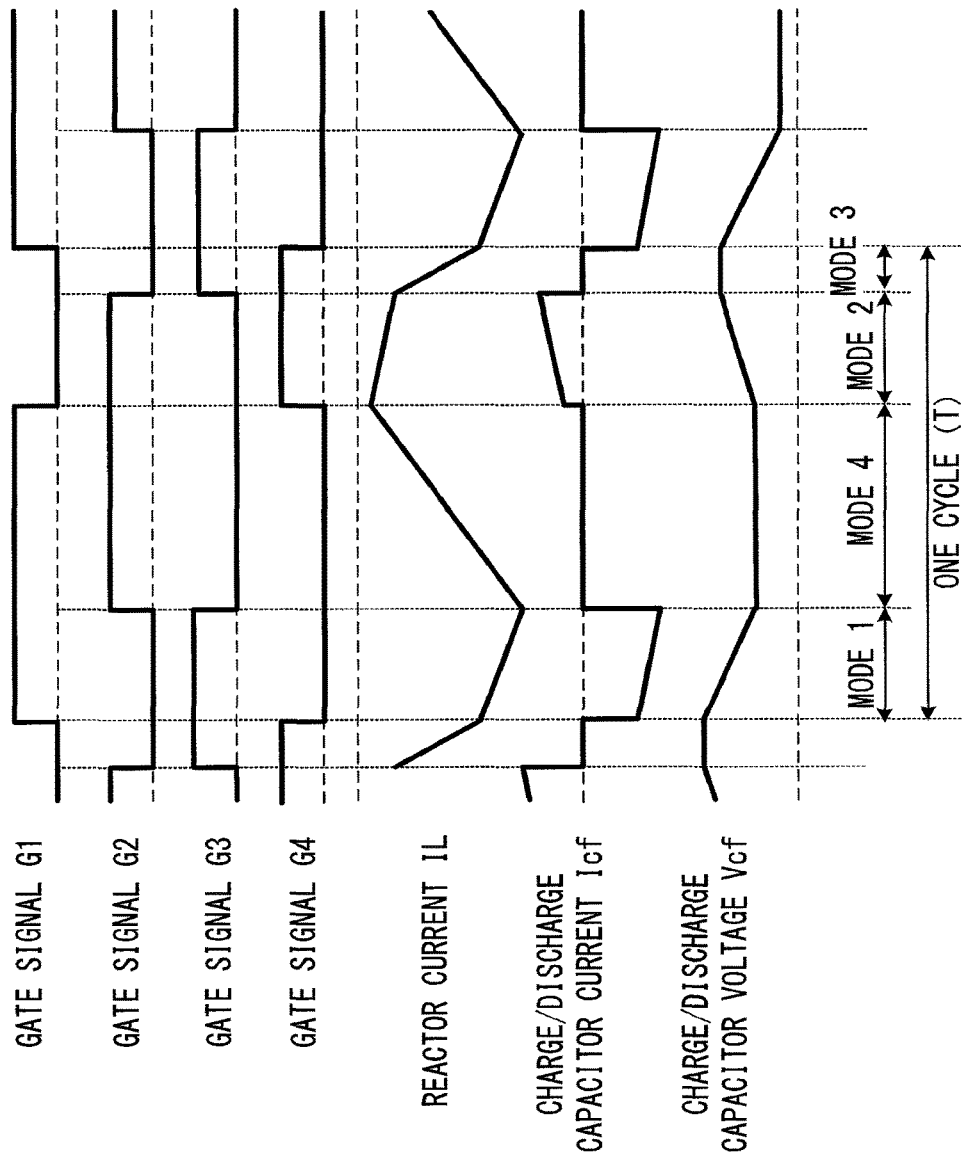
FIG. 23 is a diagram illustrating operation of the DC/DC converter in FIG. 1.

(d) Step-up Ratio is Equal to or Greater than Two, Regeneration Operation (Leading phase: FIG. 20 and FIG. 21, lagging phase: FIG. 22 and FIG. 23)

In the present embodiment, the phases of the gate signals G1 and G4 are fixed, and the phases of the gate signals G2 and G3 are shifted to be a leading phase or a lagging phase.

Regarding reactor current in the present embodiment, the rightward direction in FIG. 1 is defined as the positive direction, change in the positive direction is defined as increase, and change in the negative direction is defined as decrease.

Regarding the charge/discharge capacitor current Icf, the downward direction in FIG. 1 is defined as the positive direction, current flowing in the positive direction is defined as charge current, and current flowing in the negative direction is defined as discharge current.

When the absolute value of charge current is greater than the absolute value of discharge current, charge/discharge capacitor voltage Vcf increases, and conversely, when the absolute value of charge current is smaller than the absolute value of discharge current, charge/discharge capacitor voltage Vcf decreases.

(a) Phase Shift Control (Step-up Ratio N is Smaller than Two, Power-running Operation)

FIG. 8 shows gate signal voltage waveforms of the switching elements S1, S2, S3, S4, a reactor current waveform IL, a current waveform Icf of the charge/discharge capacitor 101a, and inter-terminal voltage Vcf of the charge/discharge capacitor 101a, in power-running operation in the case where the step-up ratio N is smaller than two and the phases of the gate signals G2 and G3 are shifted in a leading direction (within a limit value). FIG. 8 shows the case of performing phase shift within a phase shift limit value so that the mode 3 after the mode 2 exists, in the same operation modes ("mode 1-mode 3-mode 2-mode 3") as in FIG. 4.

In FIG. 8, the periods of the mode 1 and the mode 2 are the same as in FIG. 4, but the phases of the gate signals G2 and G3 are shifted to lead relative to the phases of the gate signals G1 and G4, whereby the period of the mode 3 after the mode 1 increases and the period of the mode 3 after the mode 2 decreases. Therefore, as shown in FIG. 8, reactor current IL in the mode 1 becomes greater than reactor current IL in the mode 2. That is, regarding the charge/discharge capacitor current Icf, charge current of the charge/discharge capacitor 101a in the mode 1 is greater than discharge current of the charge/discharge capacitor 101a in the mode 2. Therefore, in one cycle, the increase amount of charge/discharge capacitor voltage Vcf in the mode 1 is greater than the decrease amount thereof in the mode 2, and the average value of charge/discharge capacitor voltage Vcf in one cycle increases.

FIG. 9 shows gate signal voltage waveforms of the switching elements S1, S2, S3, S4, a reactor current waveform IL, a current waveform Icf of the charge/discharge capacitor 101a, and inter-terminal voltage Vcf of the charge/discharge capacitor 101a, in power-running operation in the case where the step-up ratio N is smaller than two and the phases of the gate signals G2 and G3 are shifted in a leading direction beyond the phase shift amount limit value (out of the limit value) used for the limitation in FIG. 8.

In the operation modes in FIG. 9, the mode 4 is newly generated, and operation of "mode 4-mode 1-mode 3-mode 2" is performed in one cycle. The period of the mode 1 and the period of the mode 2 are shortened by a length corresponding to the newly generated mode 4, as compared to FIG. 4, but the period of the mode 1 and the period of the mode 2 are equal to each other. Since reactor current IL increases during the period of the newly generated mode 4, reactor current IL in the mode 1 becomes greater than reactor current IL in the mode 2. That is, regarding the charge/discharge capacitor current Icf, charge current of the charge/discharge capacitor 101a in the mode 1 is greater than discharge current of the charge/discharge capacitor 101a in the mode 2. Therefore, in one cycle, the increase amount of charge/discharge capacitor voltage Vcf in the mode 1 is greater than the decrease amount thereof in the mode 2, and the average value of charge/discharge capacitor voltage Vcf in one cycle increases.

As described above, in FIG. 8 and FIG. 9, the phases of the gate signals G2 and G3 are shifted in a leading direction relative to the phases of the gate signals G1 and G4, whereby charge/discharge capacitor voltage Vcf increases.

FIG. 10 shows gate signal voltage waveforms of the switching elements S1, S2, S3, S4, a reactor current waveform IL, a current waveform Icf of the charge/discharge capacitor 101a, and inter-terminal voltage Vcf of the charge/discharge capacitor 101a, in power-running operation in the case where the step-up ratio N is smaller than two and the phases of the gate signals G2 and G3 are shifted in a lagging direction (within a limit value).

FIG. 10 shows the case of performing phase shift within a phase shift limit value so that the mode 3 after the mode 1 exists, in the same operation modes ("mode 1-mode 3-mode 2-mode 3") as in FIG. 4. In FIG. 10, the periods of the mode 1 and the mode 2 are the same as in FIG. 4, but the phases of the gate signals G2 and G3 are shifted to lag relative to the phases of the gate signals G1 and G4, whereby the period of the mode 3 after the mode 1 decreases and the period of the mode 3 after the mode 2 increases. Therefore, as shown in FIG. 10, reactor current IL in the mode 1 becomes smaller than reactor current IL in the mode 2. That is, regarding the charge/discharge capacitor current Icf, charge current of the charge/discharge capacitor 101a in the mode 1 is smaller than discharge current of the charge/discharge capacitor 101a in the mode 2. Therefore, in one cycle, the increase amount of charge/discharge capacitor voltage Vcf in the mode 1 is smaller than the decrease amount thereof in the mode 2, and the average value of charge/discharge capacitor voltage Vcf in one cycle decreases.

FIG. 11 shows gate signal voltage waveforms of the switching elements S1, S2, S3, S4, a reactor current waveform IL, a current waveform Icf of the charge/discharge capacitor 101a, and inter-terminal voltage Vcf of the charge/discharge capacitor 101a, in power-running operation in the case where the step-up ratio N is smaller than two and the phases of the gate signals G2 and G3 are shifted in a lagging direction beyond the phase shift amount limit value (out of the limit value) used for the limitation in FIG. 10.

In the operation modes in FIG. 11, the mode 4 is newly generated, and operation of "mode 1-mode 4-mode 2-mode 3" is performed in one cycle. The period of the mode 1 and the period of the mode 2 are shortened by a length corresponding to the newly generated mode 4, as compared to FIG. 4, but the period of the mode 1 and the period of the mode 2 are equal to each other. Reactor current IL increases during the period of the newly generated mode 4. Therefore, due to the newly generated mode 4, reactor current IL in the mode 2 becomes greater than reactor current IL in the mode 1. That is, regarding the charge/discharge capacitor current Icf, charge current of the charge/discharge capacitor 101a in the mode 1 is smaller than discharge current of the charge/discharge capacitor 101a in the mode 2. Therefore, in one cycle, the increase amount of charge/discharge capacitor voltage Vcf in the mode 1 is smaller than the decrease amount thereof in the mode 2, and the average value of charge/discharge capacitor voltage Vcf in one cycle decreases.

As described above, in FIG. 10 and FIG. 11, the phases of the gate signals G2 and G3 are shifted in a lagging direction relative to the phases of the gate signals G1 and G4, whereby charge/discharge capacitor voltage Vcf decreases.

(b) Phase Shift Control (Step-up Ratio N is Equal to or Greater than Two, Power-running Operation)

FIG. 12 shows gate signal voltage waveforms of the switching elements S1, S2, S3, S4, a reactor current waveform IL, a current waveform Icf of the charge/discharge capacitor 101a, and inter-terminal voltage Vcf of the charge/discharge capacitor 101a, in power-running operation in the case where the step-up ratio N is equal to or greater than two and the phases of the gate signals G2 and G3 are shifted in a leading direction (within a limit value).

FIG. 12 shows the case of performing phase shift within a phase shift limit value so that the mode 4 before the mode 2 exists, in the same operation modes ("mode 4-mode 1-mode 4-mode 2") as in FIG. 5. In FIG. 12, the periods of the mode 1 and the mode 2 are the same as in FIG. 5, but the phases of the gate signals G2 and G3 are shifted to lead relative to the phases of the gate signals G1 and G4, whereby the period of the mode 4 before the mode 1 increases and the period of the mode 4 before the mode 2 decreases. Therefore, as shown in FIG. 12, reactor current IL in the mode 1 becomes greater than reactor current IL in the mode 2. That is, regarding the charge/discharge capacitor current Icf, charge current of the charge/discharge capacitor 101a in the mode 1 is greater than discharge current of the charge/discharge capacitor 101a in the mode 2. Therefore, in one cycle, the increase amount of the charge/discharge capacitor voltage Vcf in the mode 1 is greater than the decrease amount thereof in the mode 2, and the average value of charge/discharge capacitor voltage Vcf in one cycle increases.

FIG. 13 shows gate signal voltage waveforms of the switching elements S1, S2, S3, S4, a reactor current waveform IL, a current waveform Icf of the charge/discharge capacitor 101a, and inter-terminal voltage Vcf of the charge/discharge capacitor 101a, in power-running operation in the case where the step-up ratio N is equal to or greater than two and the phases of the gate signals G2 and G3 are shifted in a leading direction beyond the phase shift amount limit value (out of the limit value) used for the limitation in FIG. 12.

In the operation modes in FIG. 13, the mode 3 is newly generated, and operation of "mode 4-mode 1-mode 3-mode 2" is performed in one cycle. The period of the mode 1 and the period of the mode 2 are shortened by a length corresponding to the newly generated mode 3, as compared to FIG. 5, but the period of the mode 1 and the period of the mode 2 are equal to each other. Since reactor current IL decreases during the period of the newly generated mode 3, reactor current IL in the mode 1 becomes greater than reactor current IL in the mode 2. That is, regarding the charge/discharge capacitor current Icf, charge current of the charge/discharge capacitor 101a in the mode 1 is greater than discharge current of the charge/discharge capacitor 101a in the mode 2. Therefore, in one cycle, the increase amount of charge/discharge capacitor voltage Vcf in the mode 1 is greater than the decrease amount thereof in the mode 2, and the average value of charge/discharge capacitor voltage Vcf in one cycle increases.

As described above, in FIG. 12 and FIG. 13, the phases of the gate signals G2 and G3 are shifted in a leading direction relative to the phases of the gate signals G1 and G4, whereby charge/discharge capacitor voltage Vcf increases.

FIG. 14 shows gate signal voltage waveforms of the switching elements S1, S2, S3, S4, a reactor current waveform IL, a current waveform Icf of the charge/discharge capacitor 101a, and inter-terminal voltage Vcf of the charge/discharge capacitor 101a, in power-running operation in the case where the step-up ratio N is equal to or greater than two and the phases of the gate signals G2 and G3 are shifted in a lagging direction (within a limit value).

FIG. 14 shows the case of performing phase shift within a phase shift limit value so that the mode 4 before the mode 1 exists, in the same operation modes ("mode 4-mode 1-mode 4-mode 2") as in FIG. 5. In FIG. 14, the periods of the mode 1 and the mode 2 are the same as in FIG. 5, but the phases of the gate signals G2 and G3 are shifted to lag relative to the phases of the gate signals G1 and G4, whereby the period of the mode 4 before the mode 1 decreases and the period of the mode 4 before the mode 2 increases. Therefore, as shown in FIG. 14, reactor current IL in the mode 1 becomes smaller than reactor current IL in the mode 2. That is, regarding the charge/discharge capacitor current Icf, charge current of the charge/discharge capacitor 101a in the mode 1 is smaller than discharge current of the charge/discharge capacitor 101a in the mode 2. Therefore, in one cycle, the increase amount of charge/discharge capacitor voltage Vcf in the mode 1 is smaller than the decrease amount thereof in the mode 2, and the average value of charge/discharge capacitor voltage Vcf in one cycle decreases.

FIG. 15 shows gate signal voltage waveforms of the switching elements S1, S2, S3, S4, a reactor current waveform IL, a current waveform Icf of the charge/discharge capacitor 101a, and inter-terminal voltage Vcf of the charge/discharge capacitor 101a, in power-running operation in the case where the step-up ratio N is equal to or greater than two and the phases of the gate signals G2 and G3 are shifted in a lagging direction beyond the phase shift amount limit value (out of the limit value) used for the limitation in FIG. 14.

In the operation modes in FIG. 15, the mode 3 is newly generated, and operation of "mode 1-mode 4-mode 2-mode 3" is performed in one cycle. The period of the mode 1 and the period of the mode 2 are shortened by a length corresponding to the newly generated mode 3, as compared to FIG. 5, but the period of the mode 1 and the period of the mode 2 are equal to each other. Reactor current IL decreases during the period of the newly generated mode 3. Therefore, due to the newly generated mode 3, reactor current IL in the mode 2 becomes greater than reactor current IL in the mode 1. That is, regarding the charge/discharge capacitor current Icf, charge current of the charge/discharge capacitor 101a in the mode 1 is smaller than discharge current of the charge/discharge capacitor 101a in the mode 2. Therefore, in one cycle, the increase amount of charge/discharge capacitor voltage Vcf in the mode 1 is smaller than the decrease amount thereof in the mode 2, and the average value of charge/discharge capacitor voltage Vcf in one cycle decreases.

As described above, in FIG. 14 and FIG. 15, the phases of the gate signals G2 and G3 are shifted in a lagging direction relative to the phases of the gate signals G1 and G4, whereby charge/discharge capacitor voltage Vcf decreases.

(c) Phase Shift Control (Step-up Ratio N is Smaller than Two, Regeneration Operation)

FIG. 16 shows gate signal voltage waveforms of the switching elements S1, S2, S3, S4, a reactor current waveform IL, a current waveform Icf of the charge/discharge capacitor 101a, and inter-terminal voltage Vcf of the charge/discharge capacitor 101a, in regeneration operation in the case where the step-up ratio N is smaller than two and the phases of the gate signals G2 and G3 are shifted in a leading direction (within a limit value).

FIG. 16 shows the case of performing phase shift within a phase shift limit value so that the mode 3 after the mode 2 exists, in the same operation modes ("mode 1-mode 3-mode 2-mode 3") as in FIG. 6. In FIG. 16, the periods of the mode 1 and the mode 2 are the same as in FIG. 6, but the phases of the gate signals G2 and G3 are shifted to lead relative to the phases of the gate signals G1 and G4, whereby the period of the mode 3 after the mode 1 increases and the period of the mode 3 after the mode 2 decreases. Therefore, as shown in FIG. 16, the absolute value of reactor current IL in the mode 1 becomes smaller than the absolute value of reactor current IL in the mode 2. That is, regarding the charge/discharge capacitor current Icf, discharge current of the charge/discharge capacitor 101a in the mode 1 is smaller than charge current of the charge/discharge capacitor 101a in the mode 2. Therefore, in one cycle, the decrease amount of charge/discharge capacitor voltage Vcf in the mode 1 is smaller than the increase amount thereof in the mode 2, and the average value of charge/discharge capacitor voltage Vcf in one cycle increases.

FIG. 17 shows gate signal voltage waveforms of the switching elements S1, S2, S3, S4, a reactor current waveform IL, a current waveform Icf of the charge/discharge capacitor 101a, and inter-terminal voltage Vcf of the charge/discharge capacitor 101a, in regeneration operation in the case where the step-up ratio N is smaller than two and the phases of the gate signals G2 and G3 are shifted in a leading direction beyond the phase shift amount limit value (out of the limit value) used for the limitation in FIG. 16.

In the operation modes in FIG. 17, the mode 4 is newly generated, and operation of "mode 4-mode 1-mode 3-mode 2" is performed in one cycle. The period of the mode 1 and the period of the mode 2 are shortened by a length corresponding to the newly generated mode 4, as compared to FIG. 6, but the period of the mode 1 and the period of the mode 2 are equal to each other. Since reactor current IL increases during the period of the newly generated mode 4, the absolute value of reactor current IL in the mode 1 becomes smaller than the absolute value of reactor current IL in the mode 2. That is, regarding the charge/discharge capacitor current Icf, discharge current of the charge/discharge capacitor 101a in the mode 1 is smaller than charge current of the charge/discharge capacitor 101a in the mode 2. Therefore, in one cycle, the decrease amount of the charge/discharge capacitor voltage Vcf in the mode 1 is smaller than the increase amount thereof in the mode 2, and the average value of charge/discharge capacitor voltage Vcf in one cycle increases.

As described above, in FIG. 16 and FIG. 17, the phases of the gate signals G2 and G3 are shifted in a leading direction relative to the phases of the gate signals G1 and G4, whereby charge/discharge capacitor voltage Vcf increases.

FIG. 18 shows gate signal voltage waveforms of the switching elements S1, S2, S3, S4, a reactor current waveform IL, a current waveform Icf of the charge/discharge capacitor 101a, and inter-terminal voltage Vcf of the charge/discharge capacitor 101a, in regeneration operation in the case where the step-up ratio N is smaller than two and the phases of the gate signals G2 and G3 are shifted in a lagging direction (within a limit value).

FIG. 18 shows the case of performing phase shift within a phase shift limit value so that the mode 3 after the mode 1 exists, in the same operation modes ("mode 1-mode 3-mode 2-mode 3") as in FIG. 6. In FIG. 18, the periods of the mode 1 and the mode 2 are the same as in FIG. 6, but the phases of the gate signals G2 and G3 are shifted to lag relative to the phases of the gate signals G1 and G4, whereby the period of the mode 3 after the mode 1 decreases and the period of the mode 3 after the mode 2 increases. Therefore, as shown in FIG. 18, the absolute value of reactor current IL in the mode 1 becomes greater than the absolute value of reactor current IL in the mode 2. That is, regarding the charge/discharge capacitor current Icf, discharge current of the charge/discharge capacitor 101a in the mode 1 is greater than charge current of the charge/discharge capacitor 101a in the mode 2. Therefore, in one cycle, the decrease amount of charge/discharge capacitor voltage Vcf in the mode 1 is greater than the increase amount thereof in the mode 2, and the average value of charge/discharge capacitor voltage Vcf in one cycle decreases.

FIG. 19 shows gate signal voltage waveforms of the switching elements S1, S2, S3, S4, a reactor current waveform IL, a current waveform Icf of the charge/discharge capacitor 101a, and inter-terminal voltage Vcf of the charge/discharge capacitor 101a, in regeneration operation in the case where the step-up ratio N is smaller than two and the phases of the gate signals G2 and G3 are shifted in a lagging direction beyond the phase shift amount limit value (out of the limit value) used for the limitation in FIG. 18.

In the operation modes in FIG. 19, the mode 4 is newly generated, and operation of "mode 1-mode 4-mode 2-mode 3" is performed in one cycle. The period of the mode 1 and the period of the mode 2 are shortened by a length corresponding to the newly generated mode 4, as compared to FIG. 6, but the period of the mode 1 and the period of the mode 2 are equal to each other. Reactor current IL increases during the period of the newly generated mode 4. Therefore, due to the newly generated mode 4, the absolute value of reactor current IL in the mode 1 becomes greater than the absolute value of reactor current IL in the mode 2. That is, regarding the charge/discharge capacitor current Icf, discharge current of the charge/discharge capacitor 101a in the mode 1 is greater than charge current of the charge/discharge capacitor 101a in the mode 2. Therefore, in one cycle, the decrease amount of charge/discharge capacitor voltage Vcf in the mode 1 is greater than the increase amount thereof in the mode 2, and the average value of charge/discharge capacitor voltage Vcf in one cycle decreases.

As described above, in FIG. 18 and FIG. 19, the phases of the gate signals G2 and G3 are shifted in a lagging direction relative to the phases of the gate signals G1 and G4, whereby charge/discharge capacitor voltage Vcf decreases.

(d) Phase Shift Control (Step-up Ratio N is Equal to or Greater than Two, Regeneration Operation)

FIG. 20 shows gate signal voltage waveforms of the switching elements S1, S2, S3, S4, a reactor current waveform IL, a current waveform Icf of the charge/discharge capacitor 101a, and inter-terminal voltage Vcf of the charge/discharge capacitor 101a, in regeneration operation in the case where the step-up ratio N is equal to or greater than two and the phases of the gate signals G2 and G3 are shifted in a leading direction (within a limit value).

FIG. 20 shows the case of performing phase shift within a phase shift limit value so that the mode 4 before the mode 2 exists, in the same operation modes ("mode 4-mode 1-mode 4-mode 2") as in FIG. 7. In FIG. 20, the periods of the mode 1 and the mode 2 are the same as in FIG. 7, but the phases of the gate signals G2 and G3 are shifted to lead relative to the phases of the gate signals G1 and G4, whereby the period of the mode 4 before the mode 1 increases and the period of the mode 4 before the mode 2 decreases. Therefore, as shown in FIG. 20, the absolute value of reactor current IL in the mode 1 becomes smaller than the absolute value of reactor current IL in the mode 2. That is, regarding the charge/discharge capacitor current Icf, discharge current of the charge/discharge capacitor 101a in the mode 1 is smaller than charge current of the charge/discharge capacitor 101a in the mode 2. Therefore, in one cycle, the decrease amount of charge/discharge capacitor voltage Vcf in the mode 1 is smaller than the increase amount thereof in the mode 2, and the average value of charge/discharge capacitor voltage Vcf in one cycle increases.

FIG. 21 shows gate signal voltage waveforms of the switching elements S1, S2, S3, S4, a reactor current waveform IL, a current waveform Icf of the charge/discharge capacitor 101a, and inter-terminal voltage Vcf of the charge/discharge capacitor 101a, in regeneration operation in the case where the step-up ratio N is equal to or greater than two and the phases of the gate signals G2 and G3 are shifted in a leading direction beyond the phase shift amount limit value (out of the limit value) used for the limitation in FIG. 20.

In the operation modes in FIG. 21, the mode 3 is newly generated, and operation of "mode 4-mode 1-mode 3-mode 2" is performed in one cycle. The period of the mode 1 and the period of the mode 2 are shortened by a length corresponding to the newly generated mode 3, as compared to FIG. 7, but the period of the mode 1 and the period of the mode 2 are equal to each other. Since reactor current IL decreases during the period of the newly generated mode 3, the absolute value of reactor current IL in the mode 1 becomes smaller than the absolute value of reactor current IL in the mode 2. That is, regarding the charge/discharge capacitor current Icf, discharge current of the charge/discharge capacitor 101a in the mode 1 is smaller than charge current of the charge/discharge capacitor 101a in the mode 2. Therefore, in one cycle, the decrease amount of charge/discharge capacitor voltage Vcf in the mode 1 is smaller than the increase amount thereof in the mode 2, and the average value of charge/discharge capacitor voltage Vcf in one cycle increases.

As described above, in FIG. 20 and FIG. 21, the phases of the gate signals G2 and G3 are shifted in a leading direction relative to the phases of the gate signals G1 and G4, whereby charge/discharge capacitor voltage Vcf increases.

FIG. 22 shows gate signal voltage waveforms of the switching elements S1, S2, S3, S4, a reactor current waveform IL, a current waveform Icf of the charge/discharge capacitor 101a, and inter-terminal voltage Vcf of the charge/discharge capacitor 101a, in regeneration operation in the case where the step-up ratio N is equal to or greater than two and the phases of the gate signals G2 and G3 are shifted in a lagging direction (within a limit value).

FIG. 22 shows the case of performing phase shift within a phase shift limit value so that the mode 4 before the mode 1 exists, in the same operation modes ("mode 4-mode 1-mode 4-mode 2") as in FIG. 7. In FIG. 22, the periods of the mode 1 and the mode 2 are the same as in FIG. 7, but the phases of the gate signals G2 and G3 are shifted to lag relative to the phases of the gate signals G1 and G4, whereby the period of the mode 4 before the mode 1 decreases and the period of the mode 4 before the mode 2 increases. Therefore, as shown in FIG. 22, the absolute value of reactor current IL in the mode 1 becomes greater than the absolute value of reactor current IL in the mode 2. That is, regarding the charge/discharge capacitor current Icf, discharge current of the charge/discharge capacitor 101a in the mode 1 is greater than charge current of the charge/discharge capacitor 101a in the mode 2. Therefore, in one cycle, the decrease amount of charge/discharge capacitor voltage Vcf in the mode 1 is greater than the increase amount thereof in the mode 2, and the average value of charge/discharge capacitor voltage Vcf in one cycle decreases.

FIG. 23 shows gate signal voltage waveforms of the switching elements S1, S2, S3, S4, a reactor current waveform IL, a current waveform Icf of the charge/discharge capacitor 101a, and inter-terminal voltage Vcf of the charge/discharge capacitor 101a, in regeneration operation in the case where the step-up ratio N is equal to or greater than two and the phases of the gate signals G2 and G3 are shifted in a lagging direction beyond the phase shift amount limit value (out of the limit value) used for the limitation in FIG. 22.

In the operation modes in FIG. 23, the mode 3 is newly generated, and operation of "mode 1-mode 4-mode 2-mode 3" is performed in one cycle. The period of the mode 1 and the period of the mode 2 are shortened by a length corresponding to the newly generated mode 3, as compared to FIG. 7, but the period of the mode 1 and the period of the mode 2 are equal to each other. Reactor current IL decreases during the period of the newly generated mode 3. Therefore, due to the newly generated mode 3, the absolute value of reactor current IL in the mode 2 becomes smaller than the absolute value of reactor current IL in the mode 1. That is, regarding the charge/discharge capacitor current Icf, discharge current of the charge/discharge capacitor 101a in the mode 1 is greater than charge current of the charge/discharge capacitor 101a in the mode 2. Therefore, in one cycle, the decrease amount of charge/discharge capacitor voltage Vcf in the mode 1 is greater than the increase amount thereof in the mode 2, and the average value of charge/discharge capacitor voltage Vcf in one cycle decreases.

As described above, in FIG. 22 and FIG. 23, the phases of the gate signals G2 and G3 are shifted in a lagging direction relative to the phases of the gate signals G1 and G4, whereby charge/discharge capacitor voltage Vcf decreases.

Thus, irrespective of the step-up ratio N, and irrespective of whether power-running operation or regeneration operation is performed, charge/discharge capacitor voltage Vcf can be increased by causing the phases of the gate signals G2 and G3 to lead relative to the phases of the gate signals G1 and G4, and charge/discharge capacitor voltage Vcf can be decreased by causing the phases of the gate signals G2 and G3 to lag relative to the phases of the gate signals G1 and G4.

[5]. Generation of PWM Signal (Generation of Each Gate Signal)

Next, the method for generating the gate signals G1, G2, G3, G4 in the present embodiment will be described.

The gate signals are generated such that the gate signal G1 and the gate signal G4 have a complementary relationship and the gate signal G2 and the gate signal G3 have a complementary relationship.

Figure 24:
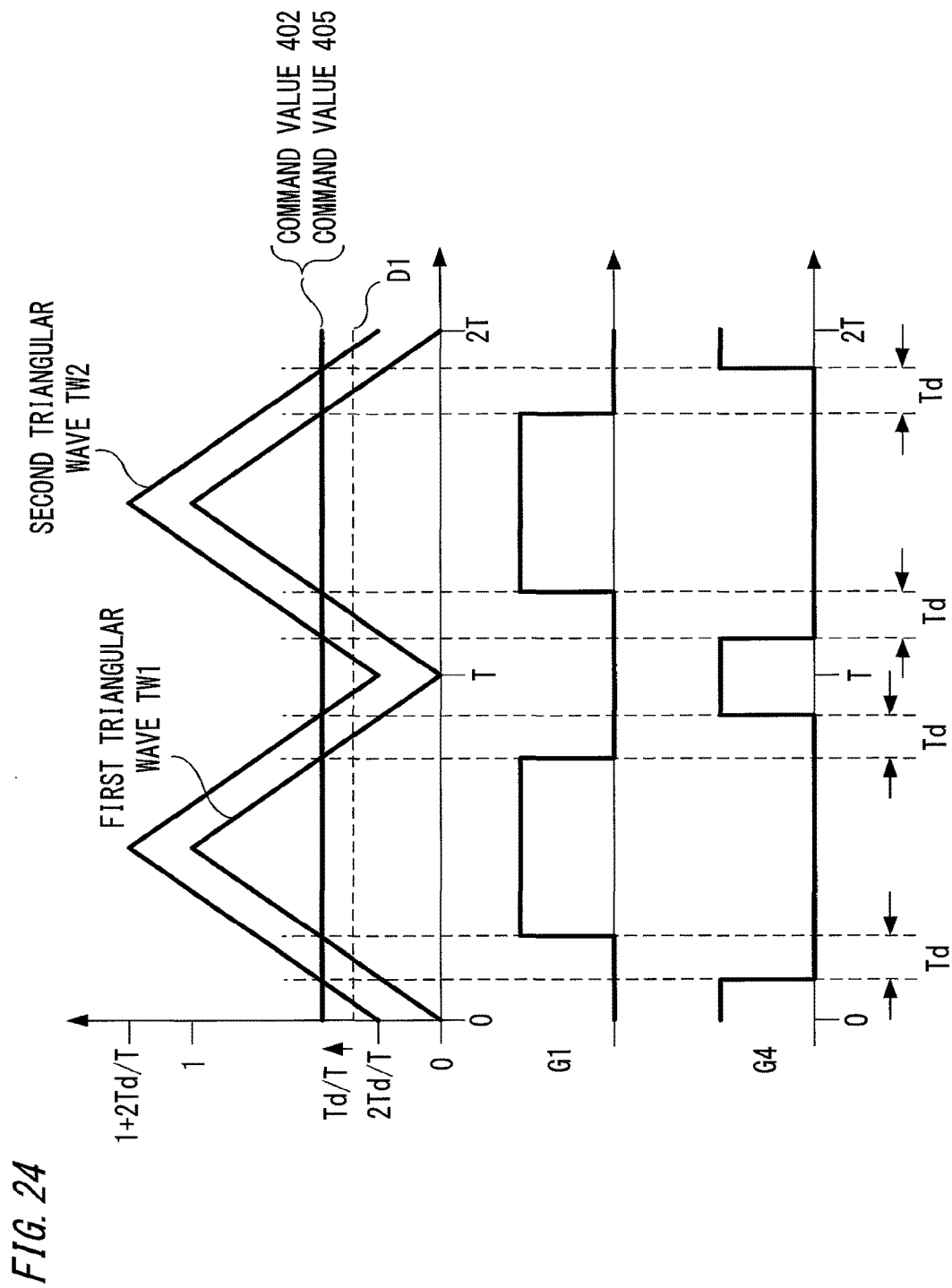
FIG. 24 is a diagram illustrating generation of gate signals of the DC/DC converter in FIG. 1.

FIG. 24 shows the gate signal G1 and the gate signal G4 generated from the first triangular wave TW1 and the second triangular wave TW2.

Regarding generation of the gate signal G1, the adder 401 adds the duty Td/T corresponding to the dead time, to the duty command value D1, to generate the duty command value 402. Then, the comparator 403 compares the duty command value 402 and the first triangular wave TW1, to generate the gate signal G1.

Regarding generation of the gate signal G4, the adder 404 adds the duty Td/T corresponding to the dead time, to the duty command value D1, to generate the duty command value 405. Then, the comparator 406 compares the duty command value 405 and the second triangular wave TW2, to generate the gate signal G4.

Regarding the gate signal G1, the duty command value D1 is increased by Td/T relative to the first triangular wave TW1, whereby rising and falling of the gate signal G1 are shifted in such a direction that shortens the ON time by Td.

Regarding the gate signal G4, the duty command value D1 is increased by Td/T relative to the second triangular wave TW2, whereby rising and falling of the gate signal G4 are shifted in such a direction that shortens the ON time by Td.

As a result, a dead time period of Td can be generated between the ON time of the gate signal G1 and the ON time of the gate signal G4.

Figure 25:
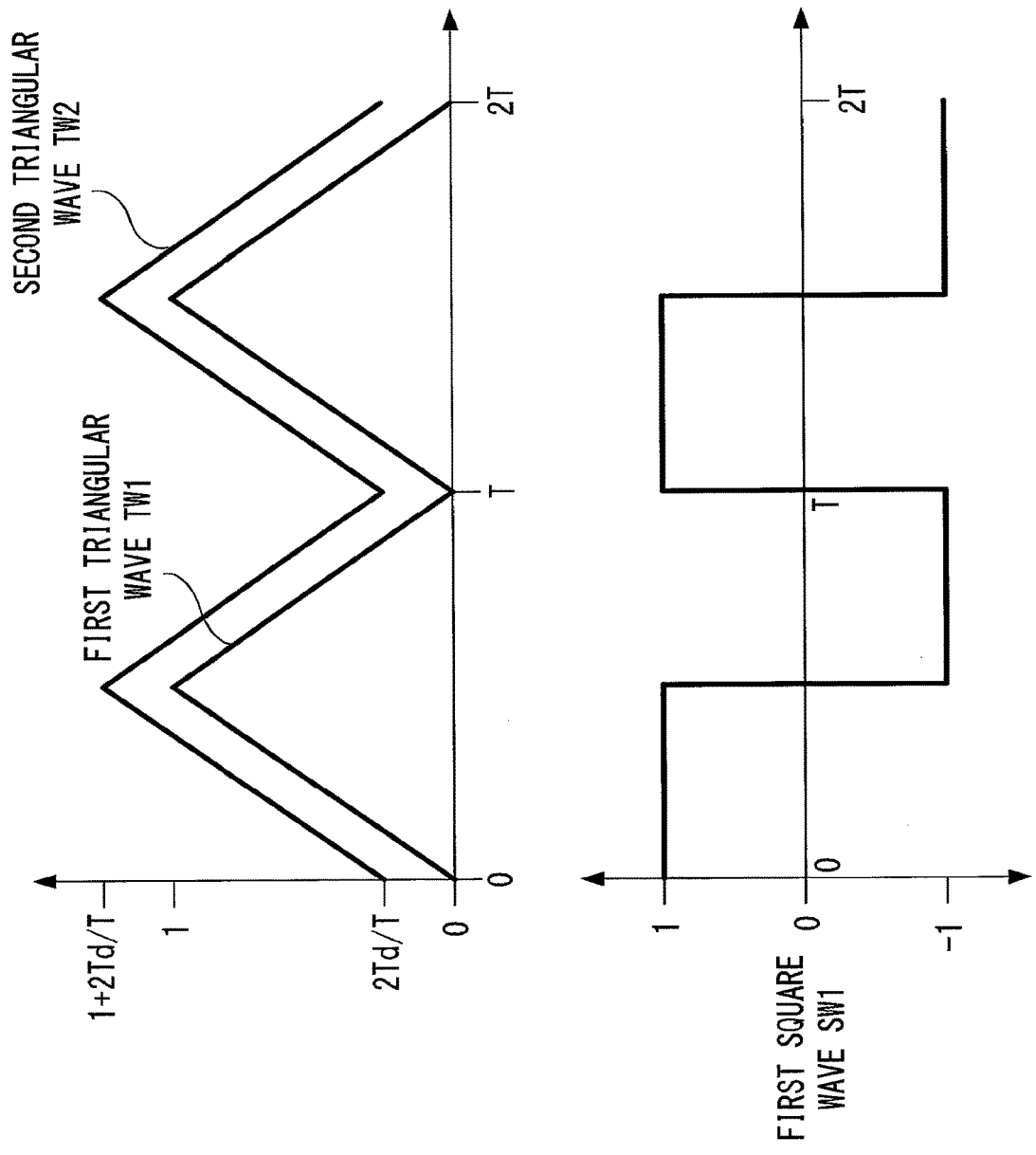
FIG. 25 is a diagram illustrating generation of gate signals of the DC/DC converter in FIG. 1.

Phase shift of the gate signal G2 and the gate signal G3 is performed using the first square wave SW1 defined in FIG. 25. In FIG. 25, the first square wave SW1 has the same frequency as those of the first triangular wave TW1 and the second triangular wave TW2, and is a square wave that becomes +1 at a rising phase of the first triangular wave TW1 and the second triangular wave TW2, and becomes −1 at a falling phase of the first triangular wave TW1 and the second triangular wave TW2.

The method for generating the gate signal G2 in FIG. 26 will be described. In FIG. 2, first, the adder 414 adds an offset amount of Td/T corresponding to the dead time, to the duty command value D2 (=1−D1) outputted from the subtractor 407, to generate the duty command value 415. Meanwhile, the multiplier 309 multiplies the phase shift duty command value 308 (amplitude value ΔD) by the first square wave SW1, to generate a first square wave having an amplitude of the amplitude value ΔD, thereby obtaining the phase shift duty command value 310. Then, the adder 416 adds the duty command value 415 and the phase shift duty command value 310, to generate the duty command value 417. Next, the comparator 418 compares the second triangular wave TW2 and the duty command value 417, to generate the gate signal G2.

Figure 26:
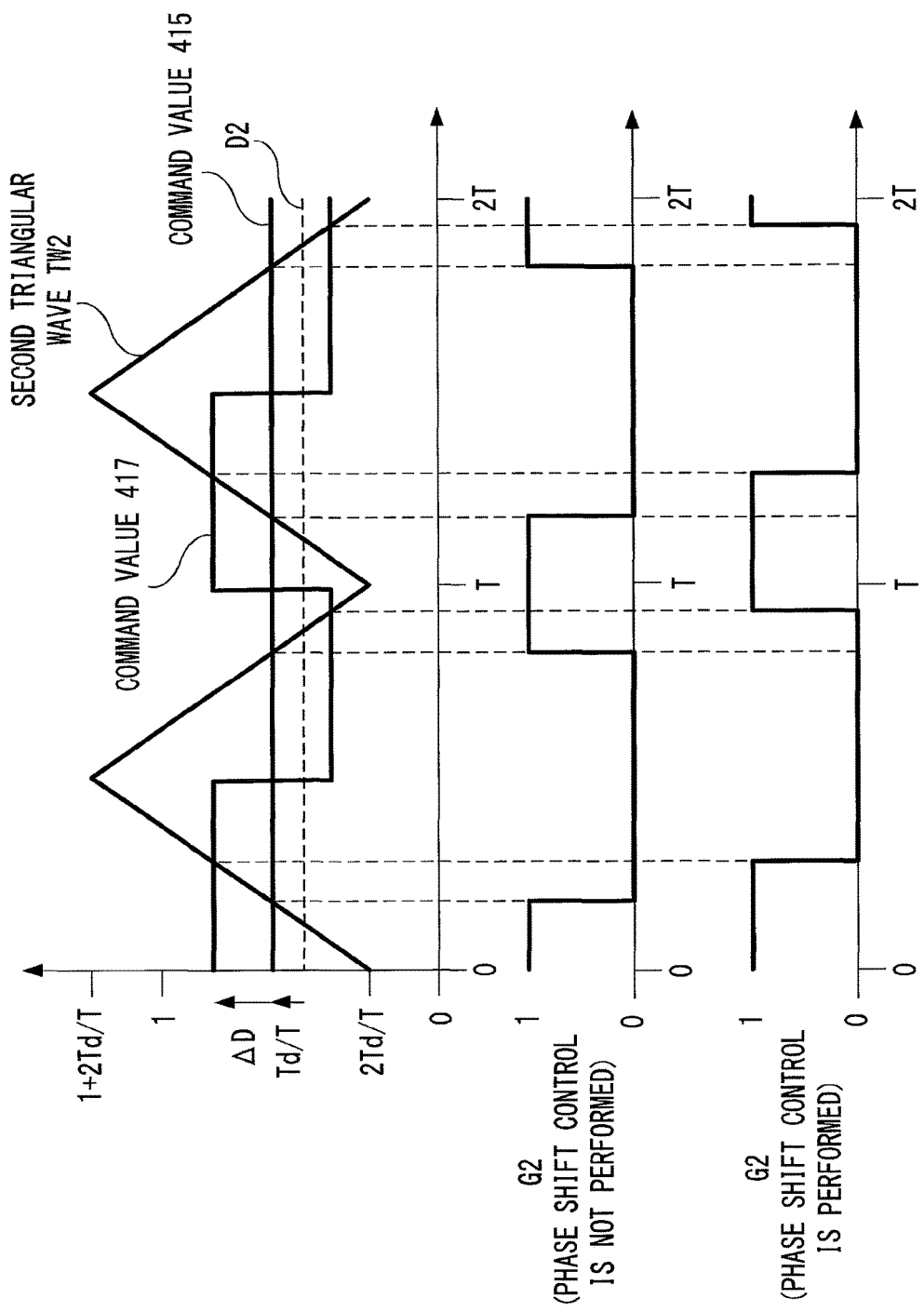
FIG. 26 is a diagram illustrating generation of gate signals of the DC/DC converter in FIG. 1.

In FIG. 26, the gate signal G2 in the case of not performing phase shift, i.e., the gate signal G2 generated from the duty command value 415 and the second triangular wave TW2, is also shown. By performing phase shift, the intersection of the duty command value 417 and the second triangular wave TW2 changes by +ΔD at a rising phase of the second triangular wave TW2, and the intersection changes by −ΔD at a falling phase of the second triangular wave TW2, whereby the phase of the gate signal G2 is shifted by ΔD×(T/2).

The method for generating the gate signal G3 in FIG. 27 will be described. In FIG. 2, first, the adder 409 adds an offset amount of Td/T corresponding to the dead time, to the duty command value D2 (=1−D1), to generate the duty command value 410. Meanwhile, the multiplier 309 multiplies the phase shift duty command value 308 (amplitude value ΔD) by the first square wave SW1, to generate a first square wave having an amplitude of the amplitude value ΔD, thereby obtaining the phase shift duty command value 310. Then, the adder 411 adds the duty command value 410 and the phase shift duty command value 310, to generate the duty command value 412. Next, the comparator 413 compares the first triangular wave TW1 and the duty command value 412, to generate the gate signal G3.

Figure 27:
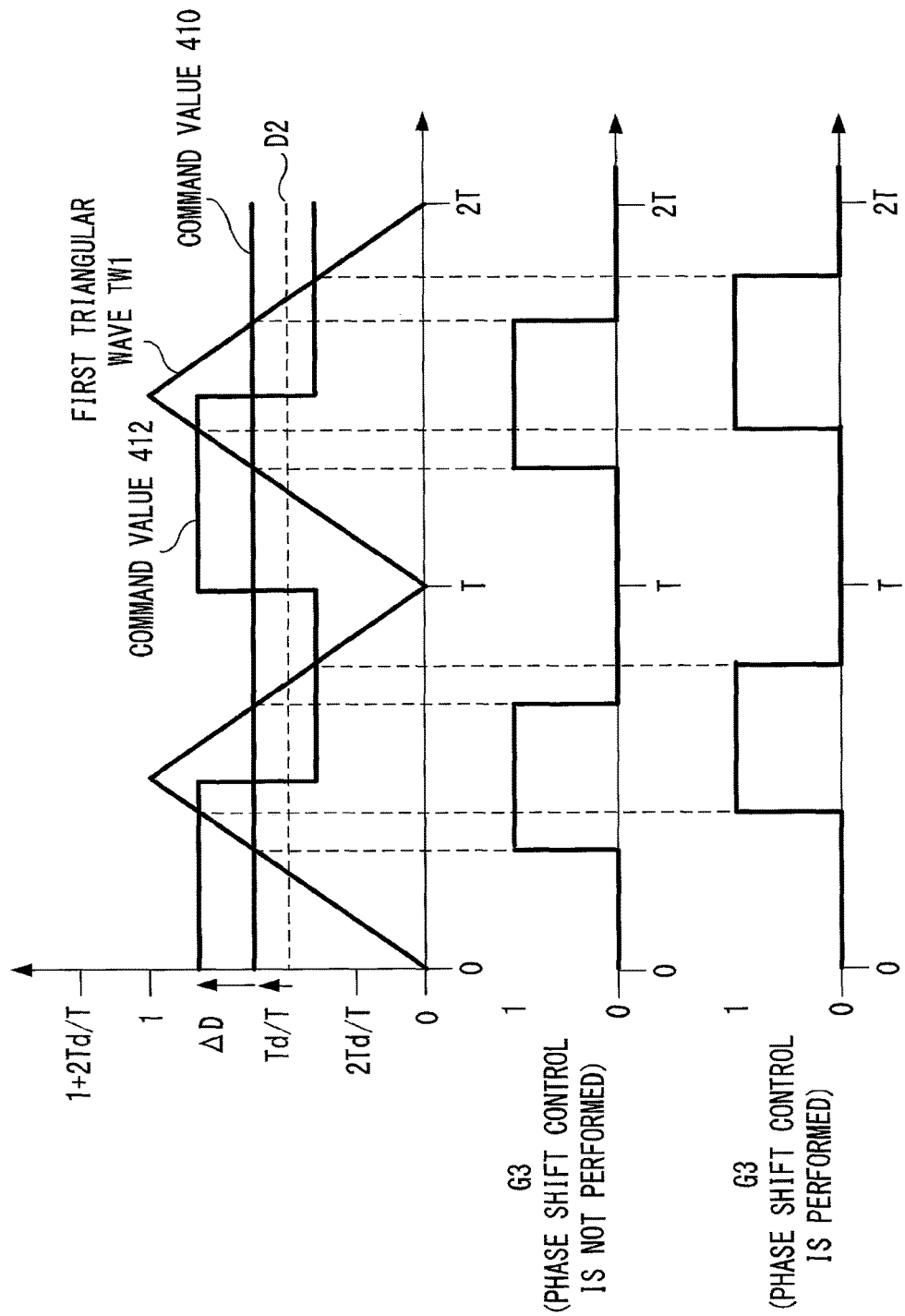
FIG. 27 is a diagram illustrating generation of gate signals of the DC/DC converter in FIG. 1.

In FIG. 27, the gate signal G3 in the case of not performing phase shift, i.e., the gate signal G3 generated from the duty command value 410 and the first triangular wave TW1, is also shown. By performing phase shift, the intersection of the duty command value 412 and the first triangular wave TW1 changes by +ΔD at a rising phase of the first triangular wave TW1, and the intersection changes by −ΔD at a falling phase of the first triangular wave TW1, whereby the phase of the gate signal G3 is shifted by ΔD×(T/2).

Thus, the phases of the gate signals G2 and G3 can be shifted by adding, to the duty command value, a first square wave that becomes +D at a rising phase of the first triangular wave TW1 and the second triangular wave TW2 and becomes −D at a falling phase thereof. In FIG. 26 and FIG. 27, the case of ΔD>0 has been shown as an example. In the case of ΔD<0, the first square wave becomes −D at a rising phase of the first triangular wave TW1 and the second triangular wave TW2 and becomes +D at a falling phase thereof, and the gate signals G2 and G3 are shifted in a lagging direction.

In the case of generating phase shift using the first square wave as in the present embodiment, there is a limit on the amplitude value ΔD. This limit is that the duty command value 412 does not exceed the amplitude value of 0 to 1 of the first triangular wave TW1, or that the duty command value 417 does not exceed the amplitude value of 2Td/T to 1+2Td/T of the second triangular wave TW2. Here, a limit value is derived from comparison between the duty command value 412 and the first triangular wave TW1.

A limit value of the amplitude value ΔD is determined from a process for generating the gate signal G3 shown in FIG. 27. The generation of the gate signal G3 is performed through comparison between the first triangular wave TW1 and the duty command value 410 obtained by adding Td/T to the duty command value D2. Therefore, the limit value of the amplitude value ΔD differs, with the case where the duty command value 410 is 0.5 as a boundary condition. The boundary condition value D21 is represented by (Expression 1).

$$D21=0.5-Td/T \quad \text{(Expression 1)}$$

In the case where the duty command value D2 is smaller than D21, for the amplitude value ΔD, a limit value 1 is defined by a difference between the duty command value 410 and the minimum value 0 of the first triangular wave TW1. That is, the amplitude value ΔD is limited by the limit value 1 represented by (Expression 2).

$$\text{Limit value } 1=D2-Td/T(D2<0.5-Td/T) \quad \text{(Expression 2)}$$

In the case where the duty command value D2 is greater than D21, for ΔD, a limit value 2 is defined by a difference between the duty command value 410 and the maximum value 1 of the first triangular wave TW1. That is, ΔD is limited by the limit value 2 represented by (Expression 3).

$$\text{Limit value } 2=1-Td/T-D2(D2>0.5-Td/T) \quad \text{(Expression 3)}$$

The phase shift allowable range determined by the limit value 1 and the limit value 2 is a hatched part RA in FIG. 28. In FIG. 28, the vertical axis indicates the amplitude value ΔD (duty: phase shift duty command value), the horizontal axis indicates the ON duty for the gate signals G1 to G4, and the hatched part RA indicates the phase shift allowable range.

[6]. Relationship Between Phase Shift Time and Charge/Discharge Current

Next, a relational expression between the phase shift time and average current of the charge/discharge capacitor 101a in a switching cycle T will be derived.

In the present embodiment, the case where the step-up ratio is smaller than two and the case where the step-up ratio is equal to or greater than two will be described individually.

FIG. 29 shows the relationship among the phase shift time, reactor current IL, and charge/discharge current Icf of the charge/discharge capacitor, in power-running operation in the case where the step-up ratio is smaller than two and the phases of the gate signals G2 and G3 are shifted to be a leading phase.

If the ON period of the gate signal G1 is defined as Ton, the period of the mode 1 and the period of the mode 2 are Ton. Further, a relational expression among T (one cycle), Ton, Vin, and Vout is represented by (Expression 4).

$$Vout=\{T/(T-Ton)\} \times Vin \qquad \text{(Expression 4)}$$

If the phase shift time is ΔT, the mode 3 is defined as shown in FIG. 29. Here, for the purpose of discriminating two modes 3, the mode 3 after the mode 1 is newly defined as a mode 31, and the mode 3 after the mode 2 is newly defined as a mode 32.

That is, the period of the mode 31 is T/2−Ton+ΔT, and the period of the mode 32 is T/2−Ton−ΔT.

If the initial value of reactor current IL in the mode 1 is ILa and the end value thereof is ILb, since the period of the mode 31 is increased by ΔT, an initial value ILa1 in the mode 2 is defined as (Expression 5). Also, an end value ILb1 in the mode 2 is defined as (Expression 6). Here, L is an inductance value of the reactor 12.

$$ILa1=ILa-\{(Vout-Vin)\cdot \Delta T/L\} \qquad \text{(Expression 5)}$$

$$ILb1=ILb-\{(Vout-Vin)\cdot \Delta T/L\} \qquad \text{(Expression 6)}$$

It is noted that, in the case where the phases of the gate signals G2 and G3 are shifted to lag by the phase shift time ΔT, ΔT may be treated as a negative value (ΔT<0) in (Expression 5) and (Expression 6).

An average value Icf_c of charge current to the charge/discharge capacitor 101a in the mode 1 is represented by (Expression 7), and an average value of discharge current Icf_d from the charge/discharge capacitor 101a in the mode 2 is represented by (Expression 8). Therefore, average current Icf_AVG of the charge/discharge capacitor 101a is represented by (Expression 9), and thus the relationship with the phase shift time ΔT is defined.

$$Icf\_c = \{(ILa+ILb)\cdot Ton/2\}/T \qquad \text{(Expression 7)}$$

$$Icf\_d = [\{ILa+ILb-2\cdot(Vout-Vin)\cdot \Delta T/L\}\cdot Ton/2]/T \qquad \text{(Expression 8)}$$

$$Icf\_AVG = \{(Vout-Vin)\cdot \Delta T/L\}\cdot Ton/T \qquad \text{(Expression 9)}$$
$$= \{(Vout-Vin)^{\wedge}2/(L\cdot Vout)\} \times \Delta T$$

It is noted that, in the case where the phases of the gate signals G2 and G3 are shifted to lag by the phase shift time ΔT, ΔT may be treated as a negative value (ΔT<0) in (Expression 9).

That is, in both the case where the phases of the gate signals G2 and G3 are shifted to be a leading phase and the case where the phases of the gate signals G2 and G3 are shifted to be a lagging phase, increase and decrease of the average current Icf_AVG of the charge/discharge capacitor 101a can be defined by allocating a plus/minus sign to the phase shift time ΔT in (Expression 9).

From (Expression 9), in the case where ΔT is zero, average current Icf_AVG of the charge/discharge capacitor 101a is zero. In the case of ΔT>0, average current Icf_AVG of the charge/discharge capacitor 101a is positive and the charge/discharge capacitor 101a is charged. In the case of ΔT<0, average current Icf_AVG of the charge/discharge capacitor 101a is negative and the charge/discharge capacitor 101a is discharged.

In FIG. 29, power-running operation in the case where the step-up ratio is smaller than two has been described as an example, but also in regeneration operation in the case where the step-up ratio is smaller than two, the same expression as (Expression 9) is obtained.

FIG. 30 shows the relationship among the phase shift time, reactor current IL, and charge/discharge current Icf of the charge/discharge capacitor 101a, in power-running operation in the case where the step-up ratio is equal to or greater than two and the phases of the gate signals G2 and G3 are shifted to be a leading phase.

As in FIG. 29, if the ON period of the gate signal G1 is defined as Ton, the period of the mode 1 and the period of the mode 2 are T−Ton. Further, a relational expression among T (one cycle), Ton, Vin, and Vout is the same as (Expression 4).

If the phase shift time is ΔT, the mode 4 is defined as shown in FIG. 30. Here, for the purpose of discriminating two modes 4, the mode 4 before the mode 1 is newly defined as a mode 41, and the mode 4 after the mode 1 is newly defined as a mode 42.

That is, the period of the mode 41 is Ton−T/2+ΔT, and the period of the mode 42 is Ton−T/2−ΔT.

If the initial value of reactor current IL in the mode 2 is ILa and the end value thereof is ILb, since the period of the mode 41 is increased by ΔT and the period of the mode 42 is shortened by ΔT, an initial value ILa1 in the mode 1 is defined as (Expression 10). Also, an end value ILb1 is defined as (Expression 11).

$$ILa1 = ILa+Vin\cdot \Delta T/L \qquad \text{(Expression 10)}$$

$$ILb1 = ILb+Vin\cdot \Delta T/L \qquad \text{(Expression 11)}$$

It is noted that, in the case where the phases of the gate signals G2 and G3 are shifted to lag by the phase shift time ΔT, ΔT may be treated as a negative value (ΔT<0) in (Expression 10) and (Expression 11).

An average value Icf_c of charge current to the charge/discharge capacitor 101a in the mode 1 is represented by (Expression 12), and an average value of discharge current Icf_d from the charge/discharge capacitor 101a in the mode 2 is represented by (Expression 13). Therefore, average current Icf_AVG of the charge/discharge capacitor 101a is represented by (Expression 14), and thus the relationship with the phase shift time ΔT is defined.

$$Icf\_c = [(ILa+ILb+2\cdot Vin\cdot \Delta T/L)\cdot (T-Ton)/2]/T \qquad \text{(Expression 12)}$$

$$Icf\_d = [(ILa+ILb)\cdot (T-Ton)/2]/T \qquad \text{(Expression 13)}$$

$$Icf\_AVG = Vin\cdot \Delta T/L\cdot (T-Ton)/T \qquad \text{(Expression 14)}$$
$$= \{Vin^{\wedge}2/(L\cdot Vout)\} \times \Delta T$$

It is noted that, in the case where the phases of the gate signals G2 and G3 are shifted to lag by the phase shift time ΔT, ΔT may be treated as a negative value (ΔT<0) in (Expression 14).

That is, in both the case where the phases of the gate signals G2 and G3 are shifted to be a leading phase and the case where the phases of the gate signals G2 and G3 are shifted to be a lagging phase, increase and decrease of the average current Icf_AVG of the charge/discharge capacitor 101a can be defined by allocating a plus/minus sign to the phase shift time ΔT in (Expression 14).

In FIG. 30, power-running operation in the case where the step-up ratio is equal to or greater than two has been described as an example, but also in regeneration operation in the case where the step-up ratio is equal to or greater than two, the same expression as (Expression 14) is obtained.

In the case where the step-up ratio is two, 2·Vin=Vout is satisfied, and if 2Vin is substituted into Vout in (Expression 9) and 2Vin is substituted into Vout in (Expression 14), the following (Expression 15) is obtained in common.

$$Icf\_AVG=\{Vin/(2L)\}\times\Delta T \quad \text{(Expression 15)}$$

Thus, in the case where the step-up ratio is two, the relational expression is represented by (Expression 15). As described above, (Expression 15) is satisfied in power-running operation and in regeneration operation.

Next, FIG. 31 shows the relationship between the phase shift time ΔT and the phase shift duty command value ΔD. Here, ΔD (phase shift duty command value 308) is referred to as a phase shift duty command value ΔD. As shown in FIG. 31, a half cycle T/2 of the first triangular wave TW1 corresponds to the phase shift duty command value ΔD. For example, when the phase shift duty command value ΔD is an upper limit value 1, the phase shift time ΔT is T/2. Therefore, a relational expression represented by (Expression 16) is satisfied between the phase shift duty command value ΔD and the phase shift time T.

$$\Delta D=\Delta T/(T/2) \quad \text{(Expression 16)}$$

From the above description, the relational expression between average current Icf_AVG of the charge/discharge capacitor 101a and the phase shift duty ΔD is as follows.

(1) Case Where Step-up Ratio is Smaller than Two

From (Expression 9) and (Expression 16), the relational expression is defined by the following expression.

$$\Delta D=[(L \cdot Vout)/\{(Vout-Vin)^2\}]\times(2/T)\times Icf\_AVG \quad \text{(Expression 17)}$$

(2) Case Where Step-up Ratio is Two

From (Expression 15) and (Expression 16), the relational expression is defined by the following expression.

$$\Delta D=(2L/Vin)\times(2/T)\times Icf\_AVG \quad \text{(Expression 18)}$$

(3) Case Where Step-up Ratio is Equal to or Greater than Two

From (Expression 14) and (Expression 16), the relational expression is defined by the following expression.

$$\Delta D=[(L \cdot Vout)/\{(Vin)^2\}]\times(2/T)\times Icf\_AVG \quad \text{(Expression 19)}$$

[7]. Operation of Control Device of DC/DC Converter

Next, operation of the control device 109 of the DC/DC converter 1 in the present embodiment 1 will be described with reference to FIG. 2.

As described above, the control device 109 includes: the first control block 20 for causing the high-voltage-side voltage detection value Vout to follow the output voltage target value Vout* as the high-voltage-side voltage command value; the second control block 30 for causing the voltage detection value Vcf of the charge/discharge capacitor 101a to follow the voltage target value Vcf* for the charge/discharge capacitor 101a; and the third control block 40 for generating the gate signals G1, G2, G3, G4 for the switching elements S1, S2, S3, S4.

In the first control block 20, the subtractor 201 subtracts output voltage Vout detected by the voltage sensor 103 from the high-voltage-side output voltage command value Vout*, and the controller 202 performs proportional integral control (PI control) to calculate the duty command value D1.

In the second control block 30, first, the multiplier 301 multiplies the high-voltage-side output voltage command value Vout* by 0.5, to generate the voltage target value Vcf* for the charge/discharge capacitor. Then, the subtractor 302 subtracts the voltage detection value Vcf of the charge/discharge capacitor detected by the voltage sensor 104 from the voltage target value Vcf* for the charge/discharge capacitor, and the controller 303 performs proportional control (P control) to generate the current command value 304. Then, the converter 305 multiplies the resultant value by the conversion coefficient K, to generate the phase shift duty command value 306.

The conversion coefficient K multiplied in conversion from the current command value 304 to the phase shift duty command value 306 is changed in accordance with the step-up ratio N as follows.

(1) In the case where the step-up ratio is smaller than two, on the basis of (Expression 17), the conversion coefficient K is set as shown by the following expression.

$$K=[(L \cdot Vout)/\{(Vout-Vin)^2\}]\times(2/T) \quad \text{(Expression 20)}$$

(2) In the case where the step-up ratio is two, on the basis of (Expression 18), the conversion coefficient K is set as shown by the following expression.

$$K=(2L/Vin)\times(2/T) \quad \text{(Expression 21)}$$

(3) In the case where the step-up ratio is equal to or greater than two, on the basis of (Expression 19), the conversion coefficient K is set as shown by the following expression.

$$K=[(L \cdot Vout)/\{(Vin)^2\}]\times(2/T) \quad \text{(Expression 22)}$$

Next, the phase shift duty command value 306 is limited by the limiter 307. The upper limit value set in the limiter 307 is in accordance with (Expression 2) and (Expression 3). The lower limit value thereof is constantly set at zero. In the case where the upper limit value is smaller than zero, the upper limit value is set at zero. A command value generated using the limiter 307 is the phase shift duty command value 308 (ΔD).

In the present embodiment, since phase shift of the gate signals G2 and G3 is achieved through comparison between a square wave and a triangular wave, the multiplier 309 multiplies the phase shift duty command value 308 by the first square wave SW1, to obtain the phase shift duty command value 310, and the phase shift duty command value 310 is inputted to the third control block 40. It is noted that the first square wave is defined in FIG. 25 as described above.

Operation of the third control block 40 is as described above.

[8]. Control Device in Another Example of Embodiment 1

The phase shift control of the control device of the DC/DC converter in the present embodiment 1 may be performed only in a low-load case, instead of being performed over the entire load range.

Figure 32:
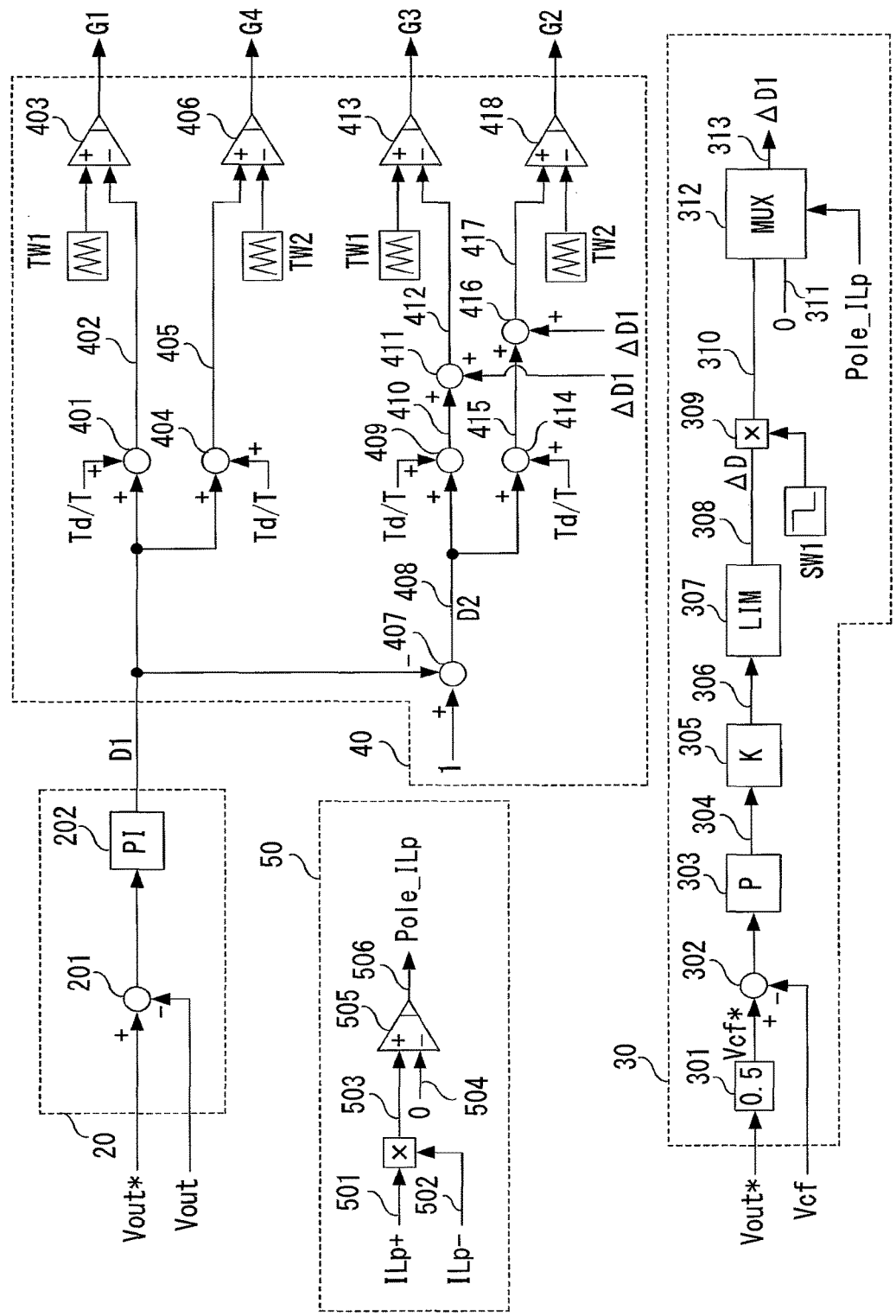
FIG. 32 is a circuit diagram showing another configuration of the control device according to embodiment 1 of the present invention.

FIG. 32 is a block diagram showing another configuration of the control device in embodiment 1. In FIG. 32, a fourth control block 50 for determining the polarity of reactor current IL is newly provided. In the fourth control block 50, determination as to a low-load case is performed.

In the fourth control block 50, a maximum peak value 501 of reactor current IL detected by the current sensor 105 is inputted as ILp+, and a minimum peak value 502 thereof is inputted as ILp−. Then, the maximum peak value ILp+ and the minimum peak value ILp− are multiplied to obtain a reactor current polarity signal 503. A comparator 505 performs determination as to the reactor current polarity signal 503, to obtain a determination value 506 indicating whether the reactor current polarity signal 503 is positive or negative. Here, in the case of (ILp+)×(ILP−)>0, the load is determined to be great, and the determination value 506 (Pole_ILp) becomes 1. In the case of (ILp+)×(ILP−)<0, the load is determined to be low, and the determination value 506 (Pole_ILp) becomes 0. That is, the case where the reactor current polarity signal 503 is positive means that the maximum peak value ILp+ and the minimum peak value ILp− have the same polarity, and in power-running operation, ILp+>0 and ILp−>0 are satisfied and it is determined that the load power is sufficiently high, so that the determination value 506 (Pole_ILp) becomes 1. Similarly, in regeneration operation, ILp+<0 and ILp−<0 are satisfied and it is determined that the load power is sufficiently high, so that the determination value 506 (Pole_ILp) becomes 1. The case where the reactor current polarity signal 503 is negative means that the maximum peak value ILp+ and the minimum peak value ILp− have different polarities. In this case, reactor current IL is across 0(A), and the load is determined to be low, so that the determination value 506 (Pole_ILp) becomes 0.

In the second control block 30, the process until the phase shift duty command value 310 is generated is the same as that described above, but a selector (MUX) 312 is newly provided. The selector (MUX) 312 receives the phase shift duty command value 310 and the determination value Pole_ILp generated in the fourth control block 50, and determines whether the phase shift control is possible, in accordance with the determination value Pole_ILp. If the determination value Pole_ILp is 1, i.e., the load is determined to be great, 0 is selected as ΔD1. This means that the phase shift control is not performed. If Pole_ILp is 0, i.e., the load is determined to be low, the phase shift duty command value 310 is selected as ΔD1. This means that the same phase shift control as described above is performed.

By performing control according to the control blocks in FIG. 32, whether the phase shift control is possible is determined so that the phase shift control of the gate signals G2 and G3 is performed in a low-load case when the polarity of reactor current IL changes, and the phase shift control of the gate signals G2 and G3 is not performed in a great-load case when the polarity of reactor current IL does not change.

[9]. Effect of Embodiment 1

As described above, in the present embodiment 1, the gate signals G1, G2, G3, G4 for the first, second, third, fourth switching elements S1, S2, S3, S4 are generated such that the phases of the gate signal G2 and the gate signal G3 are shifted to lead or lag relative to the phases of the gate signals G1 and G4, whereby increase and decrease in the voltage Vcf of the charge/discharge capacitor 101a can be controlled. In particular, voltage Vcf of the charge/discharge capacitor 101a is increased by performing the phase shift in a leading direction, and voltage Vcf of the charge/discharge capacitor 101a is decreased by performing the phase shift in a lagging direction, whereby voltage Vcf of the charge/discharge capacitor 101a can be controlled to be constant.

In the present embodiment 1, the polarity (leading phase or lagging phase) of phase shift of the gate signals G2 and G3, and the increase/decrease polarity (increase or decrease) of voltage Vcf of the charge/discharge capacitor 101a, have a constant relationship without depending on the step-up ratio, and in addition, have a constant relationship without depending on whether power-running operation or regeneration operation is performed. Therefore, in an application assumed in the present embodiment 1, e.g., an electric automobile, it is possible to continuously control voltage Vcf of the charge/discharge capacitor to be constant, even when sharp change between power-running operation and regeneration operation occurs due to acceleration and deceleration of the automobile.

Also in the case where, when the load is low, the peak value of reactor current changes between positive and negative and thus whether the operation is power-running operation or regeneration operation cannot be correctly determined, voltage Vcf of the charge/discharge capacitor 101a can be stably controlled to be constant. Further, it is possible to continuously control voltage Vcf of the charge/discharge capacitor 101a to be constant, even when the load power sharply changes due to acceleration and deceleration.

In the converter 305, the conversion coefficient K is made variable depending on the operation condition, i.e., the step-up ratio, whereby it becomes possible to generate an equally magnified phase shift duty command value 306 from the charge/discharge current command value 304 for the charge/discharge capacitor 101a irrespective of the step-up ratio, and thus the same control response can be ensured.

The phase shift operation of the gate signals G2 and G3 is achieved through comparison between a square wave and a triangular wave, and therefore is achieved merely by adding the first square wave the amplitude value of which is the phase shift duty command value ΔD, in the conventional generation process for the gate signals G2 and G3 by PWM control. Thus, the phase shift control can be achieved by change or addition in a simple control system.

In the limiter 307, for the phase shift duty command value 306, a limit value is provided according to the duty command value D2 calculated in the first control block 20, whereby the gate signals G1, G2, G3, G4 can be calculated without exceeding the amplitude value of the first triangular wave or the second triangular wave in the comparators 413, 418. Thus, the phase shift control is achieved without changing the ON times of the gate signals G2 and G3, and therefore it is possible to continue operation without influencing the high-voltage-side output voltage control achieved by the first control block 20.

Embodiment 2

In the above embodiment 1, the phases of the gate signals G2 and G3 are shifted relative to the phases of the gate signals G1 and G4. In the present embodiment 2, as well as phase shift of the gate signals G2 and G3, phase shift of the gate signals G1 and G4 is also performed at the same time. The direction of phase shift of the gate signals G1 and G4 is set to be always opposite to the direction of phase shift of the gate signals G2 and G3.

The circuit configuration of the DC/DC converter in the present embodiment is the same as that in embodiment 1 as shown in FIG. 1. In the present embodiment, in the case of performing phase shift in a leading direction, as shown in FIG. 33, the phases of the gate signals G2 and G3 are shifted to lead relative to the phases of the gate signals G1 and G4, and the phases of the gate signals G1 and G4 are shifted to lag relative to the phases of the gate signals G2 and G3. In the case of performing phase shift in a lagging direction, as shown in FIG. 34, the phases of the gate signals G2 and G3 are shifted to lag relative to the phases of the gate signals G1 and G4, and the phases of the gate signals G1 and G4 are shifted to lead relative to the phases of the gate signals G2 and G3.

The operation principle of reactor current IL, charge/discharge current Icf of the charge/discharge capacitor 101a, and voltage Vcf of the charge/discharge capacitor 101a in the case of FIG. 33(a) (step-up ratio is smaller than two, power-running operation, leading phase) is the same as in FIG. 8 in embodiment 1. Also, the operation principle in the case of FIG. 33(b) (step-up ratio is equal to or greater than two, power-running operation, leading phase) is the same as in FIG. 12.

The operation principle of reactor current IL, charge/discharge current Icf of the charge/discharge capacitor 101a, and voltage Vcf of the charge/discharge capacitor 101a in the case of FIG. 34(a) (step-up ratio is smaller than two, power-running operation, lagging phase) is the same as in FIG. 10 in embodiment 1. Also, the operation principle in the case of FIG. 34(b) (step-up ratio is equal to or greater than two, power-running operation, lagging phase) is the same as in FIG. 12.

Thus, all the charge/discharge operation principles of the charge/discharge capacitor 101a based on phase shift of the gate signals G1 and G4 and phase shift of the gate signals G2 and G3 performed in the present embodiment are the same as in embodiment 1.

It is noted that, in the present embodiment, the phase shift amount ΔT of the gate signals G2 and G3 and the phase shift amount ΔT of the gate signals G1 and G4 are set to be always equal to each other.

Figure 35:
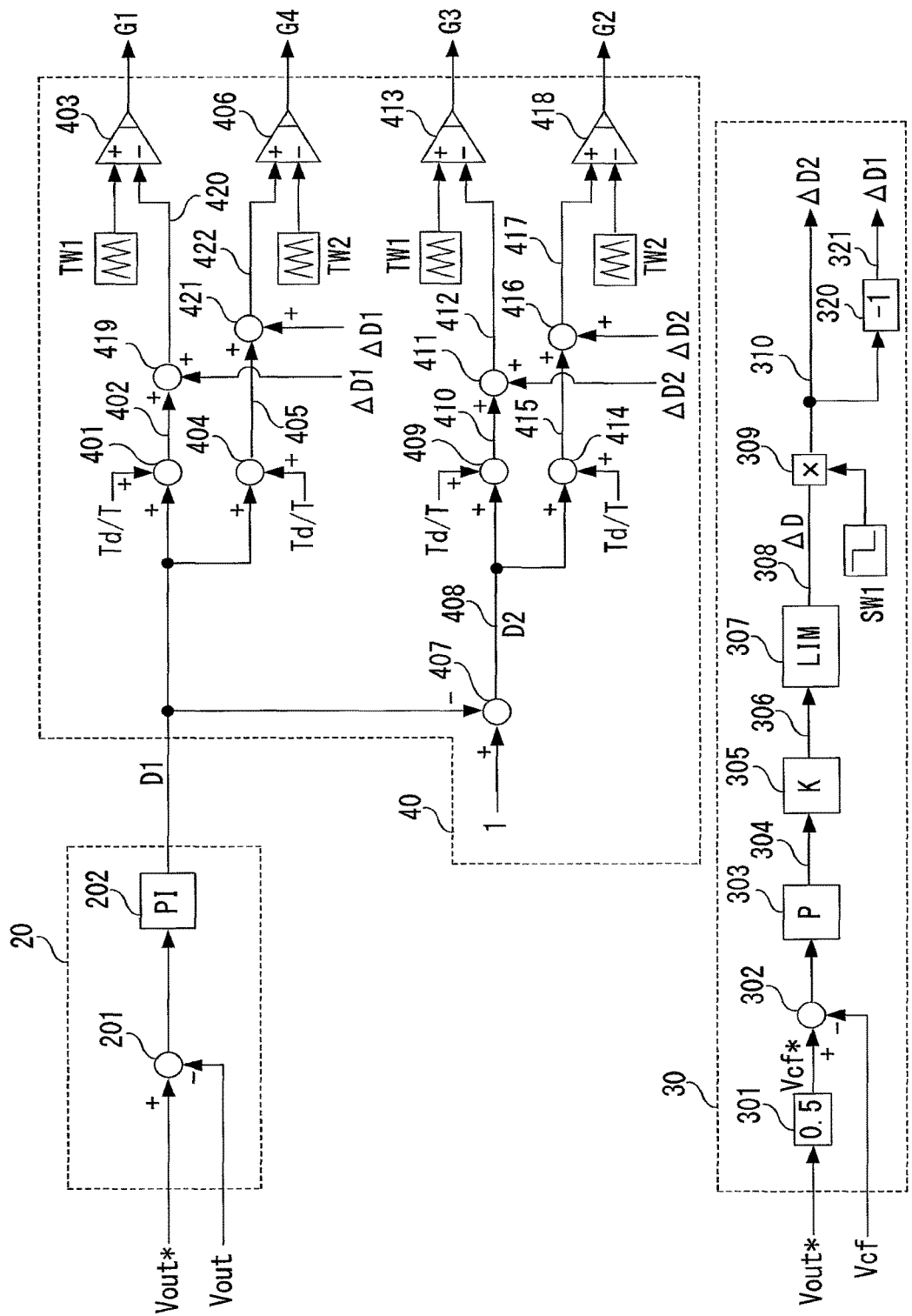
FIG. 35 is a block diagram showing the configuration of a control device of the DC/DC converter according to embodiment 2 of the present invention.

FIG. 35 is a block diagram showing the configuration of the control device in embodiment 2.

The first control block 20 is the same as in embodiment 1, and calculates the duty command value D1.

In the second control block 30, the phase shift duty command value 310 is calculated as in embodiment 1, and is used as a phase shift duty command value (square wave duty command value) ΔD2 for the gate signals G2 and G3. Further, a multiplier 320 is newly provided, and the phase shift duty command value 310 is multiplied by −1 by the multiplier 320, to calculate a phase shift duty command value 321, which is used as a phase shift duty command value (square wave duty command value) ΔD1 for the gate signals G1 and G4. Then, the phase shift duty command values ΔD2 and ΔD1 are inputted to the third control block 40.

In the third control block 40, the phase shift duty command value ΔD1 is added to the gate generation block for the gate signals G1 and G4, and the phase shift duty command value ΔD2 is added to the gate generation block for the gate signals G2 and G3. By the multiplier 320, the polarity of the phase shift duty command value ΔD2 is made opposite to the polarity of the phase shift duty command value ΔD1, whereby the phase shift direction of the gate signals G2 and G3 and the phase shift direction of the gate signals G1 and G4 become opposite to each other.

As for the gate signal G1, an adder 419 adds the phase shift duty command value ΔD1 to the duty command value 402, to calculate a duty command value 420, and then the comparator 403 compares the duty command value 420 and the first triangular wave TW1, thereby calculating the gate signal G1.

As for the gate signal G4, an adder 421 adds the phase shift duty command value ΔD1 to the duty command value 405, to calculate a duty command value 422, and then the comparator 406 compares the duty command value 422 and the second triangular wave TW2, thereby calculating the gate signal G4.

As for the gate signal G3, the adder 411 adds the phase shift duty command value ΔD2 to the duty command value 410, to calculate the duty command value 412, and then the comparator 413 compares the duty command value 412 and the first triangular wave TW1, thereby calculating the gate signal G3.

As for the gate signal G2, the adder 416 adds the phase shift duty command value ΔD2 to the duty command value 415, to calculate the duty command value 417, and then the comparator 418 compares the duty command value 417 and the second triangular wave TW2, thereby calculating the gate signal G2.

In the present embodiment, in the case of charging the charge/discharge capacitor 101a, the phases of the gate signals G2 and G3 are shifted to lead relative to the phases of the gate signals G1 and G4, and the phases of the gate signals G1 and G4 are shifted to lag relative to the phases of the gate signals G2 and G3. In the case of discharging the charge/discharge capacitor 101a, the phases of the gate signals G2 and G3 are shifted to lag relative to the phases of the gate signals G1 and G4, and the phases of the gate signals G1 and G4 are shifted to lead relative to the phases of the gate signals G2 and G3. Through such phase shift control, increase and decrease in voltage of the charge/discharge capacitor 101a can be adjusted.

In the present embodiment, the polarity (leading phase or lagging phase) of phase shift and the increase/decrease polarity (increase/decrease) of voltage of the charge/discharge capacitor 101a are constant irrespective of power-running operation, regeneration operation, and the step-up ratio, as in embodiment 1. Therefore, it is possible to continuously control voltage of the charge/discharge capacitor 101a to be constant, even when the load or voltage sharply changes.

Further, as compared to the present embodiment 1, by also performing phase shift of the gate signals G1 and G4 at the same time as well as phase shift of the gate signals G2 and G3, the change amount of the phase shift duty can be doubled, and the change amount of charge/discharge current of the charge/discharge capacitor 101a can also be doubled as compared to embodiment 1. Thus, control response when the charge/discharge capacitor voltage changes can be enhanced.

Since the change amount of the phase shift duty can be doubled, the phase shift allowable range RA shown in FIG. 28 can be expanded to be doubled. That is, it becomes possible to expand the phase shift change amount in an operation condition in which the ON duty of the gate signals G1, G2, G3, G4 is close to Td/T or close to 1−(Td/T), in other words, an operation condition in which the phase shift amount is small, and thus control response can be improved.

It is noted that, within the scope of the present invention, the above embodiments may be freely combined with each other, or each of the above embodiments may be modified or simplified as appropriate.

The invention claimed is:

1. A DC/DC converter comprising:
   a terminal group including a first terminal and a second terminal on a low-voltage side, and a third terminal and a fourth terminal on a high-voltage side;
   a first smoothing capacitor connected between the first terminal and the second terminal;
   a second smoothing capacitor connected between the third terminal and the fourth terminal;
   a switching element series circuit which includes a first switching element, a second switching element, a third switching element, and a fourth switching element connected in series in this order, and in which a connection point of the second and third switching elements is connected to the first terminal via a reactor, a terminal of the fourth switching element on a side opposite to a connection point of the third switching element and the fourth switching element is connected to the third terminal, and a terminal of the first switching element on a side opposite to a connection point of the first switching element and the second switching element is connected to the second terminal and the fourth terminal;

a charge/discharge capacitor connected between the connection point of the first and second switching elements and the connection point of the third and fourth switching elements; and a control device for generating gate signals for driving the first, second, third, and fourth switching elements such that the gate signals for the first switching element and the fourth switching element have a complementary relationship, and the gate signals for the second switching element and the third switching element have a complementary relationship, the DC/DC converter performing conversion of DC voltage between: the first terminal and the second terminal on the low-voltage side; and the third terminal and the fourth terminal on the high-voltage side, wherein the control device includes: a duty command calculation unit for calculating duty command values for the first, second, third, and fourth switching elements on the basis of difference voltage between a high-voltage-side voltage command value which is a voltage command value for the high-voltage side, and a high-voltage-side voltage detection value which is a voltage detection value on the high-voltage side; and a phase shift duty command calculation unit for calculating a phase shift duty command value corresponding to a phase difference between the gate signals for the first and fourth switching elements and the gate signals for the second and third switching elements, on the basis of difference voltage between a voltage target value for the charge/discharge capacitor and a voltage detection value of the charge/discharge capacitor, and the control device generates the gate signals for driving the first, second, third, and fourth switching elements, on the basis of the duty command values and the phase shift duty command value.

2. The DC/DC converter according to claim 1, wherein the control device changes phases of the gate signals for the second and third switching elements so as to lead relative to phases of the gate signals for the first and fourth switching elements, thereby increasing voltage of the charge/discharge capacitor, and changes phases of the gate signals for the second and third switching elements so as to lag relative to phases of the gate signals for the first and fourth switching elements, thereby decreasing voltage of the charge/discharge capacitor.

3. The DC/DC converter according to claim 1, wherein the duty command calculation unit causes the high-voltage-side voltage detection value to follow the high-voltage-side voltage command value, and the phase shift duty command calculation unit calculates the phase shift duty command value corresponding to a phase difference between phases of the gate signals for the first and fourth switching elements and phases of the gate signals for the second and third switching elements, on the basis of difference voltage between the voltage detection value of the charge/discharge capacitor and the voltage target value for the charge/discharge capacitor, thereby increasing or decreasing voltage of the charge/discharge capacitor.

4. The DC/DC converter according to claim 1, wherein the phase shift duty command calculation unit calculates the phase shift duty command value only when reactor current flowing through the reactor is equal to or smaller than predetermined threshold current, and sets the phase shift duty command value at zero when the reactor current is greater than the threshold current.

5. The DC/DC converter according to claim 1, wherein the control device shifts phases of the gate signals for the second and third switching elements to be a leading phase or a lagging phase while fixing phases of the gate signals for the first and fourth switching elements.

6. The DC/DC converter according to claim 5, wherein the control device generates the gate signals for the first and fourth switching elements by pulse width modulation on the basis of a triangular wave which is a carrier wave and the duty command value for the first switching element calculated by the duty command calculation unit, and the control device generates the gate signals for the second and third switching elements by pulse width modulation on the basis of the triangular wave and a duty command value obtained by adding, to the duty command value for the second switching element calculated by the duty command calculation unit, a square wave duty command value obtained by multiplying the phase shift duty command value calculated by the phase shift duty command calculation unit, by a first square wave having the same frequency as that of the triangular wave.

7. The DC/DC converter according to claim 1, wherein in a case of causing phases of the gate signals for the second and third switching elements to lead relative to phases of the gate signals for the first and fourth switching elements, the control device shifts the phases of the gate signals for the first and fourth switching elements to a lagging side, and shifts the phases of the gate signals for the second and third switching elements to a leading side, and in a case of causing phases of the gate signals for the second and third switching elements to lag relative to phases of the gate signals for the first and fourth switching elements, the control device shifts the phases of the gate signals for the first and fourth switching elements to a leading side, and shifts the phases of the gate signals for the second and third switching elements to a lagging side.

8. The DC/DC converter according to claim 7, wherein the control device sets a phase shift amount of the gate signals for the first and fourth switching elements and a phase shift amount of the gate signals for the second and third switching elements, to be equal to each other.

9. The DC/DC converter according to claim 7, wherein the control device generates the gate signals for the first and fourth switching elements by pulse width modulation on the basis of a triangular wave which is a carrier wave and a duty command value by adding, to the duty command value for the first switching element calculated by the duty command calculation unit, a first square wave duty command value obtained by multiplying the phase shift duty command value calculated by the phase shift duty command calculation unit, by a first square wave having the same frequency as that of the triangular wave, and the control device generates the gate signals for the second and third switching elements by pulse width modulation on the basis of the triangular wave and a duty command value obtained by adding, to the duty command value for the second switching element calculated by the duty command calculation unit, a second square wave duty command value obtained by multiplying the phase shift duty command value calculated by the phase shift duty command calculation unit, by a square wave having a polarity opposite to that of the first square wave.

10. The DC/DC converter according to claim 1, wherein the phase shift duty command calculation unit calculates the phase shift duty command value by multiplying, by one of conversion coefficients K shown in the following (1), (2), and (3), a current command value obtained by multiplying, by a gain, the difference voltage between the voltage target value for the charge/discharge capacitor and the voltage detection value of the charge/discharge capacitor, (1) in a voltage condition that voltage between the third terminal and the fourth terminal on the high-voltage side is smaller than twice voltage between the first terminal and the second terminal on the low-voltage side, $K = [(L \cdot Vout)/\{(Vout-Vin)^2\}] \times (2/T)$, (2) in a voltage condition that voltage between the third terminal and the fourth terminal on the high-voltage side is twice voltage between the first terminal and the second terminal on the low-voltage side, $K = (2L/Vin) \times (2/T)$, and (3) in a voltage condition that voltage between the third terminal and the fourth terminal on the high-voltage side is equal to or greater than twice voltage between the first terminal and the second terminal on the low-voltage side, $K = [(L \cdot Vout)/\{(Vin)^2\}]$, where L is a reactor capacitance of the reactor, Vout is high-voltage-side voltage, Vin is low-voltage-side voltage, and T is a switching cycle of the first to fourth switching elements.

11. The DC/DC converter according to claim 10, wherein in a case where an ON duty of the first to fourth switching elements is smaller than a duty value obtained by subtracting a duty corresponding to a dead time from 0.5, the phase shift duty command calculation unit sets a limit for the phase shift duty command value, using, as an upper limit value, the duty value obtained by subtracting the duty corresponding to the dead time from the ON duty of the first to fourth switching elements, and in a case where the ON duty of the first to fourth switching elements is greater than the duty value obtained by subtracting the duty corresponding to the dead time from 0.5, the phase shift duty command calculation unit sets a limit for the phase shift duty command value, using, as an upper limit value, a duty value obtained by subtracting the duty corresponding to the dead time, and the ON duty for the first to fourth switching elements, from 1.

* * * * *